US006408400B2

United States Patent
Taketa et al.

(10) Patent No.: US 6,408,400 B2
(45) Date of Patent: *Jun. 18, 2002

(54) DISK ARRAY DEVICE

(75) Inventors: Suijin Taketa; Yuuichi Tarouda; Tatsuhiko Machida; Sawao Iwatani; Keiichi Yorimitsu; Sanae Kamakura; Satoshi Yazawa; Takuya Kurihara; Yasuyoshi Sugesawa, all of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,780

(22) Filed: Apr. 23, 1998

(30) Foreign Application Priority Data

Nov. 4, 1997 (JP) .............................................. 9-302231

(51) Int. Cl.[7] ................................................ G06F 11/00
(52) U.S. Cl. ............................................. 714/5; 714/49
(58) Field of Search ........................... 714/5, 6, 46, 47, 714/48, 49; 711/114

(56) References Cited

U.S. PATENT DOCUMENTS 5,325,363 A * 6/1994 Lui ................................ 714/6
5,889,933 A * 3/1999 Smith ........................... 714/22
5,928,367 A * 7/1999 Nelson ........................... 714/6

FOREIGN PATENT DOCUMENTS

| JP | 6-119126 | 4/1994 |
| JP | 6-202813 | 7/1994 |
| JP | 7-508112 | 9/1995 |
| JP | 8-263227 | 10/1996 |

OTHER PUBLICATIONS

Patterson, David. "RAID: High Performance Reliable Secondary Storage" ACM Computing Surveys, Jun. 1994, vol. 26, No. 2.*
D. Patterson, "A Case for Redundant Arrays of Inexpensive Disks (RAID)", ACM SIGMOD Conference, Chicago, Il, Jun. 1–3, 1988, pp. 109–116.

* cited by examiner

Primary Examiner—Robert Beausoleil
Assistant Examiner—Bryce P. Bonzo
(74) Attorney, Agent, or Firm—Staas & Halsey LLP

(57) ABSTRACT

A disc array device for maintaining consistency of data. When write processing is interrupted and then restarted, new data may be stored in a nonvolatile memory and regeneration of parity may be impossible because data can not be read out normally from a disc device other than a disc device in which new data is to be written and a disk device for parity. In such a case, a special write executing unit overwrites the new data stored in the nonvolatile memory at a specified write position of the disk device in which new data is to be written.

3 Claims, 37 Drawing Sheets

FIG.5

| op-id | STATUS | SELF-SYSTEM/ ANOTHER SYSTEM | ADDRESS |
|---|---|---|---|
| 15 | DATA-READ | SELF-SYSTEM | ×××××××× |
| 30 | PARITY-WRITTEN | SELF-SYSTEM | △△△△△△△△ |

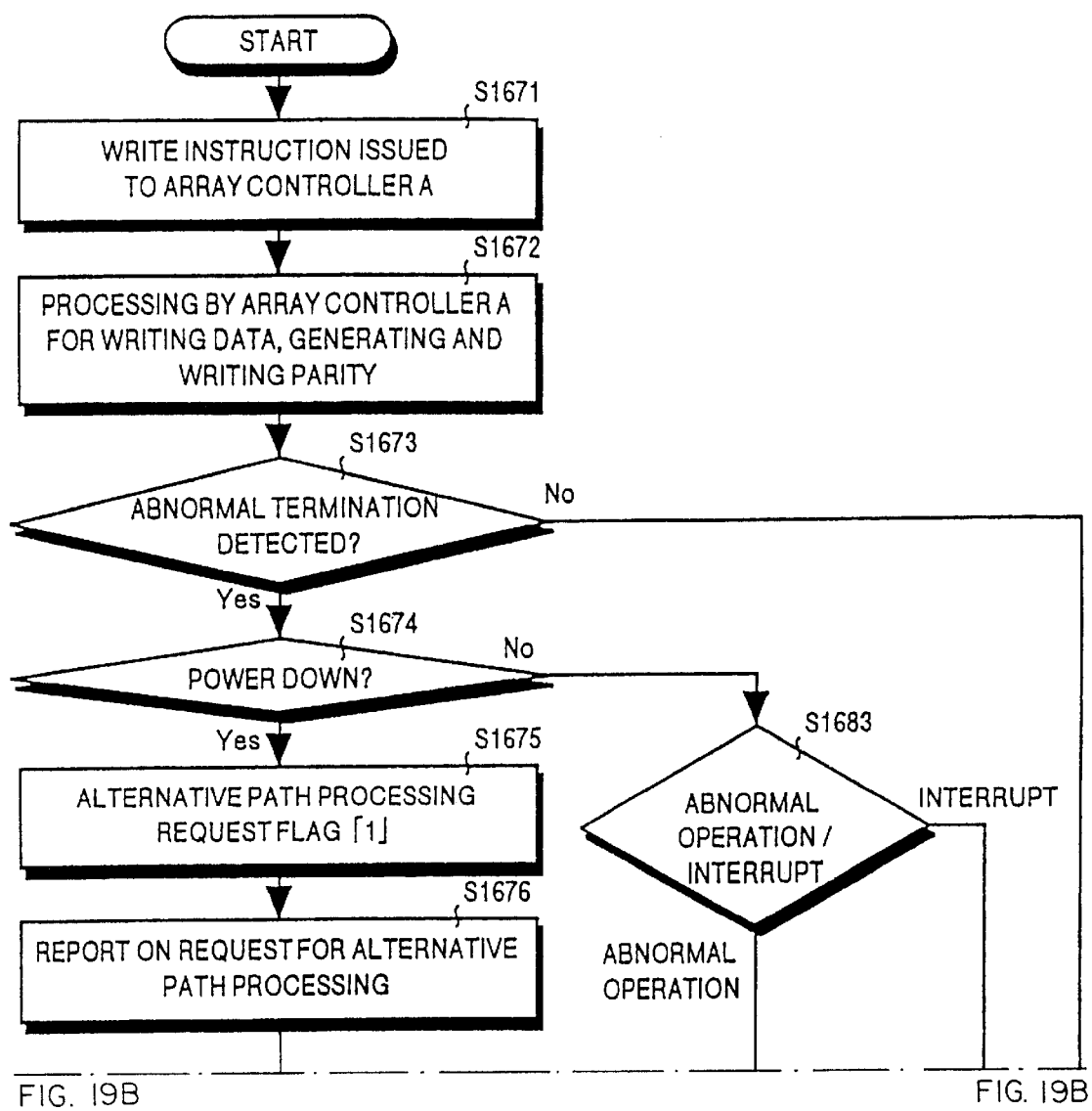

FIG. 27 op_id
data LBA
old data address
new data address
old parity address
new parity address
array controller #
write status

DISK ARRAY DEVICE

FIELD OF THE INVENTION

The present invention relates to a disk array device for executing data I/O processing by concurrently accessing a plurality of disk devices, and more specifically, a disk array device for maintaining consistency of data by executing, when write processing is interrupted due to, for instance, power failure, recovery processing of the write processing using the data stored therein.

BACKGROUND OF THE INVENTION

A disk device having nonvolatile memory, a large capacity, a capability for high speed data transfer, and other features such as a magnetic disk or an optical disk device has been widely used as an external storage device for a computer system. Demands for a disk device include high speed data transfer, high reliability, a large capacity, and a low price. A disk array device satisfies the requirements described above. The disk array device comprises a plurality of compact disk devices for distributing and recording data therein, and for enabling concurrent access to the data.

With the disk array device, by concurrently executing data transfer to a plurality of disk devices, data transfer can be executed at a higher rate than the data transfer rate of a single disk device. Further, by recording, in addition to data, redundant information such as parity data, it becomes possible to detect and correct a data error caused by, for instance, a failure of a disk device. Also, a reliability as high as that obtained by duplicating contents of a disk device may be achieved with a lower cost.

It is generally recognized that a disk array device is a new recording medium simultaneously satisfying the three requirements for low price, high speed, and high reliability. The requirement that is most important and most difficult to maintain is high reliability. A single disk constituting a disk array is low in cost, and does not require high reliability. Accordingly, to realize a disk array device, high reliability must be maintained.

David A. Patterson and others at the University of California at Berkeley published reports in which disk array devices that provide redundancy of data by distributing a large volume of data to a number of disks at a high speed are classified from levels 1 to 5 (ACM SIGMOD Conference, Chicago, Ill., Jun. 1–3, 1988, pp.109–116).

The classification of disk array devices proposed by Patterson et al. is abbreviated as RAID (Redundant Array of Independent Disks). Next, brief descriptions are provided for RAID 0 to 5.

FIG. 32 shows a RAID 0 disk array device. In a RAID 0 disk array device, as shown by data A to I, a disk array control unit 10 distributes data to disk devices 32-1 to 32-3 according to an I/O request from a host computer 18, and data reliability for disk error is not insured.

A RAID 1 disk array device has, as shown in FIG. 33, a mirror disk device 32-2 in which copies A' to C' of data A to C stored in the disk device 32-1 are stored. For RAID 1, use efficiency of the disk device is low, but data reliability is insured and can be realized with simple controls, resulting in this type of disk array device being widely used.

A RAID 2 disk array device stripes (divides) data in units of a bit or a byte, and concurrently executes data write or data read to and from each disk device. The striped data is recorded in the same physical sectors in all the disk devices. Hamming code generated from data is used as error correction code. The RAID 2 disk array device has, in addition to disk devices for data storage, a disk device for recording the Hamming code therein, and identifies a faulty disk from the Hamming code to restore data. By having data redundancy based on the Hamming code, data reliability can be insured, even if a disk device fails, but the use efficiency of disk devices is rather low, so that this type of disk array device has not been put into practical use.

A RAID 3 disk array device has the configuration as shown in FIG. 34. As shown in FIG. 35, for instance, data a, b, and c are divided by units of a bit or a sector to data a1 to a3, b1 to b3, and c1 to c3. Parity p1 is computed from the data a1 to a3, parity p2 is computed from the data b1 to b3, and parity p3 is computed from data c1 to c3. The disk devices 32-1 to 32-4 shown in FIG. 34 are concurrently accessed to write the data therein.

In a case of RAID 3, redundancy of data is maintained with parity. Further, a time required for data write can be reduced by concurrently processing the divided data. However, a concurrent seek operation is required for all the disk devices 32-1 to 32-4 for each access for data write or data read. This scheme is effective when a large volume of data is continuously treated. However, in the case of, for instance, transaction processing for accessing a small volume of data at random, the capability for high-speed data transfer cannot be effectively used, and efficiency is lowered.

A RAID 4 disk array device divides one piece of data by sector and then writes the divided data in the same disk device. For instance, as shown in FIG. 36, in the disk device 32-1, data a is divided into sector data a1 to a4 and the divided data is written therein. The parity is stored in a disk device 32-4 unequivocally decided. Herein parity p1 is computed from data a1, b1, and c1, parity p2 from data a2, b2, and c2, parity p3 from data a3, b3, and c3, and parity p4 from data a4, b4, and c4.

Data can concurrently be read from the disk devices 32-1 to 32-3. When reading data a, sector data a1 to a4 are successively read out and synthesized by accessing sectors 0 to 3 of the disk device 32-1. When writing data, data prior to write processing and the parity are read and then new parity is computed to write the data. Thus, the disk device 32-1 is accessed a total of 4 times for one write operation.

For instance, when sector data a1 in the disk device 32-1 is updated (rewritten), in addition to data write updating, operations are required for reading old data (a1 old) at an updated position and old parity (p1 old) of the corresponding disk device 32-4, computing new parity (p1 new) consistent with the new data (a1 new), and then writing the data.

Also, when writing data, the disk device 32-4 for parity is always accessed so that data cannot be simultaneously written in a plurality of disk devices. For instance, even if it is tried to simultaneously write data a1 in the disk device 32-1 and data b2 in the disk device 32-2, it is required to read the parities p1 and p2 from the same disk device 32-4 and then write the data after computing new parities. Thus the data cannot be simultaneously written in the disk devices.

RAID 4 is defined as described above, but this type of disk array device provides few merits, so there is no actual movement for introduction of this type of disk array device into practical use.

In a RAID 5 disk array device, a disk device is not dedicated for parity, so operations for data read and data write can be concurrently executed. As shown in FIG. 37, parities for sectors are written in different disk devices, respectively. Herein parity p1 is computed from data a1, b1, and c1, parity p2 from data a2, b2, and d2, parity p3 from data a3, c3, and d3, and parity p4 from data b4, c4, and d4.

As for concurrent operations for data read and data write, for instance, data a1 for sector 0 of the disk device 32-1 and data b2 for sector 1 of the disk device 32-2 are placed in the disk devices 324 and 32-3 having parity p1 and parity p2 different from each other respectively, so that the operations for reading data and writing data can be concurrently executed. It should be noted that the overhead required for four accesses is the same as that for RAID 4.

As described above, for RAID 5, operations for data read and data write can be concurrently executed by accessing a plurality of disk devices asynchronously. Thus, this type of disk array device is suited to transaction processing executed by accessing a small volume of data at random.

In the conventional types of disk array devices described above, when the power supply is interrupted for some reason while data write to a disk device is being executed, system control can be started from the same operation for writing data after recovery of the power supply in the RAID 1 to RAID 3 disk array devices. However, the same write operation cannot be restarted after recovery of the power supply in the RAID 4 and RAID 5 disk array devices for the following reasons.

When writing data in a RAID 4 or a RAID 5 disk array device, parity is decided by computing an exclusive-OR (expressed by the exclusive-OR symbol) for data in a plurality of disk devices using the equation (1) below and the parity is stored in a disk device for parity.

$$\text{Data } a(+) \text{data } b(+) \ldots = \text{Parity } P \quad (1)$$

Sites for storage of data and parity are fixed for RAID 4 to particular disks 32-1 to 32-4 as shown in FIG. 36. In contrast, for RAID 5, sites for storage of parity are distributed to the disk devices 32-1 to 32-4 as shown in FIG. 37 to dissolve concentration of access to a particular disk or particular disks due to operations for reading and writing parity.

When reading data from these RAID 4 and RAID 5 types of disk array devices, data in the disk devices 32-1 to 32-4 cannot be rewritten so that consistency of parity is maintained. Parity must be rewritten when writing data.

For instance, when old data (a1 old) in the disk device 32-1 is rewritten to new data (a1 new), parity p1 for all the data in the disk device can be maintained by updating parity using equation (2):

$$\text{Old data}(+) \text{old parity}(+) \text{new data} = \text{New parity} \quad (2)$$

As shown by this equation (2), it is necessary to read out old data and old parity in the disk device first, and then an operation for writing new data and operations for generating and writing the new parity are executed.

Next, a detailed description is provided for a method of rewriting data in a RAID 5 type of disk array device with reference to FIG. 38. FIG. 38 illustrates a sequence for rewriting data. In FIG. 38, an array controller 50 is connected to 5 disk devices (Devices 0, 1, 2, 3, 4) 32-1, 32-2, 32-3, 32-4, and 32-5 to control the disk devices, and a host computer 18 is connected to the array controller 50 via a control unit 10 to control the array controller 50.

For instance, when rewriting data (D0) in the disk device 32-1, at first the control unit issues a write command to the array controller 50, and also transfers write data (D0 new) 40 to the array controller 50. The array controller 50 receives the write command from the control unit 10, and reads out old data (D0 old) 40-1 from the disk device 32-1. Also the array controller 50 reads out old parity (Dp old) from the disk device 32-5.

Then the array controller 50 writes the new data (D0 new) in the disk device 32-1. The array controller 50 computes an exclusive-OR (EOR) with a logic circuit 12 using old parity (DP old) 48, old data (D0) 40-1, and new data (D0 new) 40 to generate new parity (Dp new) 48-1, and writes the new parity in the disk device 32-5. Then the array controller 50 reports to the control unit 10 that the write operation finished normally, and the control unit 10 acknowledges the report, thus finishing data updating.

If power is interrupted while writing new data or new parity in a RAID 4 or a RAID 5 type of disk array device, it becomes impossible to determine where data has been written normally, and consistency of parity is lost. If the processing for writing the same data is executed after recovery of power, old data and old parity are read from a disk device or disk devices with consistency of parity having been lost therefrom, so that inconsistent parity is generated and the data write operation is disadvantageously finished.

To solve the problem described above, the present inventors proposed RAID 4 and RAID 5 types of disk array devices in which, even if power is interrupted during an operation for writing new data or new parity, the interrupted operation for writing the same data or same parity can be restarted (refer to Japanese Patent Laid-Open Publication No. HEI 6-119126). The disk array device according to this invention is shown in FIG. 39.

In this disk array device, at least processing state data 38 indicating a processing state of a writing unit 60, as well as a parity updating unit 70 and new data 40 transferred from an upper device 18, are stored in a nonvolatile memory 34 in preparation for a situation in which power is interrupted, and when power is restored, a restoring unit 80 executes the processing for recovery using the new data 40 maintained in the nonvolatile memory 34, with reference to the processing state data 38 in the nonvolatile memory 34 when the write processing has been interrupted.

However, a subsequent study showed that in the invention disclosed in Japanese Patent Laid-Open Publication No. HEI 6-119126, if any one of a plurality of disk devices fails, sometimes recovery processing cannot be executed. In the configuration shown in FIG. 38, for instance, if the disk device 32-2 is faulty, then when power is cut off and the operation for writing data is interrupted while rewriting new data (D0 new) or new parity (Dp new), not only data (D0) in the disk device 32-1 and parity (Dp) in the disk device 32-5 are broken, but it also becomes impossible to reconstruct data (D1) during data striping constituting the same parity group in the faulty disk device 32-2, resulting in the data being lost.

Also, it is conceivable that the invention disclosed in Japanese Patent Laid-Open Publication No. HEI 6-119126 is applied to a RAID 5 disk array device having a plurality of array controllers. A nonvolatile memory is provided in a disk array device having a plurality of array controllers, new data and processing state data are stored in the nonvolatile memory, and the processing for data recovery is executed when data write processing is not finished normally due to power failure, or for any other reason, using the data.

However, when a plurality of array controllers are booted up with independent power supply units, respectively, time delay is generated. For this reason, if a power supply is restarted after write data processing has not finished normally in a plurality of array controllers, the processing for recovery is executed to data in a parity group updated immediately after data recovery by an array controller using data stored in a nonvolatile memory in another array controller, and the last data is disadvantageously lost.

SUMMARY OF THE INVENTION

It is an object of the present invention to provide a disk array device which can restart, even if power goes down during data write processing, the interrupted data write processing after recovery of power to complete the processing, especially a disk array device in which data can be restored even if any of a plurality of disk devices is faulty, or a disk array device having a plurality of array controllers in which data can be restored.

FIG. 1 is an explanatory view showing an operational principle of a disk array device according to the present invention. As shown in FIG. 1, the disk array device belongs to the category of RAID 4 or RAID 5, and comprises a control unit 10, an array controller 50, and a plurality (for instance, 5 units in FIG. 1) of disk devices 32-1, 32-2, 32-3, 32-4, and 32-5.

Provided in the control unit 10 are a channel interface adapter 16, a nonvolatile memory 34, a special write executing unit 110, and a data reproducing unit. An upper device 18, such as a host computer, is connected via the channel interface adapter 16 to the disk array device. The nonvolatile memory 34 stores therein new data transferred from the upper device.

When the write processing is interrupted (for example, due to power failure) once and then restarted, the new parity cannot be generated because the old data and old parity become inconsistent. As a result, the special write executing unit 110 executes special write processing to perform data restoration. The new data has already been stored in the nonvolatile memory 34. The special write executing unit 110 reads the data (other data) from all the other disk devices excluding the specified data disk device to receive the new data and the parity disk device, generates new parity using the new data and the other data, and writes the new data in the specified disk device and the generated new parity in the parity disk device. The upper device 18 instructs the new data to be written over the old data in the specified disk device.

The special write executing unit 110 has a data write unit 113 and a parity generating unit 116. The data write unit 113 overwrites a preset special value, or preferably new data stored in the nonvolatile memory 34, when executing the special write processing, at a specified write position in the specified disk device (for instance, 32-1).

When executing the special write processing, the parity generating unit 116 generates the new parity using the new data stored in the nonvolatile memory 34 and the other data read MR from the other disk devices from a position corresponding to the position where the new data is to be written in the specified disk device 32-1. After generation of the new parity, the new data is written in the specified disk device 32-1 and the new parity is written in the parity disk device 32-5.

The data reproducing unit 120 issues a request to the special write executing unit 110, in effect to start the special write processing, when old data cannot be read out from the specified disk device and old parity cannot be read out from the parity disk device, because of an interruption in the write processing.

Provided in the array controller 50 are a plurality (for instance, 5 units in FIG. 1) of device interface adapters 54-1, 54-2, 54-3, 54-4, and 54-5. Data error detecting units 154-1, 154-2, 154-3, 154-4, and 154-5 are provided in the device interface adapters 54-1, 54-2, 54-3, 54-4, and 54-5, respectively. The data error detecting units 154-1, 154-2, 154-3, 154-4, and 154-5 detect generation of an error when reading out data from the disk devices 32-1, 32-2, 32-3, 32-4, and 32-5, and reports generation of the error to the data reproducing unit 120.

In a disk array device having the configuration described above, the processing for data recovery is executed as described below. After processing for writing new data is interrupted due to power failure or for other reasons and write processing is restarted because the power supply is restarted or for other reasons, an attempt is made to read the old parity, stored at a position corresponding to the disk write position for new data, from the disk device for parity (for instance, 32-5). In this step, a read error is detected by the data error detecting unit (for instance, 154-5) because consistency of parity has been lost due to interruption of the previous write processing.

Then the data error detecting unit (for instance, 154-5) reports the occurrence of an error to the data reproducing unit 120. When the data reproducing unit 120 receives the report, it reads out the other data, for generating the new parity, from the disk devices (for instance, 32-2, 32-3, 32-4) other than the specified disk device (for instance, 32-1) and the disk device for parity (for instance, 32-5) each belonging to the parity group in which the read error occurred.

When the special write executing unit 110 receives a request to shift to the special write processing mode, the data write unit 113 overwrites a preset special value, or preferably new data stored in the nonvolatile memory 34 at specified write positions in the specified disk device (for instance, 32-1).

The parity generating unit 116 generates new parity using data and parity stored at positions corresponding to specified write positions in a disk device (for instance, 32-1), which has been instructed to receive new data, as well as in a disk device for parity (for instance, 32-5), and writes the new parity in the disk device for parity (for instance, 32-5). Then the special write processing mode terminates.

It should be noted that, when a preset special value is overwritten at a specified write position in a specified disk device (for instance, 32-1, such as when new data is not stored in the nonvolatile memory 34), the data write unit 113 memorizes that the special value was overwritten, for example, by providing a flag in the memory, and reports a read error when a read request is issued to the data.

As described above, a disk array device according to the present invention is a disk array device for data updating by reading out old data stored at a write position of a specified disk device, then writing new data transferred from an upper device at the write position. A new parity is generated according to an old parity stored at a disk write position for the new data on a disk device for parity and the old data, as well as the new data, and the new parity is written at a disk storage position for the old parity. The disk array device comprises a nonvolatile memory for storing therein new data transferred from an upper device. A special write executing unit performs recovery processing where write processing is interrupted and then restarted, and it is impossible to restore parity because required data cannot be normally read out from the parity disk device or the specified disk device. A new parity is generated by using (1) other data stored at a position corresponding to a disk write position for the new data on the disk devices other than the specified disk device and parity disk device and (2) new data stored in the nonvolatile memory.

With the disk array device according to the present invention, when write processing that has been interrupted due to power failure or for some other reason is restarted, data recovery processing is executed, even if the specified disk device or the parity disk device is faulty, by generating new parity (Dp new) using (1) other data (D1, D2, D3) stored at positions corresponding to disk write positions for new data (D0 new) in the other disk devices and (2) new data (D0 new) stored in the nonvolatile memory.

In the disk array device of the present invention, the new parity is generated from the data stored at positions corresponding to disk write positions for the new data on all disk devices other than the specified disk device and the parity disk device, and the generated new parity is stored in the nonvolatile memory. Furthermore, the special write executing unit 110 concurrently writes the new data stored in the nonvolatile memory into the specified disk device, and generated new parity into the parity disk device.

A disk array device according to the present invention is also characterized in that a write flag indicating that write processing is being executed and management information indicating progression of the write processing are stored in the nonvolatile memory from the time when a write processing instruction is received from an upper device until the write operation finishes in the normal state.

With the disk array device according to the present invention, a write flag indicating whether an operation for writing data into a disk device has finished normally and a status indicating a stage of the write processing are stored in the nonvolatile memory. If the write processing has not finished normally and then the power supply is restored, whether any data not having been written in the normal state is remaining can visually and easily be checked by referring to the write flag. Also, recovery processing can be restarted from the point where write processing was interrupted by referring to the status, so that recovery processing can be rapidly executed.

A disk array device according to another embodiment of the present invention is a disk array device comprising a plurality of array controllers, each driven by an independent power supply unit for writing and reading data and parity to and from a plurality of disk devices. A control unit controls the array controllers and executes data updating by first reading out old data stored at a write position on a specified disk device. Then, the control unit writes new data transferred from an upper device at the write position. The control unit also writes a new parity in a parity disk device at disk storage positions for the old parity. The new parity is generated according to an old parity, old data, and new data read from storage positions corresponding to disk write positions for the new data.

The control unit comprises a nonvolatile memory for storing therein at least the new data, old data, and old parity, when an upper device provides an instruction for write processing to a disk device. When a power supply is cut off to one of the array controllers, a task generating unit within the control unit generates a task for allocating the write processing being executed or to be executed by this array controller to other array controllers. The control unit also contains a task information table for storing therein the task generated by the task generating unit.

Each of the array controllers comprises a power monitoring unit for mutually monitoring the power supply state and a power supply stop reporting unit for reporting to the control unit that stoppage of the power supply to other array controller or controllers has been detected. The array controllers also contain a parity generating unit for generating a new parity according to (1) data read from a storage position corresponding to a disk write position for the new data on all disks, excluding the disk device in which it has been specified to write new data and the disk device for parity, and (2) new data transferred from the nonvolatile memory.

With the disk array device according to the present invention, when a write instruction is issued from an upper device, new data (D0 new), old data (D0 old), and old parity (Dp old) are stored in nonvolatile memory prior to execution of the write processing to a disk device. Thus, when a problem occurs in the write processing by one of the array controllers, another array controller can continue the write processing instead of the faulty array controller, thereby maintaining the consistency of the data.

A disk array device according to the present invention is also characterized in that management information indicating progression of write processing is stored in the nonvolatile memory, and the task generating unit generates a task according to the management information stored in the nonvolatile memory.

With the disk array device according to the present invention, a status indicating a stage of the write processing and an ID flag indicating an array controller having executed the process indicated by the status are stored in nonvolatile memory, and a task for alternative processing is generated according to the status so that the write processing can be restarted from the interrupted point.

A disk array device according to another embodiment of the present invention is a disk array device comprising a plurality of array controllers, each driven by an independent power supply unit for writing and reading data and parity to and from a plurality of disk devices. A control unit controls the array controllers, and executes data updating by first reading out old data stored at a write position on a specified disk device. Then, the control unit writes new data transferred from an upper device at the write position. The control unit also writes a new parity in a parity disk device at disk storage positions for the old parity. The new parity is generated according to an old parity, old data, and new data read from storage positions corresponding to disk write positions for the new data.

Each of the plurality of array controllers comprises a nonvolatile memory for storing, when an upper device provides an instruction for write processing to a disk device, at least the new data, old data, and old parity. A communicating unit within each array controller executes a transaction of data and parity with another array controller. The communicating unit transmits, when the new data, old data, and old parity have been stored in the nonvolatile memory in one of the array controllers, the new data, old data, and old parity stored in the nonvolatile memory from the one array controller to the other array controller before write processing is executed to a disk device. The communicating unit also receives the new data, old data, and old parity sent from the one array controller to the other array controller and stores them in the nonvolatile memory of the other array controller.

With the disk array device according to the present invention, when an upper device issues an instruction for write processing, new data (D0 new), old data (D0 old), old parity (Dp old) and new parity (Dp new) are stored in the nonvolatile memory of one of the array controllers before execution of the write processing to a disk device. New data (D0 new), old data (D0 old), and old parity (Dp old) are copied into a nonvolatile memory of another array controller so that, even if the processing for writing data and parity is not finished in the normal status due to power failure or for some other reason, recovery processing can easily be executed when power supply is restarted by using new data (D0 new) stored in a nonvolatile memory in one of the array controllers or in the other one.

A disk array device according to the present invention is also characterized in that management information indicating progression of write processing is stored in the nonvolatile memory.

With the disk array device according to the present invention, a status indicating a stage of write processing is stored in the nonvolatile memory so that when write processing is not finished in the normal state and then the power supply is restarted, the write processing can be restarted from the interrupted point by referring to the status.

A disk array device according to the present invention is also characterized in that, when write processing is interrupted in one of the array controllers and then the array controller interrupted as described above is restored to a stable state allowing normal operation, the interrupted array controller, or the other array controller having received the new data, old data, and old parity from the interrupted array controller before interruption of write processing, executes the interrupted write processing again according to the new data, old data, and old parity stored in nonvolatile memory.

With the disk array device according to the present invention, interrupted write processing is restarted according to new data (D0 new), old data (D0 old), and old parity (Dp old) stored in nonvolatile memory so that recovery processing can be easily executed.

A disk array device according to another embodiment of the present invention is a disk array device comprising a plurality of disk devices and an array controller for writing and reading data and parity to and from the disk devices. Data is updated by reading old data stored at a write position of a specified disk device and then writing new data transferred from an upper device at the write position. A new parity is generated according to an old parity, old data, and new data read from a storage position corresponding to a disk write position for the new data, and the new parity is written on a disk device for parity at a disk storage position for the old parity. The disk array device further comprises a non-failure power supply unit for backing up power supply to the plurality of disk devices, as well as supplying power to the array controller.

With the disk array device according to the present invention, even when AC input to a power supply unit is stopped, or when power supply between a power supply unit and an array controller or that between a power supply unit and a disk device is down for some reason, power supply is continuous so that write processing by an array controller is not interrupted and consistency of data is maintained.

A disk array device according to another embodiment of the present invention updates data by first reading out old data stored at a write position of a specified disk device and new data transferred from an upper device at the write position. A new parity generated according to an old parity, old data, and new data stored at a write position corresponding to the disk write position for the new data is written on a parity disk device at the disk storage position for the old parity. The disk array device further comprises a special write executing unit for executing processing recovery. Processing recovery occurs when data in at least two disk units cannot be read out normally for a data group serving as a basis for parity. Then, data is arbitrarily written in the two disk devices from which data cannot be read out normally, and a new parity is generated using the data arbitrarily written and data normally read out from the data group as a basis for a parity. The disk array device also comprises a data error detecting unit for issuing a data check response to read the data arbitrarily written by the special write executing unit.

With the disk array device according to the present invention, although data written in a disk device from which data can normally be read out cannot be reproduced, generating new parity by writing arbitrary data in the disk device, enables the disk device to be operated normally according to a write instruction from an upper device. For this reason, recovery processing from an upper device can be executed.

Also, with the disk array device according to the present invention, by memorizing that arbitrary data has been written at a place where unreadable data is stored in a disk device from which data cannot normally be read out, and also by sending an error or the like in response to a read instruction from an upper device for the written arbitrary data, it is possible to prevent the arbitrary data from erroneously being sent to the upper device.

Other objects and features of this invention will become understood from the following description with reference to the accompanying drawings.

BRIEF DESCRIPTION OF THE DRAWINGS

FIG. 5 is a simulated view showing an example of contents stored in a management table stored in a nonvolatile memory in Embodiment 1;

Figure 11A:
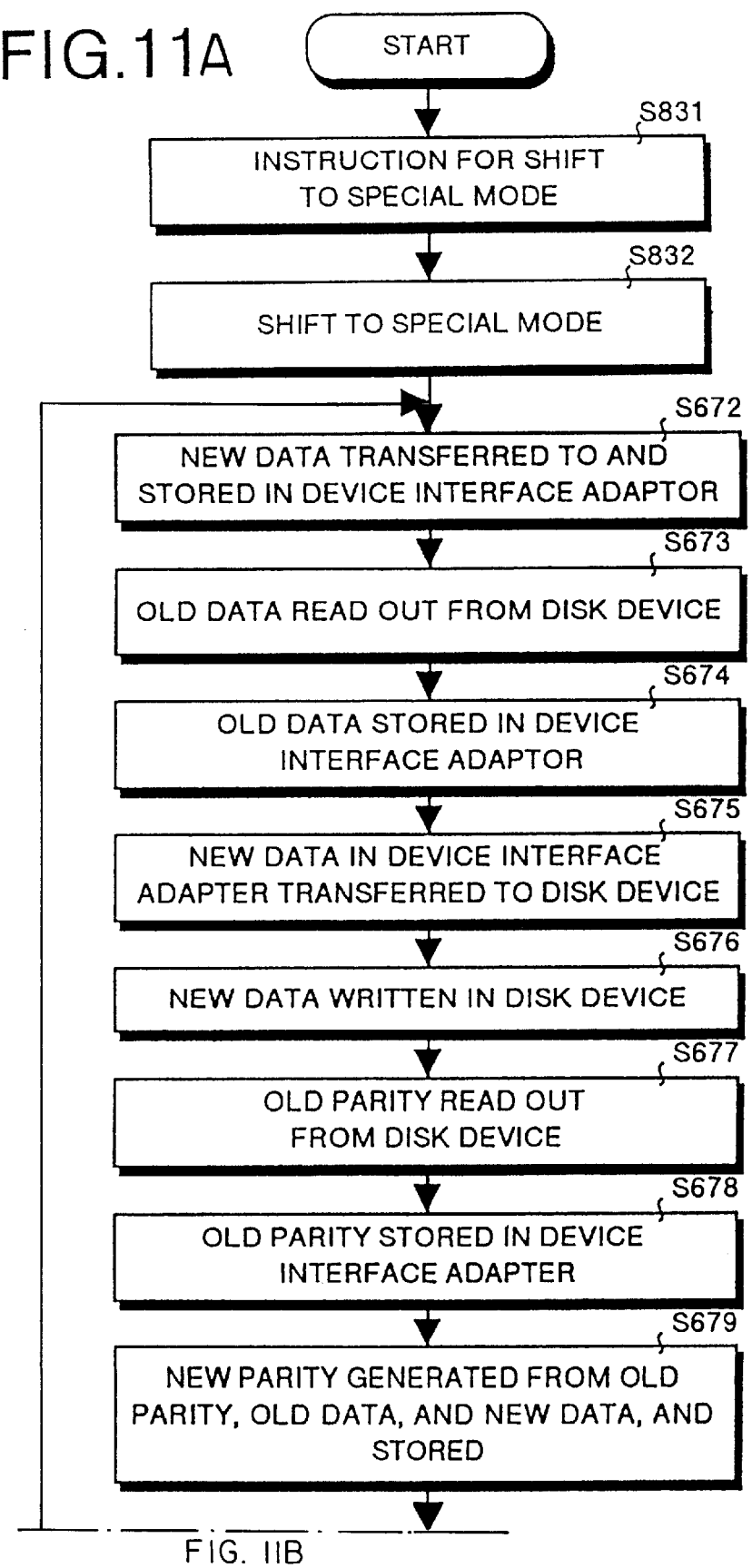
Figure 11B:
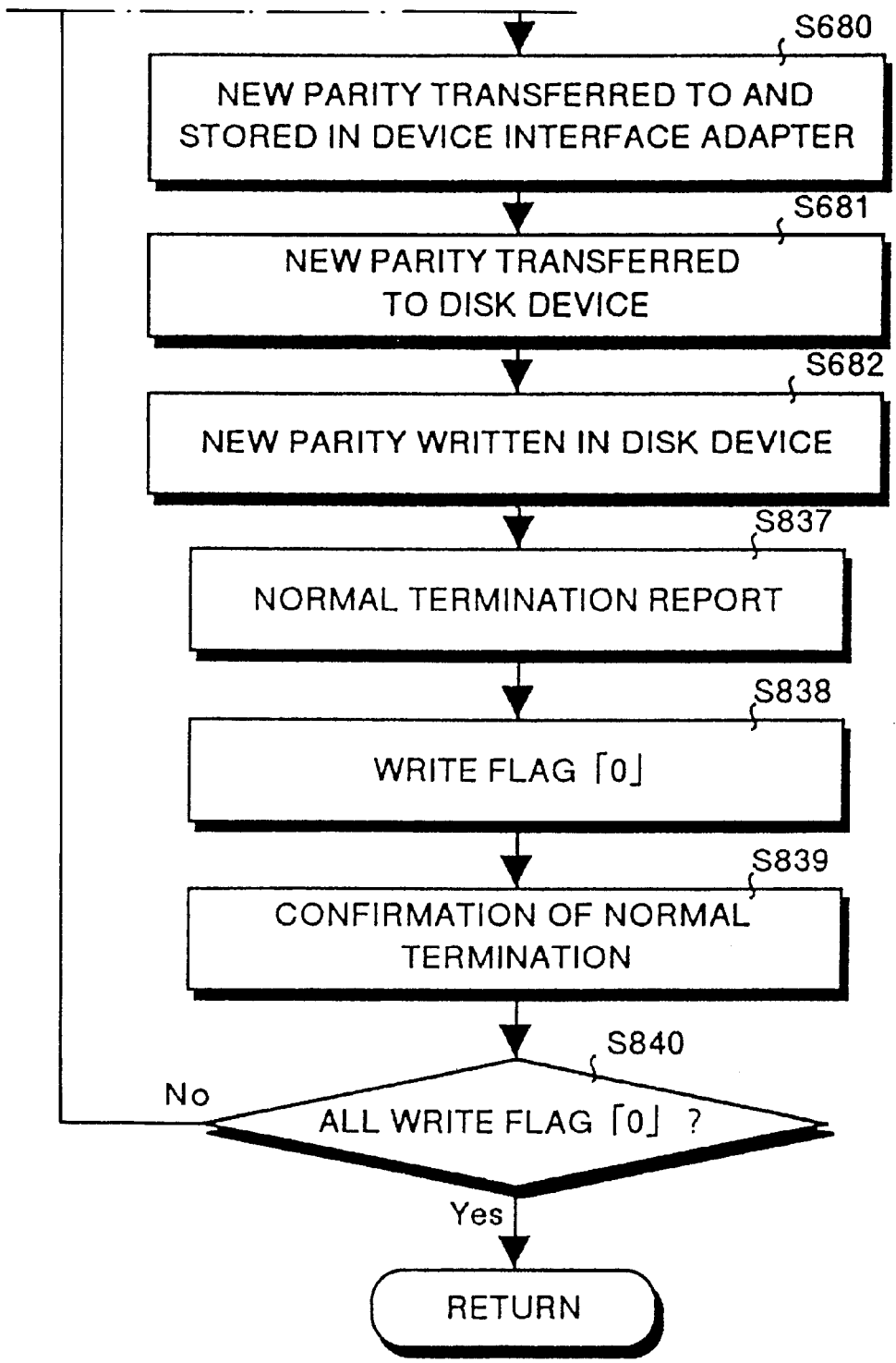
Figure 12:
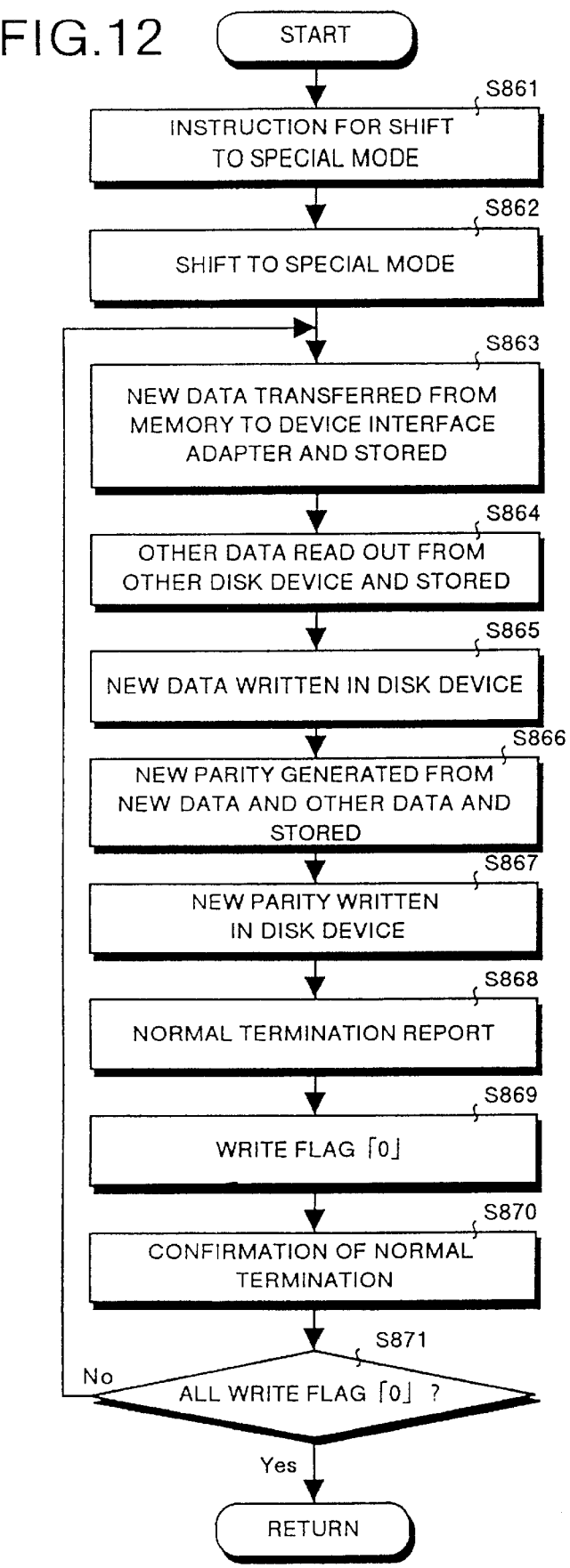
Figure 13:
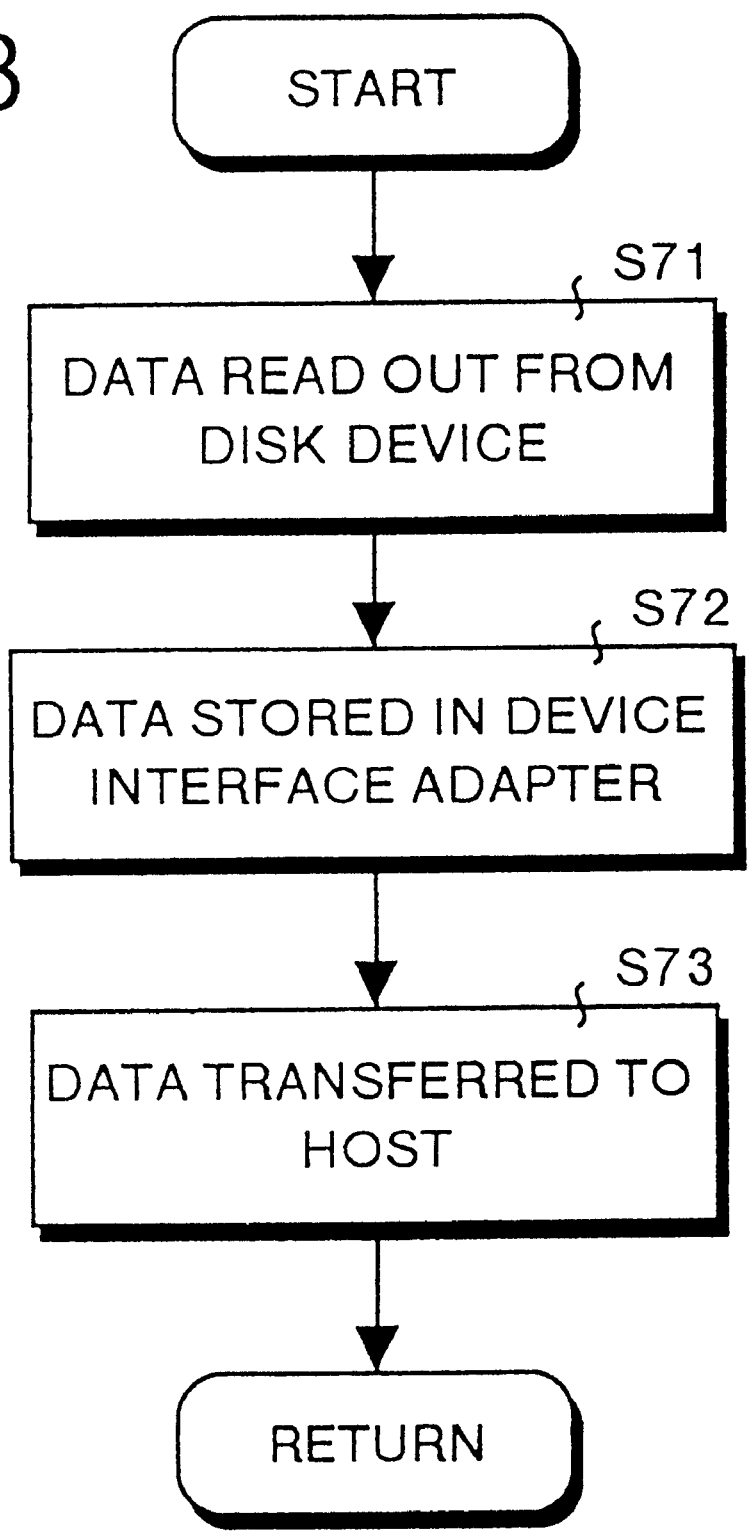
Figure 14:
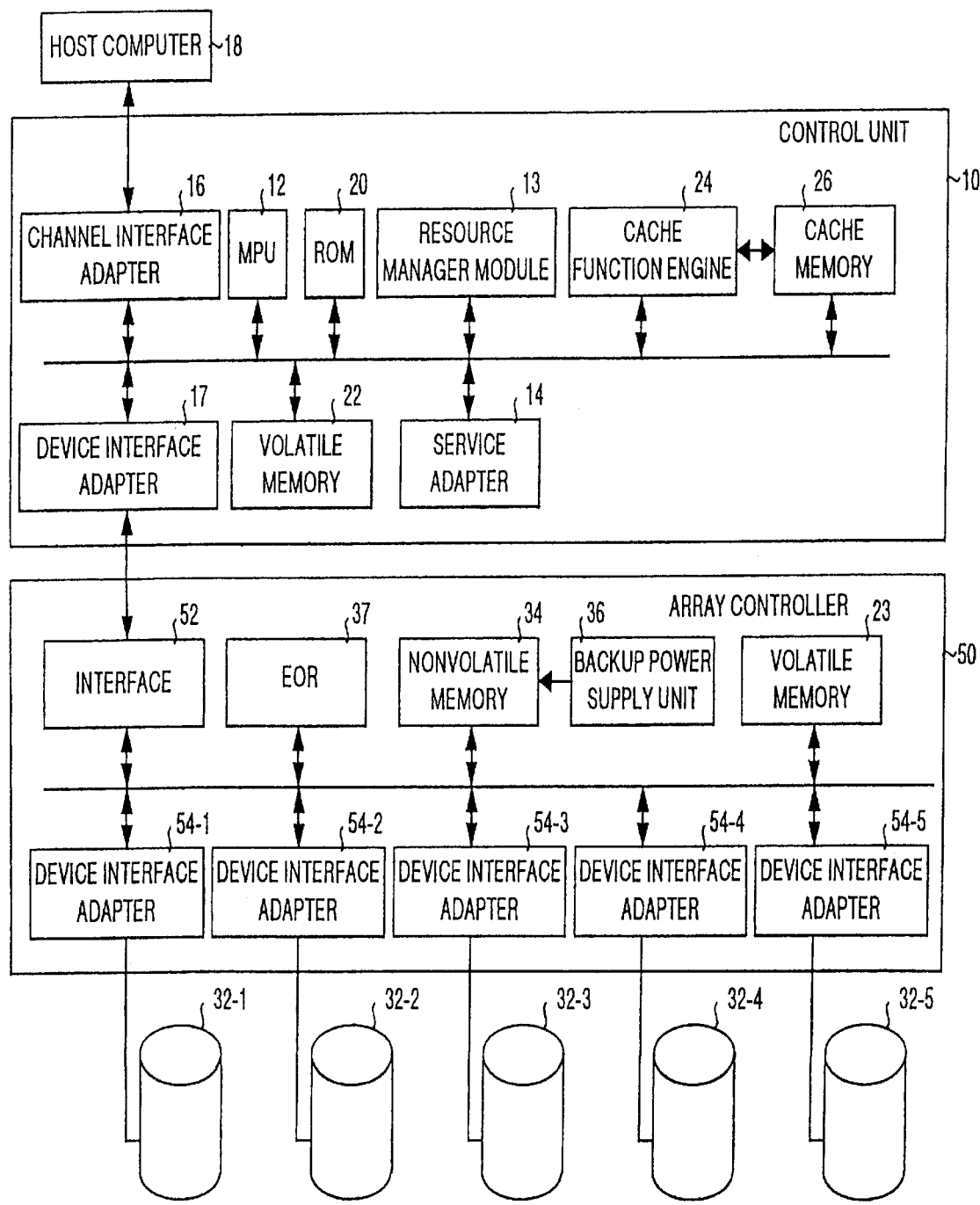
Figure 15:
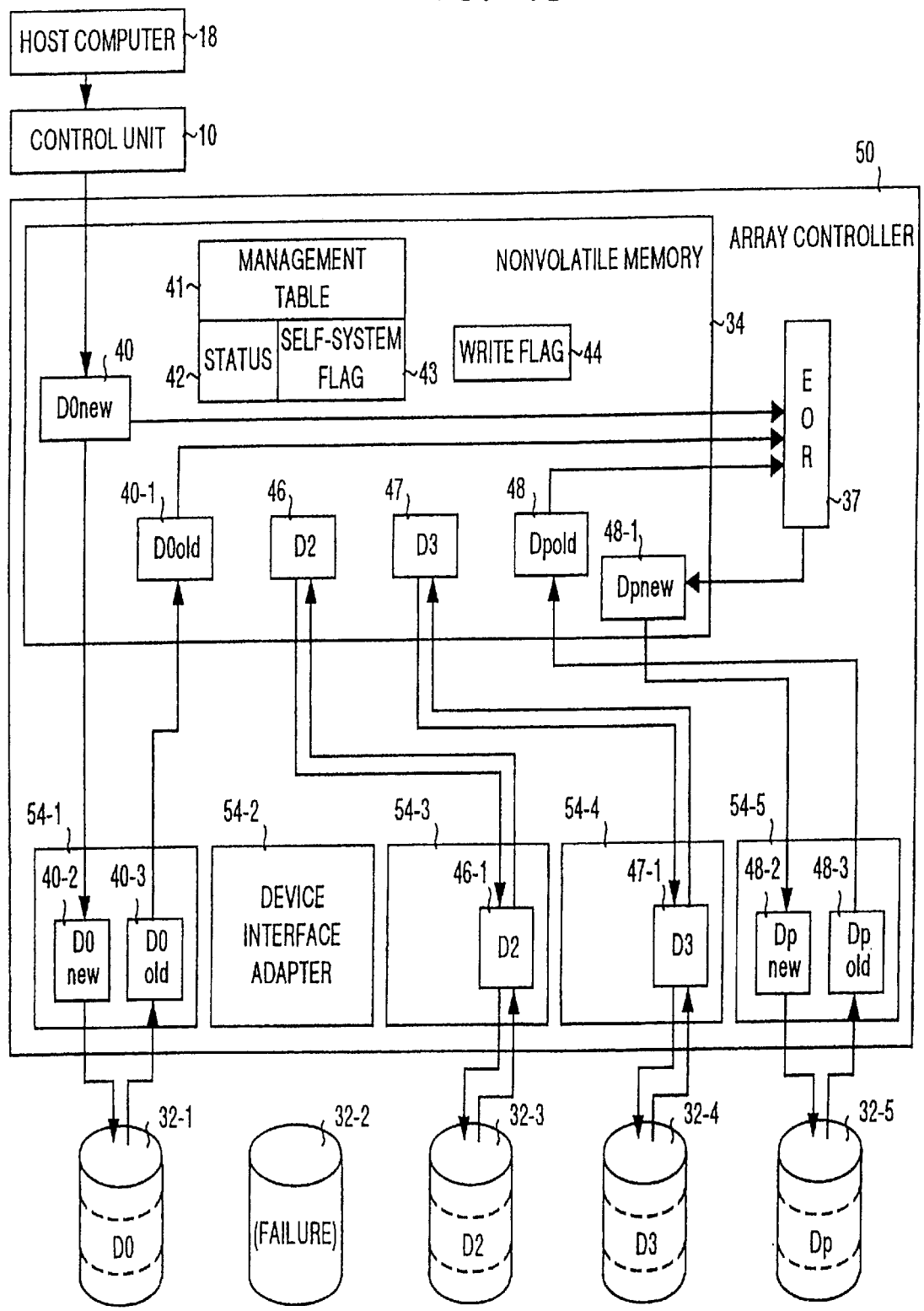
Figure 16:
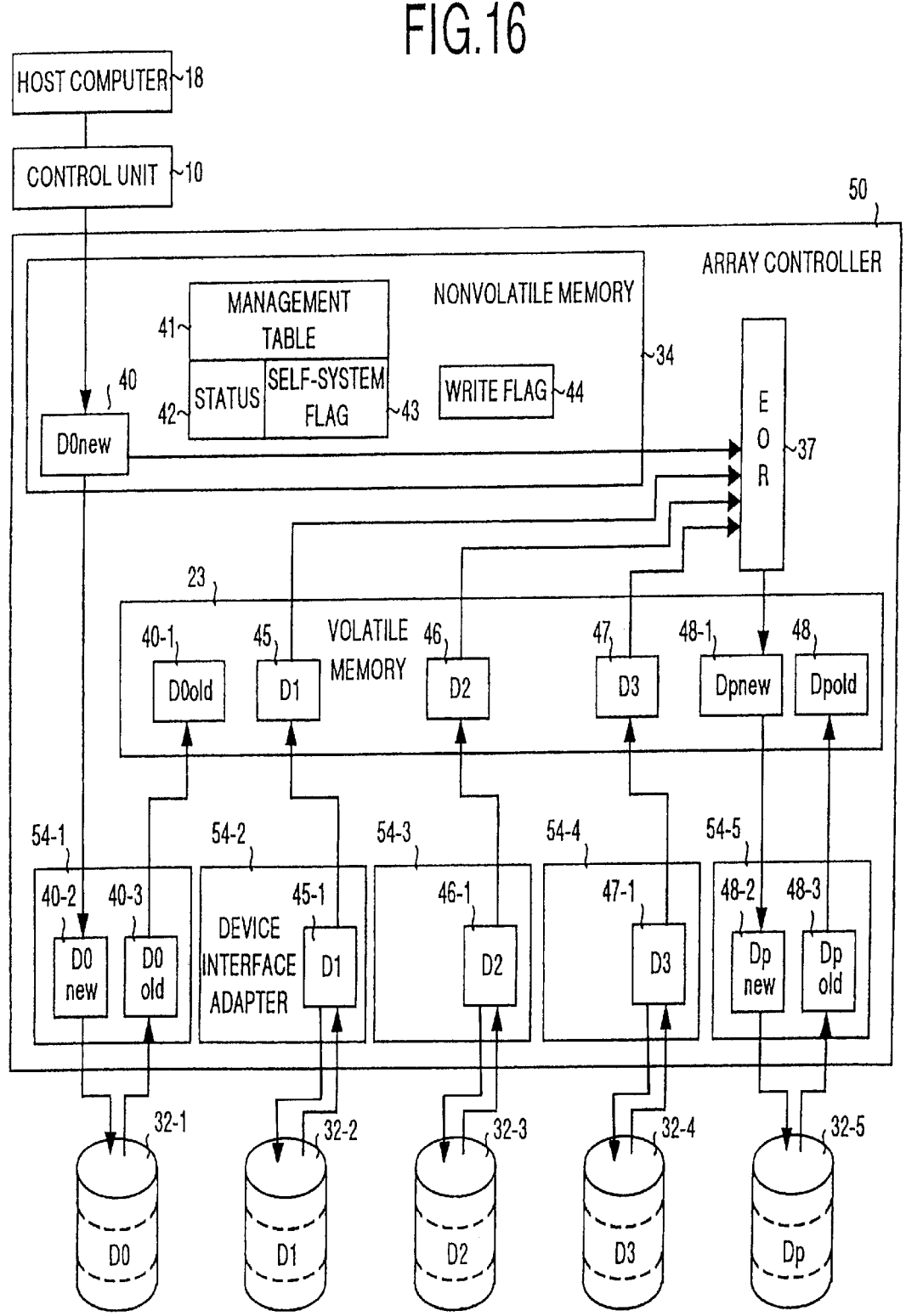
Figure 17:
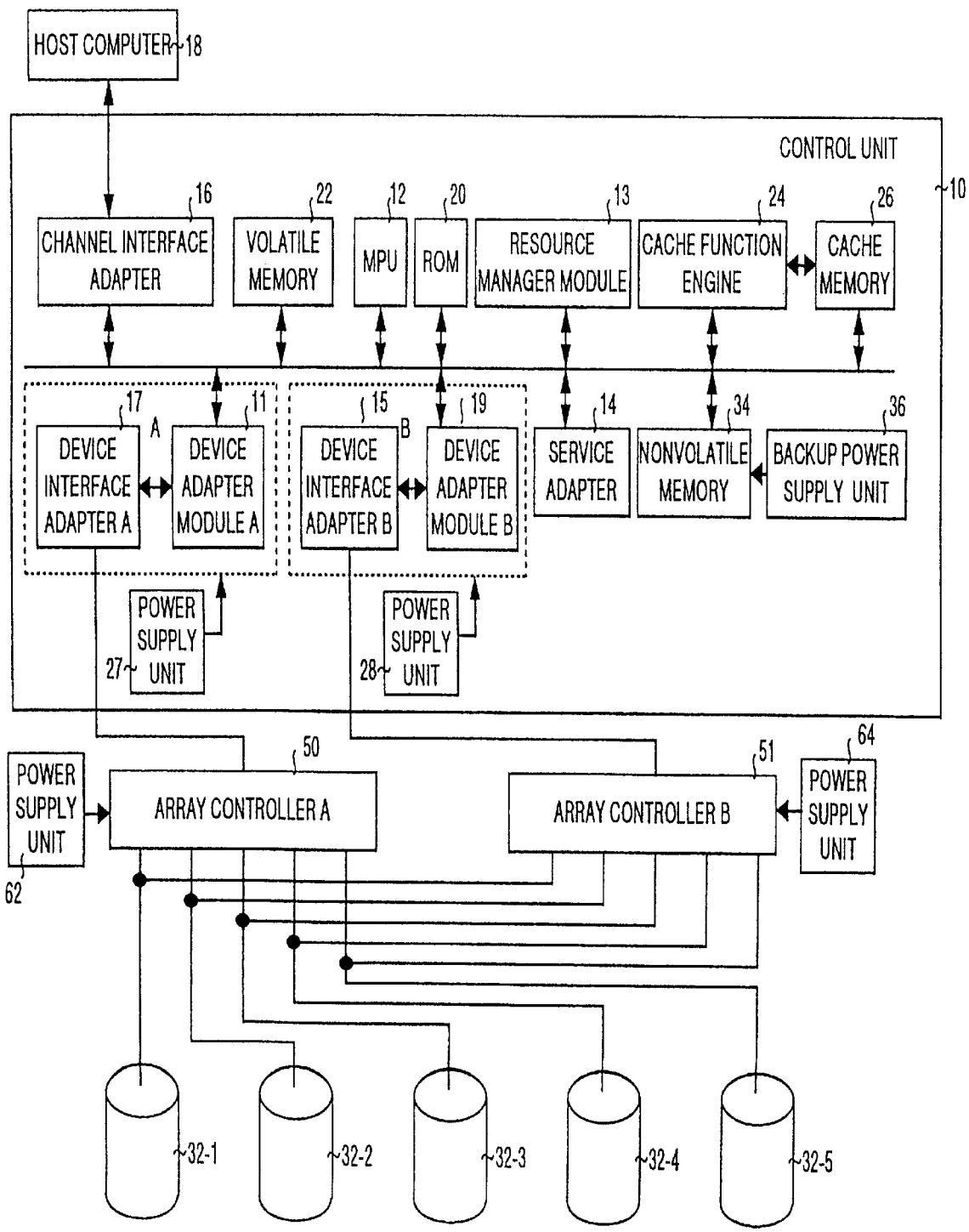
Figure 18:
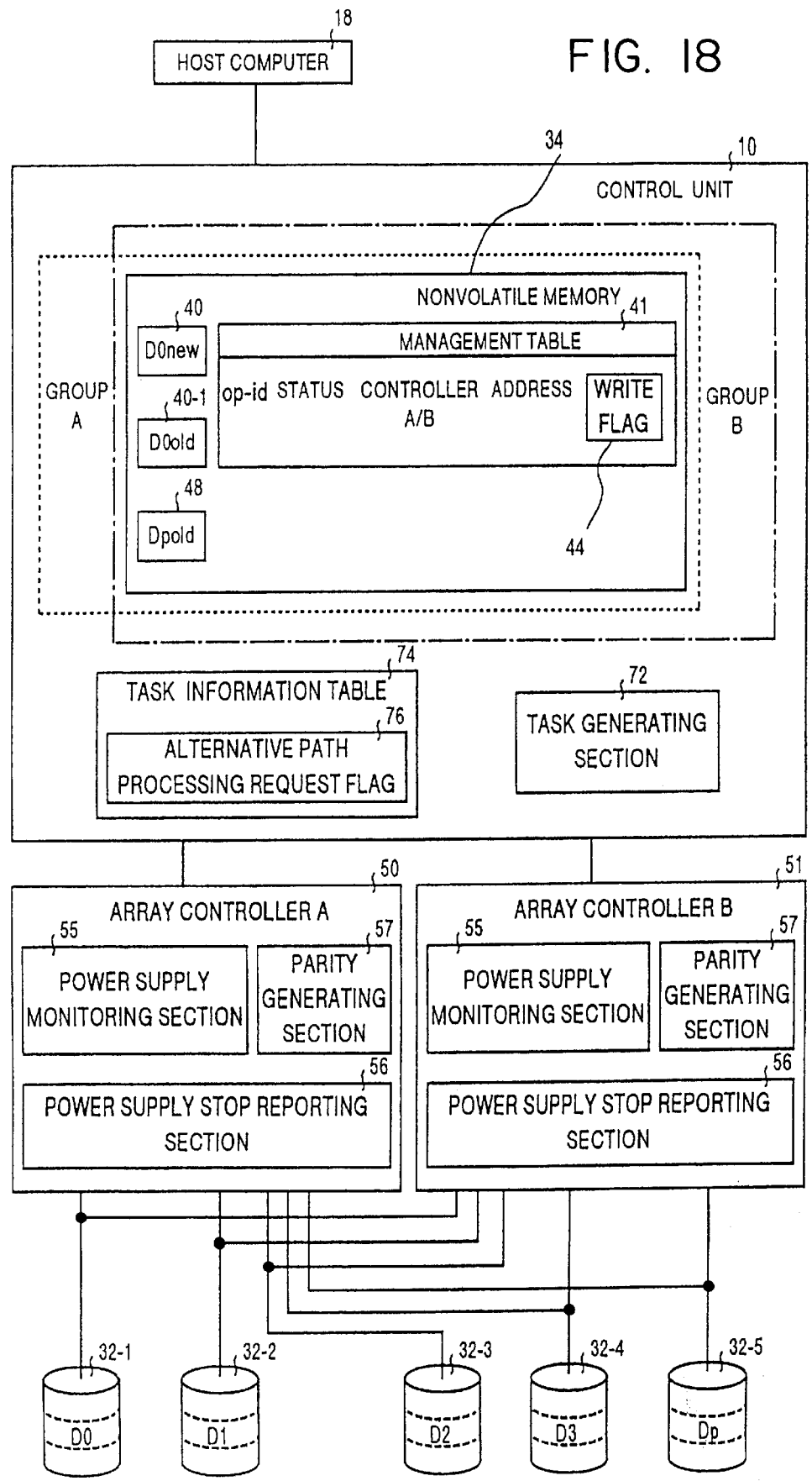
Figure 19B:
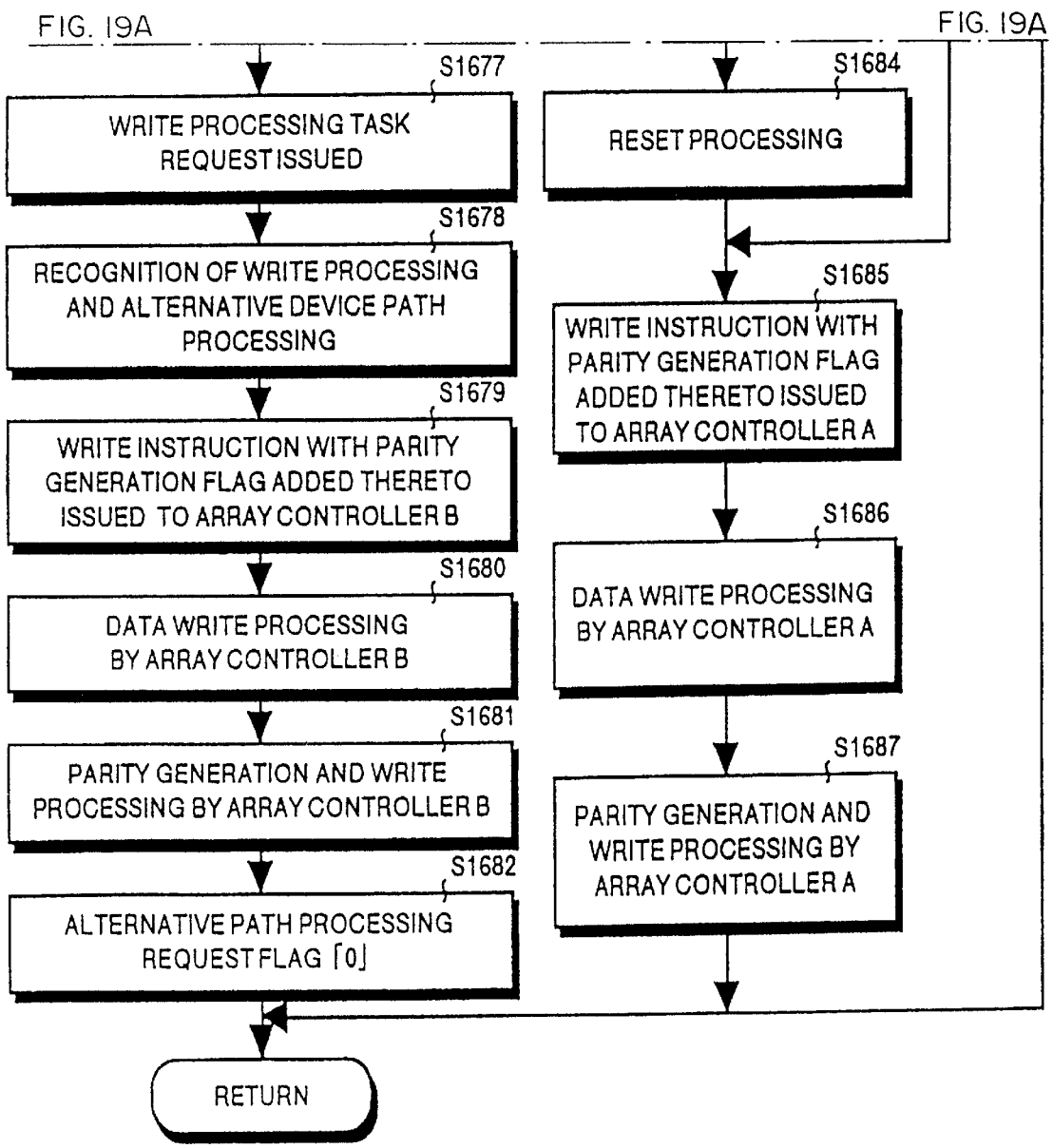
Figure 20:
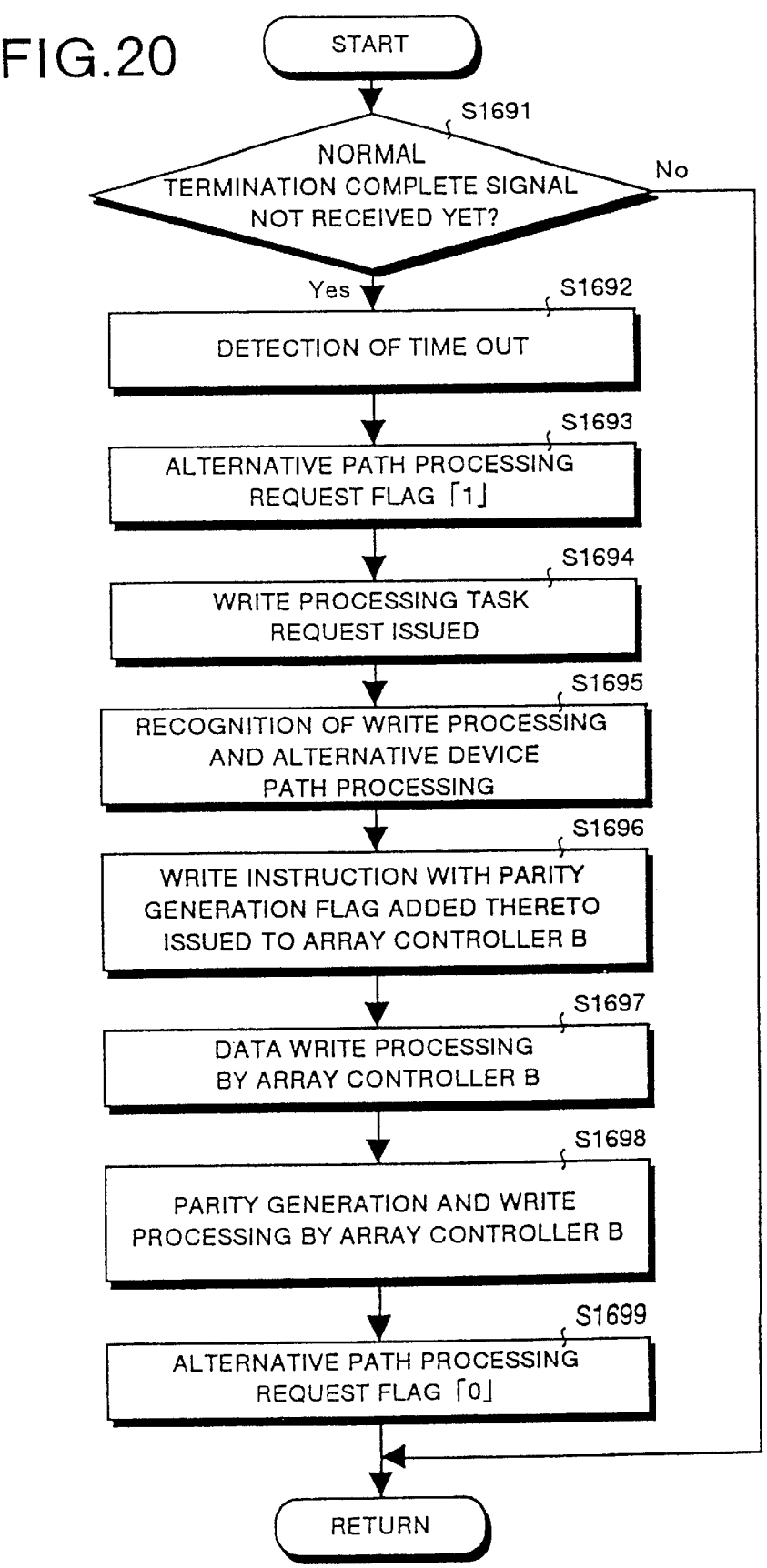
Figure 21:
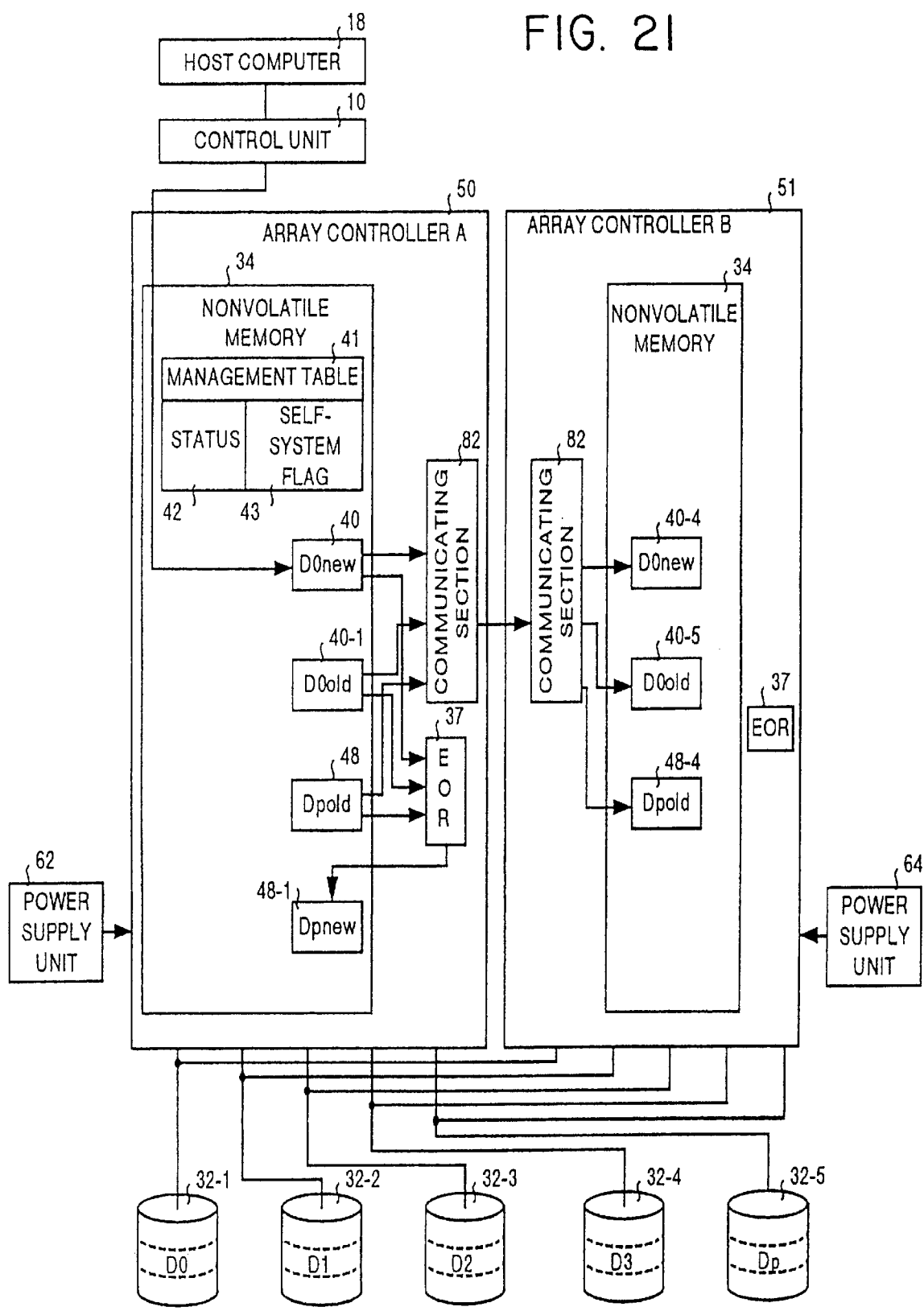
Figure 22:
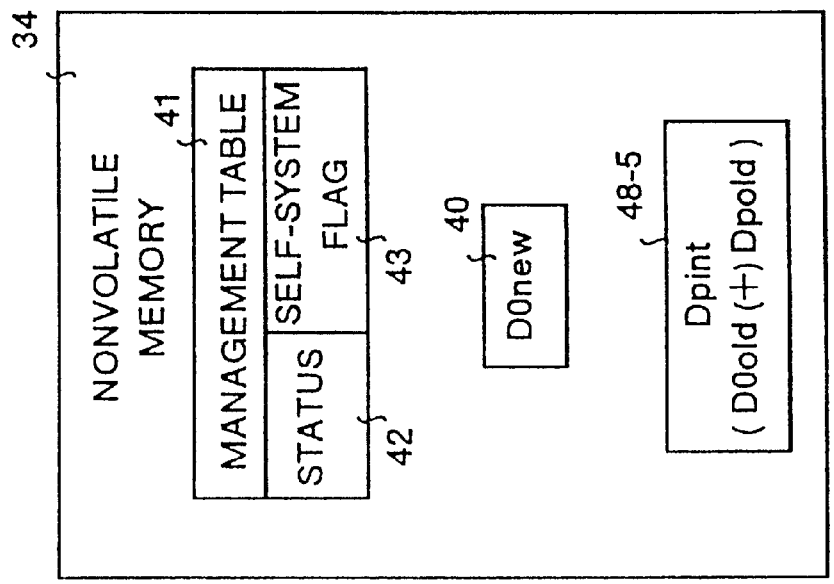
Figure 23:
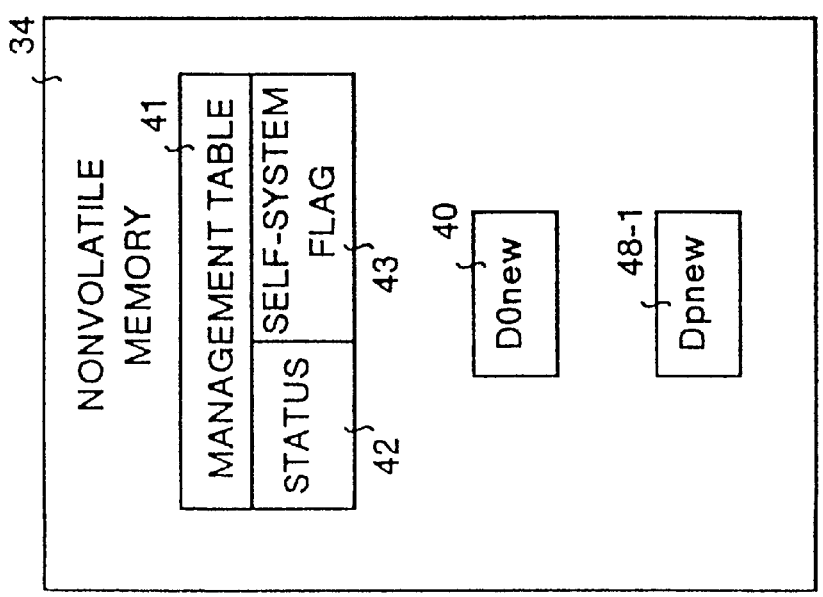
Figure 24:
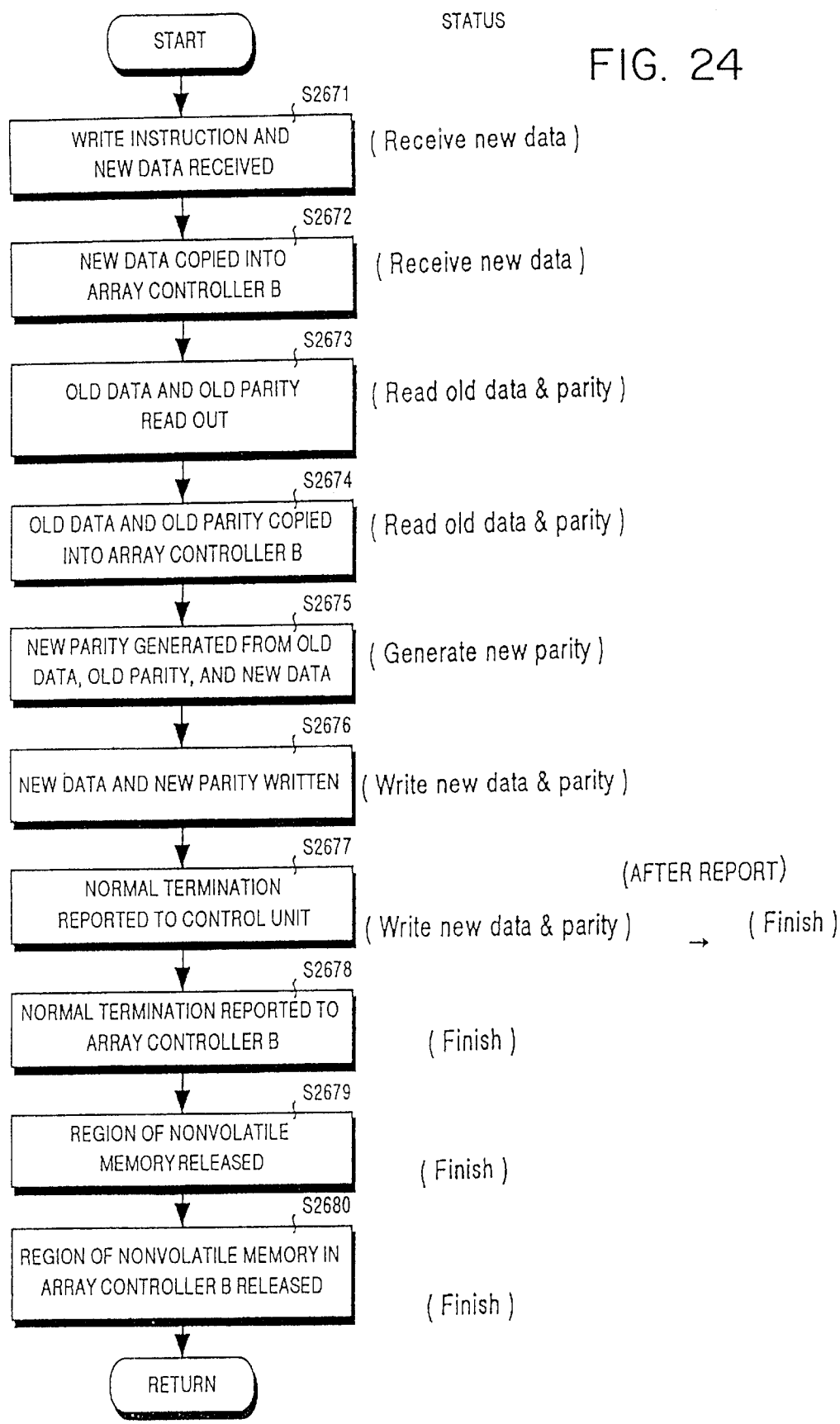
Figure 25:
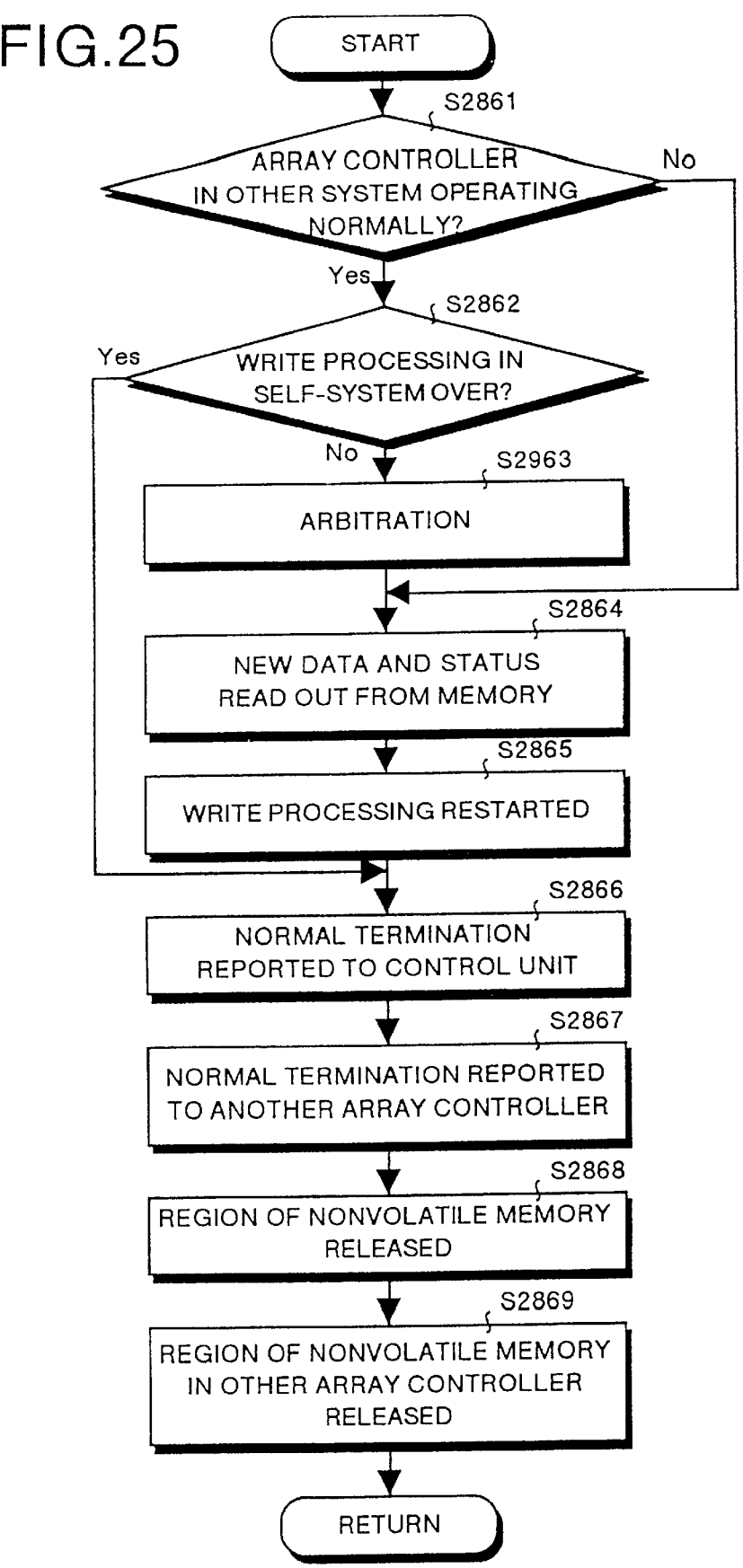
Figure 26:
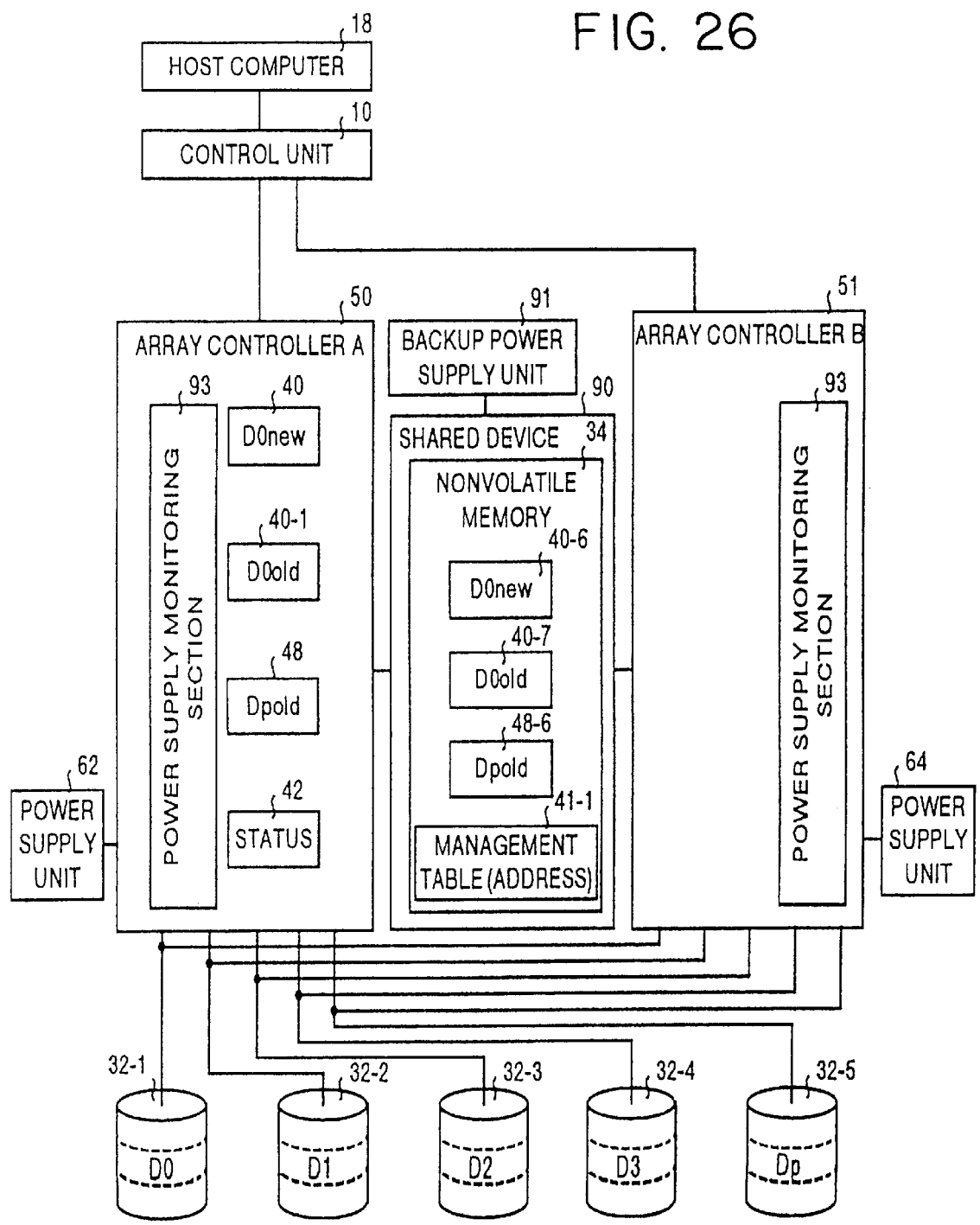
Figure 28:
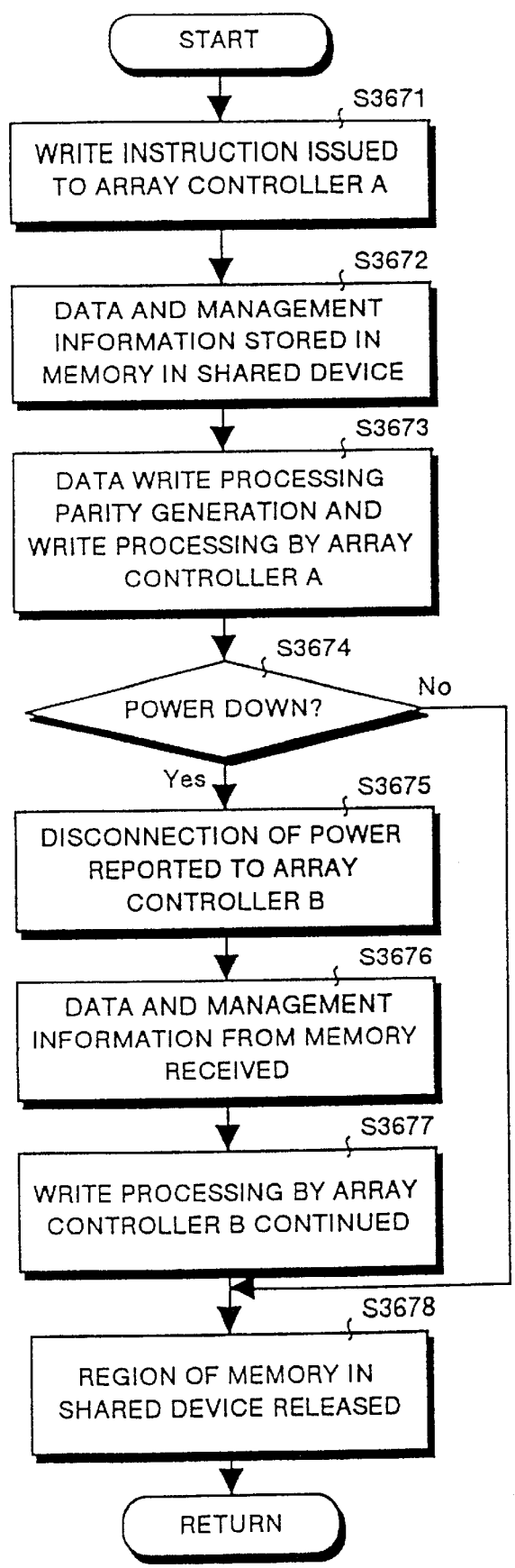
Figure 29:
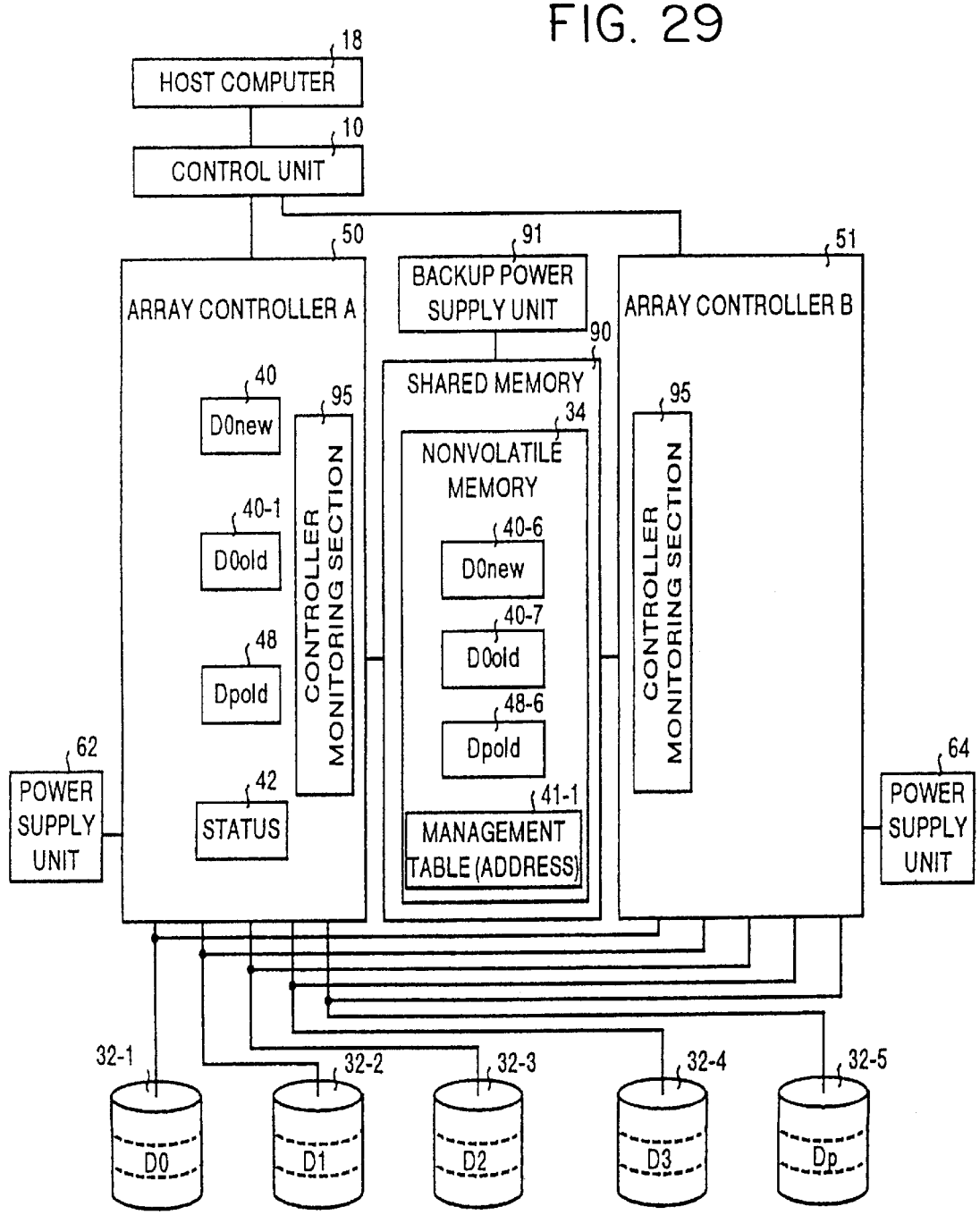
Figure 30:
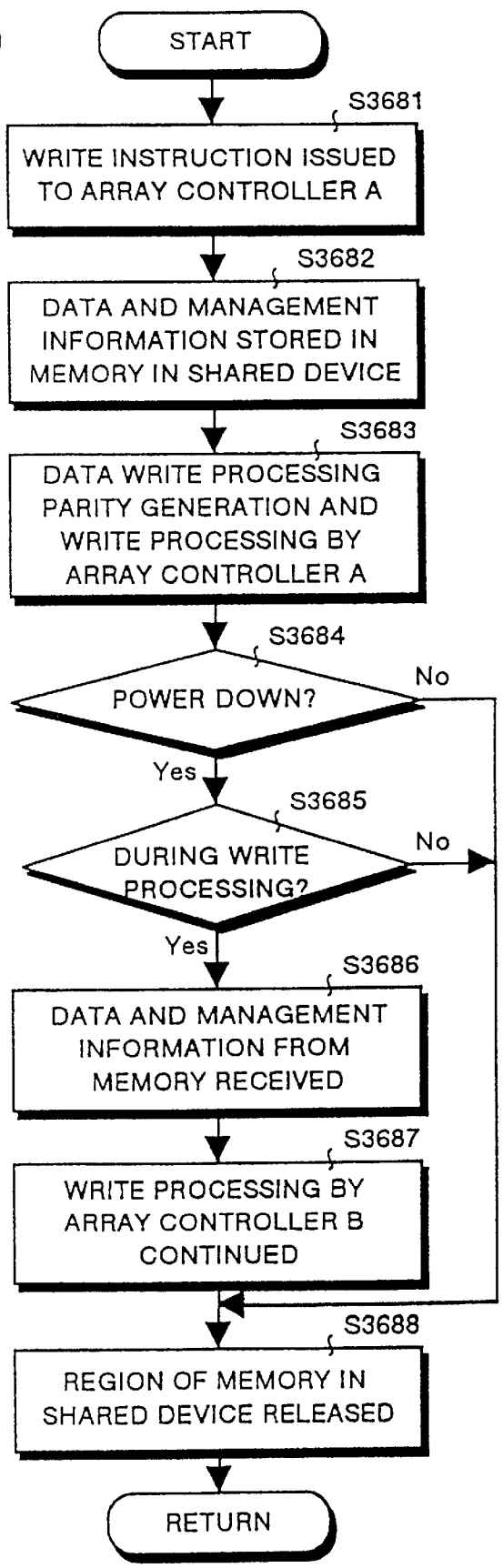
Figure 31:
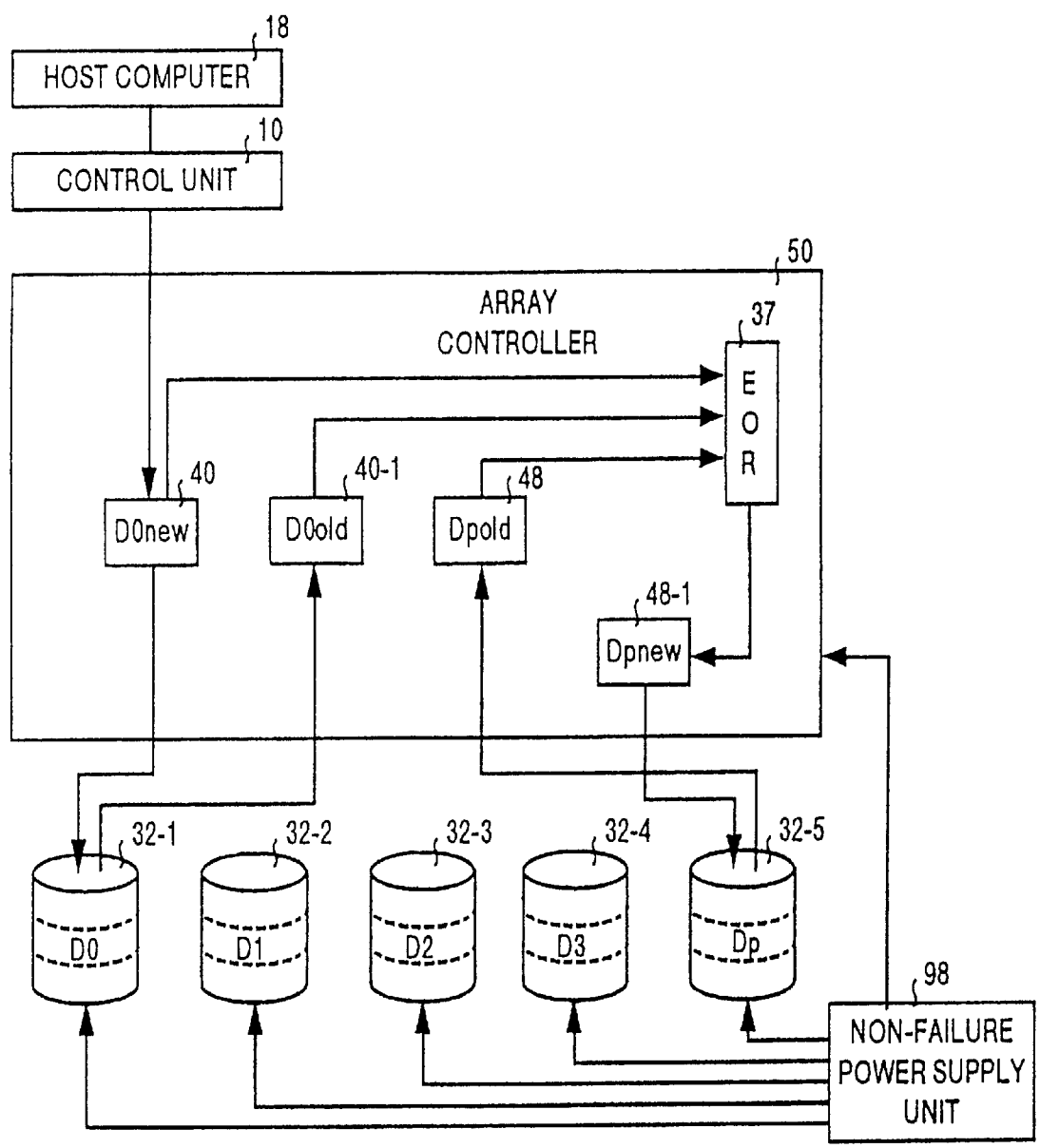
Figure 32:
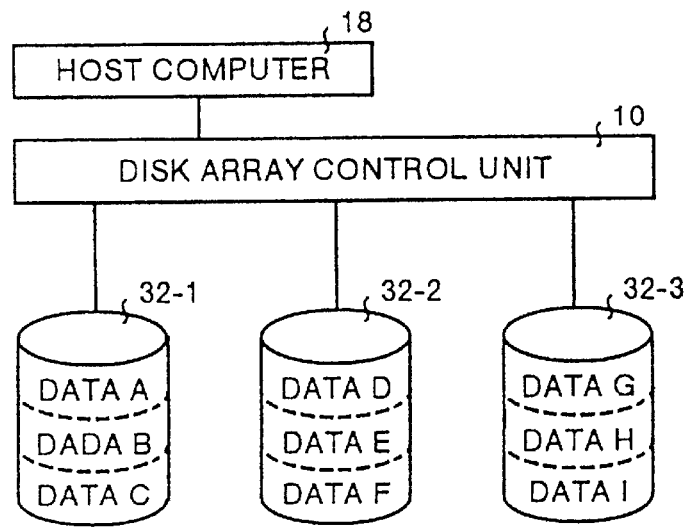
Figure 33:
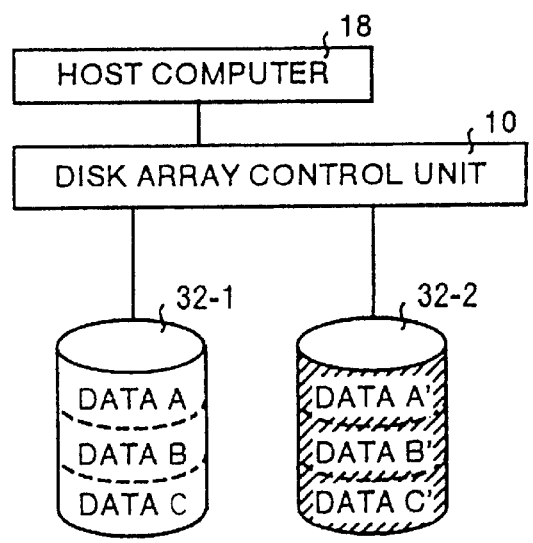
Figure 34:
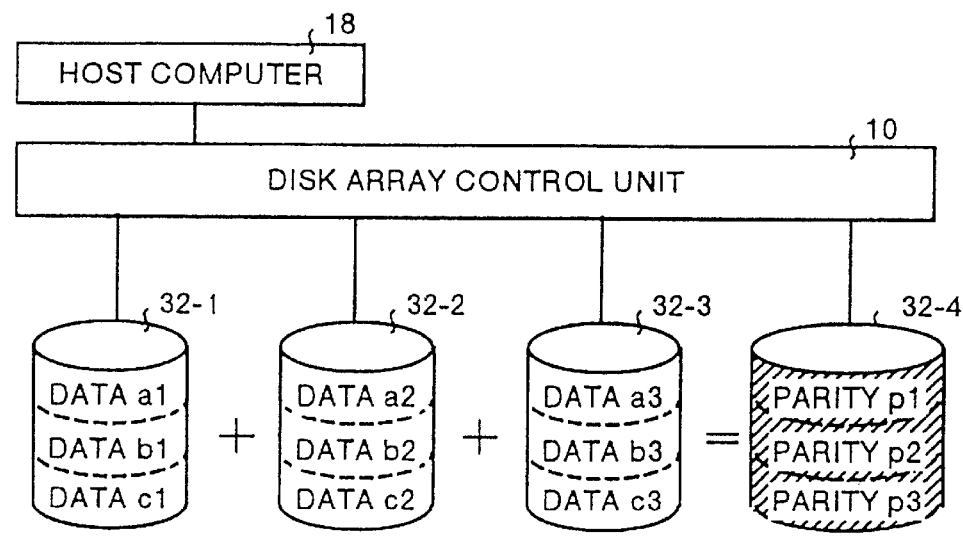
Figure 35:
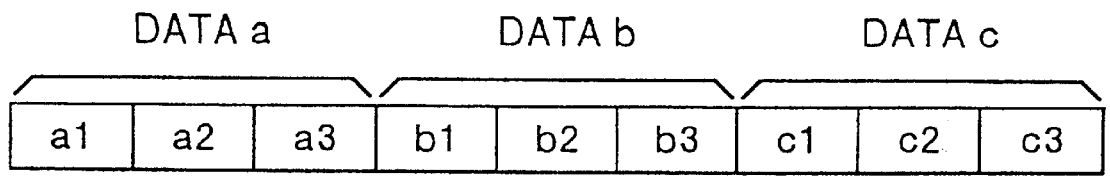
Figure 36:
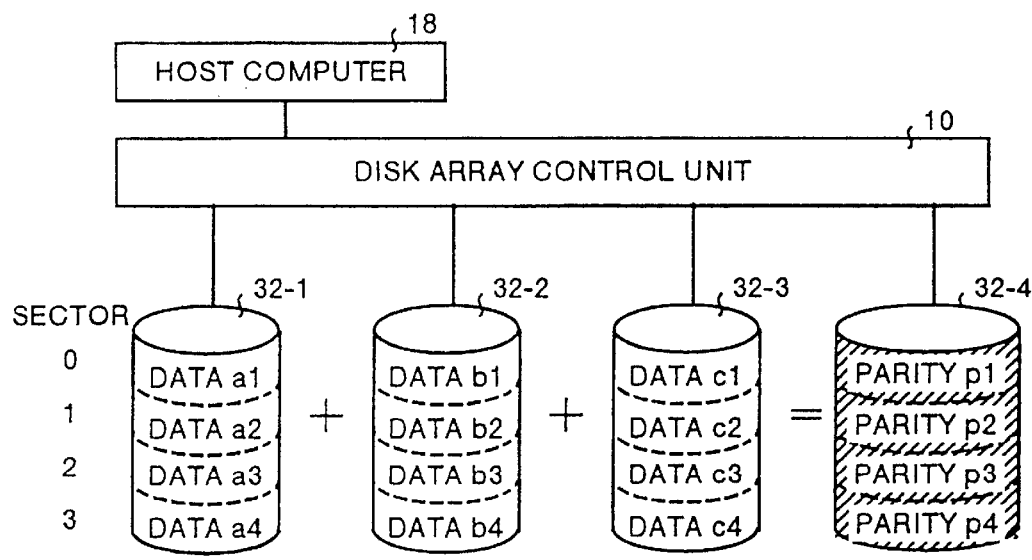
Figure 37:
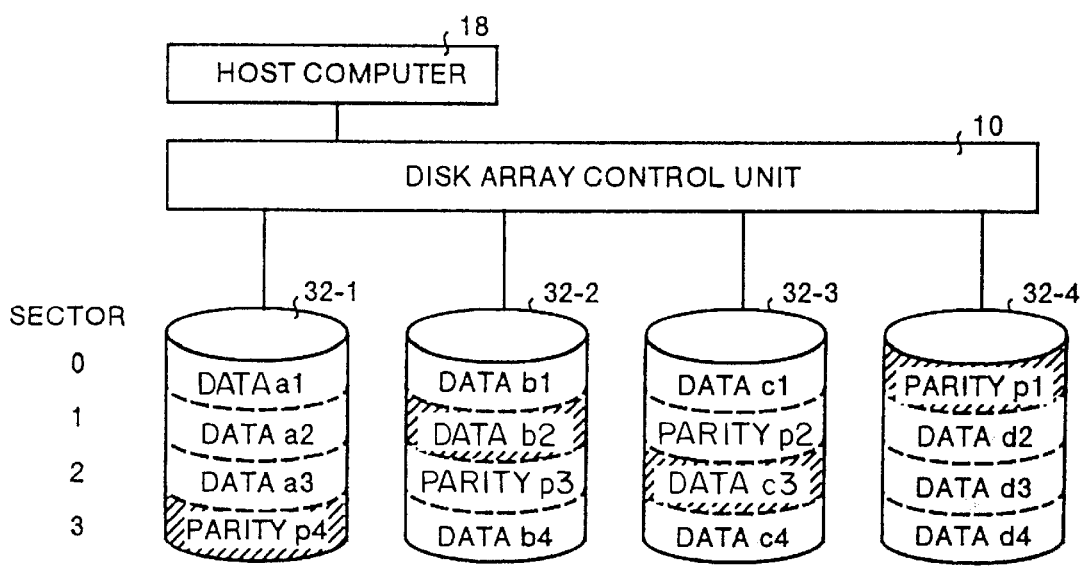
Figure 38:
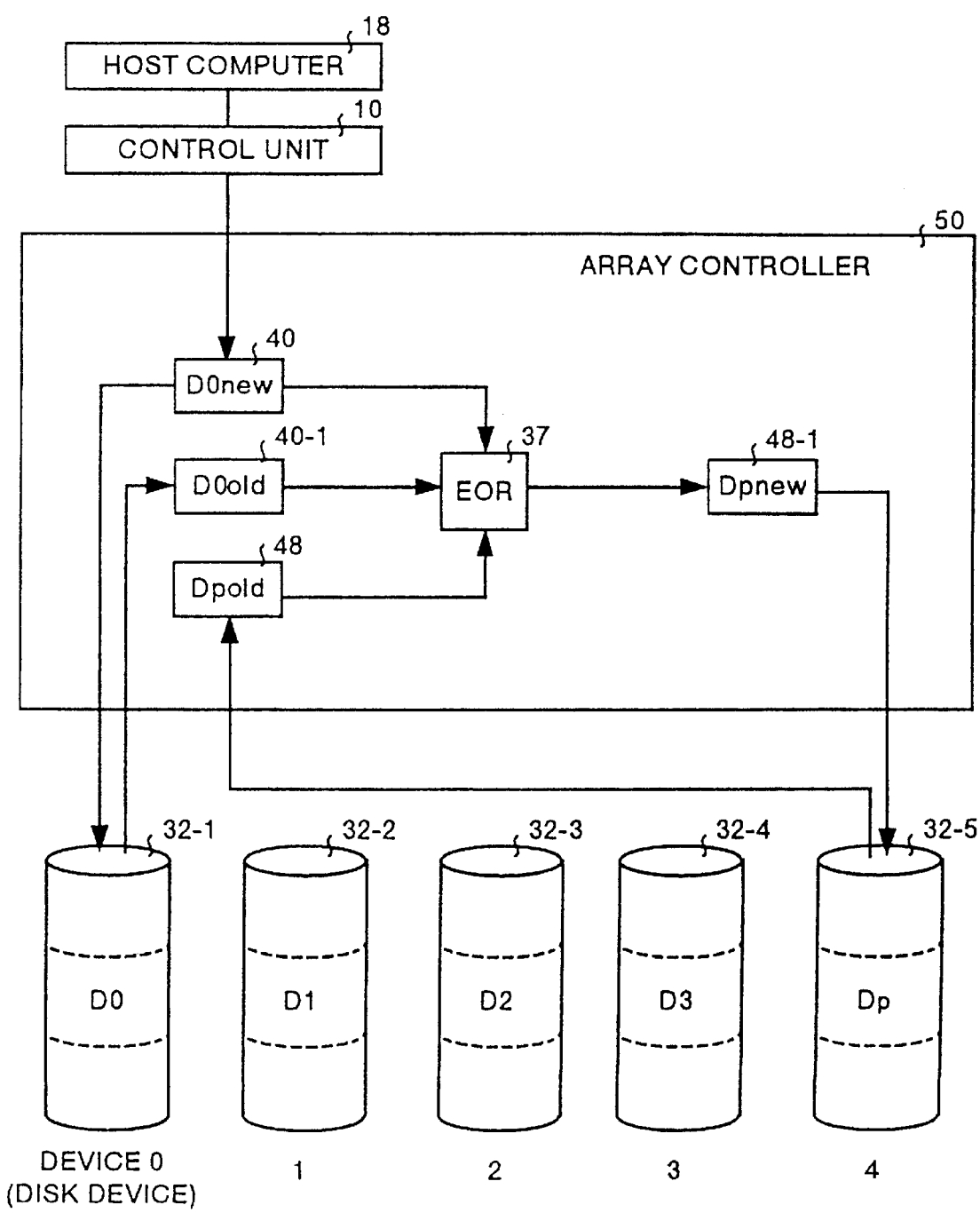
Figure 39:
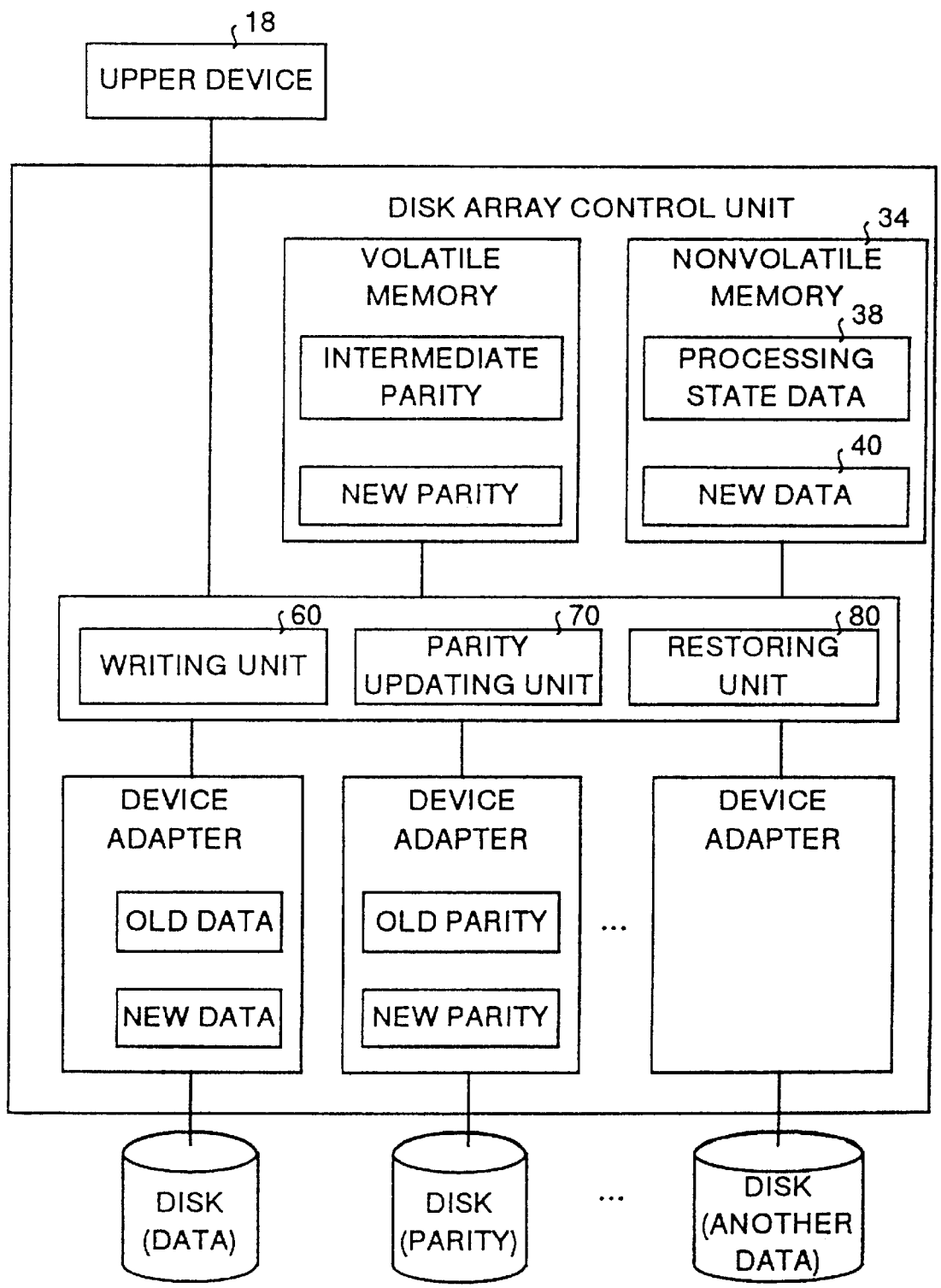

Fig; 10 is a flow chart showing details of recovery processing in Embodiment 1 of the present invention;

FIG. 11 is a flow chart showing details of recovery processing in NFT in Embodiment 1 of the disk array device according to the present invention;

FIG. 12 is a flow chart showing details of recovery processing in FT in Embodiment 1 of the disk array device according to the present invention;

FIG. 13 is a flow chart showing details of the data read-out processing in Embodiment 1 of the disk array device according to the present invention;

FIG. 14 is a block diagram showing Embodiment 2 of the disk array device according to the present invention;

FIG. 15 is a functional block diagram showing a case where one of disk devices in Embodiment 2 of the disk array device according to the present invention is faulty;

FIG. 16 is a functional block diagram showing a case where there is no faulty disk device in Embodiment 2 of the disk array device according to the present invention;

FIG. 17 is a block diagram showing Embodiment 3 of the disk array device according to the present invention;

FIG. 18 is a functional block diagram showing Embodiment 3 of the disk array device according to the present invention;

FIG. 19 is a flow chart showing details of write processing in Embodiment 3 of the disk array device according to the present invention;

FIG. 20 is a flow chart showing details of the processing in response to a write instruction to a disk device, issued before generation of an abnormality, to an array controller in which an abnormality has been generated in Embodiment 3 of the disk array device according to the present invention;

FIG. 21 is a functional block diagram showing Embodiment 4 of the disk array device according to the present invention;

FIG. 22 is a simulated view showing a case in which a management table, new data, and new parity are stored in a nonvolatile memory in Embodiment 4;

FIG. 23 is a simulated view showing a case in which a management table, new data, and intermediate parity are stored in a nonvolatile memory in Embodiment 4;

FIG. 24 is a flow chart showing details of write processing in Embodiment 4 of the disk array device according to the present invention;

FIG. 25 is a flow chart showing details of recovery processing in Embodiment 4 of the disk array device according to the present invention;

FIG. 26 is a functional block diagram showing Embodiment 5 of the disk array device according to the present invention;

FIG. 27 is a simulated view showing an example of contents of a management table stored in a nonvolatile memory in Embodiment 5;

FIG. 28 is a flow chart showing details of write processing in Embodiment 5 of the disk array device according to the present invention;

FIG. 29 is a functional block diagram showing a variant of Embodiment 5 of the disk array device according to the present invention;

FIG. 30 is a flow chart showing details of write processing in the variant of Embodiment 5;

FIG. 31 is a functional block diagram showing Embodiment 6 of the disk array device according to the present invention;

FIG. 32 is an explanatory view showing a disk array device according to RAID 0;

FIG. 33 is an explanatory view showing a disk array device according to RAID 1;

FIG. 34 is an explanatory view showing the disk array device according to RAID 3;

FIG. 35 is an explanatory view showing data division according to RAID 3;

FIG. 36 is an explanatory view showing a disk array device according to RAID 4;

FIG. 37 is an explanatory view showing the disk array device according to RAID 5;

FIG. 38 is an explanatory view showing a sequence for rewriting data according to RAID 5; and FIG. 39 is a functional block diagram of a disk array device according to a previous invention and applied by the present inventors.

DESCRIPTION OF THE PREFERRED EMBODIMENT

Next, a detailed description is provided for embodiments of the disk array device according to the present invention with reference to FIG. 2 to FIG. 31.

Figure 2:
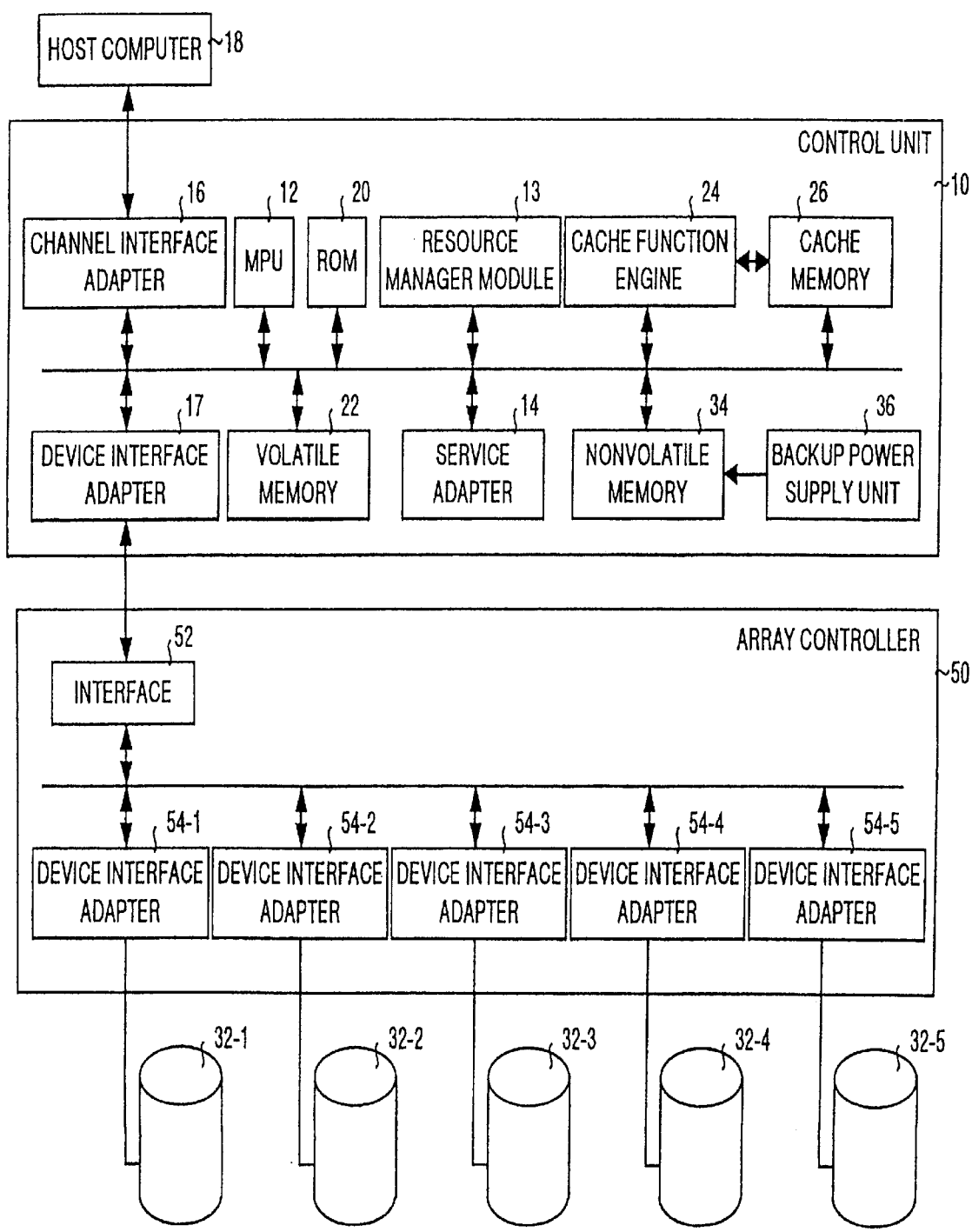
FIG. 2 is a block diagram showing Embodiment 1 of the disk array device according to the present invention.

FIG. 2 is a block diagram showing Embodiment 1 of a disk array device according to the present invention. In FIG. 2, provided in a control unit 10 is a microprocessor (described as MPU hereinafter) 12. Connected to an internal bus of this MPU 12 are a ROM 20 in which control program or specified data is stored, a volatile memory 22 using a RAM, a cache memory 26 provided via a cache function engine 24, a nonvolatile memory 34 operable even during power failure because of a backup power supply unit 36, a resource manager module 13 managing internal resources or internal jobs, and. a service adapter 14 for managing the hardware environment.

Also, a channel interface adapter 16 is provided in the control unit 10, and a host computer 18 functioning as an upper device is connected via the adapter 16 to the control unit 10. Further, a device interface adapter 17 is provided in the control unit 10, and an array controller 50 controlling a plurality (for instance, 5 units in FIG. 2) of disk devices 32-1, 32-2, 32-3, 32-4, and 32-5 is connected via the adapter 17 to the control unit 10.

Provided in the array controller 50 are an upper interface 52 connected to the device interface adapter 17 in the control unit 10, and a plurality (for instance, 5 units in FIG. 2) of device interface adapters 54-1, 54-2, 54-3, 54-4, and 54-5 functioning as lower interfaces with a plurality of disk devices 32-1 to 32-5 connected thereto.

Of the 5 disk devices 32-1 to 32-5, for instance, 4 of the disk devices are used for storage of data, and one disk device is used for parity. In the disk array device according to the present invention, the same function as that of the RAID 4 type of disk array device shown in FIG. 36 or the RAID 5 type of disk array device shown in FIG. 37 is realized so that, for the RAID 4 type of disk array device, for example, disk devices 32-1 to 32-4 are used for storage of data, while the disk device 32-5 is used for parity. On the other hand, for the RAID 5 type of disk array device, any one of the disk devices 32-1 to 32-5 is not dedicated for parity, although one disk device stores therein data having the same format in batch, and the disk devices are successively used as disk devices for storage of parity according to a pre-specified sequence of data access.

Figure 3:
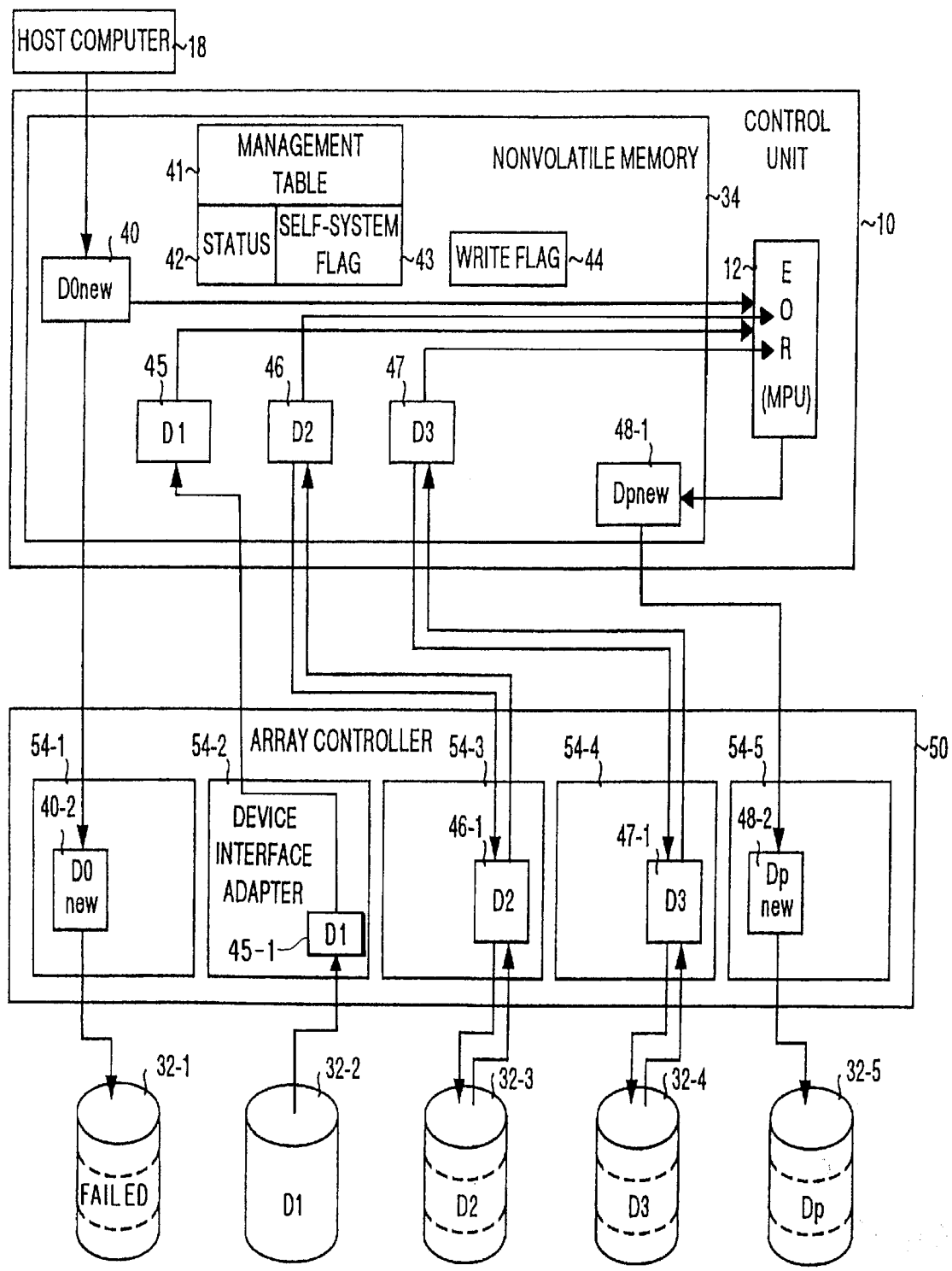
FIG. 3 is a functional block diagram showing a case where one of the disk devices in Embodiment 1 of the disk array device according to the present invention is faulty.
Figure 4:
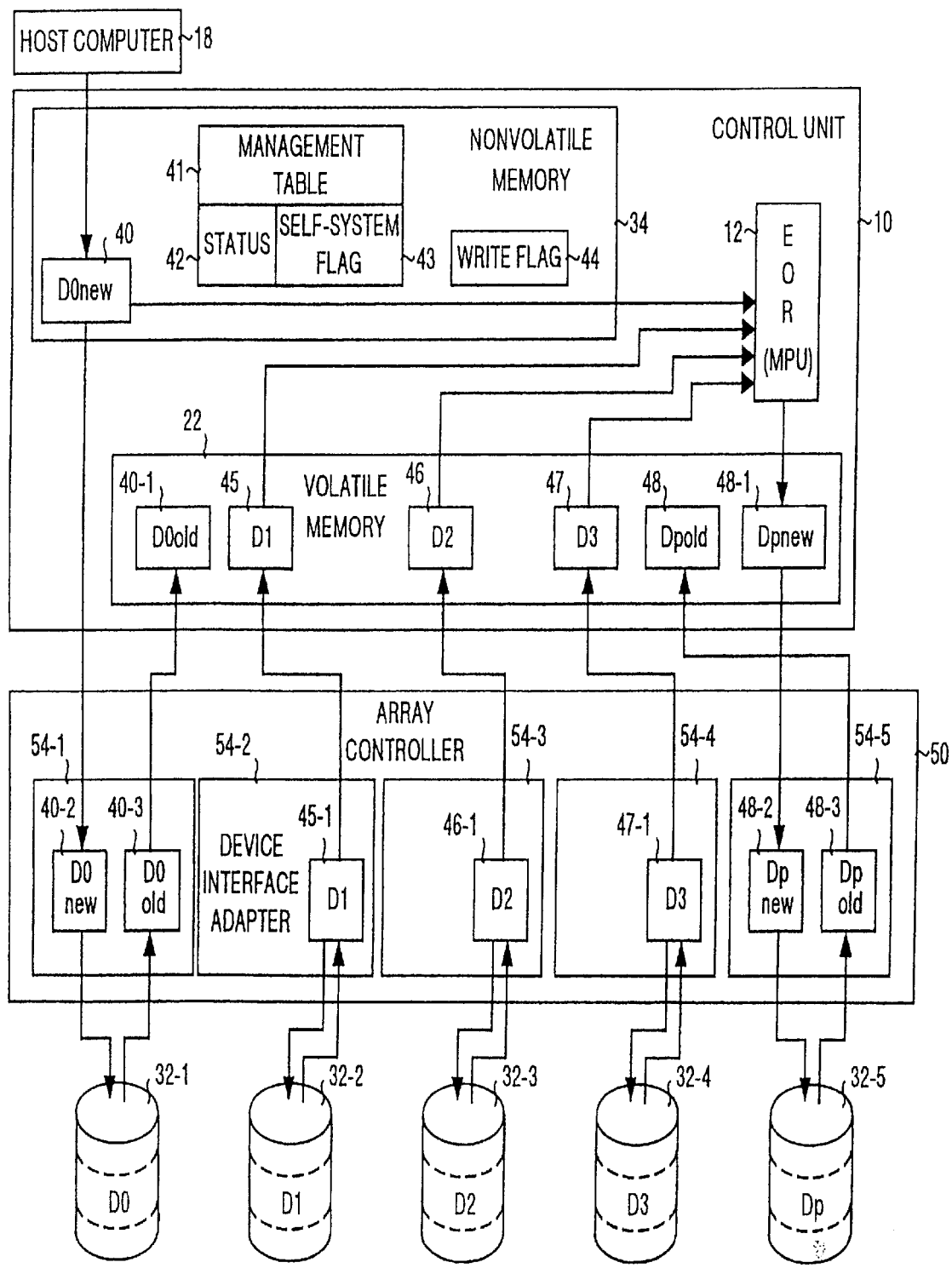
FIG. 4 is a functional block diagram showing a case where no disk device in Embodiment 1 of the disk array device according to the present invention is faulty.

FIG. 3 and FIG. 4 are functional block diagrams showing the disk array device according to Embodiment 2. FIG. 3 shows a case where the specified disk device is faulty, and FIG. 4 shows a case where all the disk devices are functioning properly.

FIG. 3 and FIG. 4 assume that disk device 32-5 is used as a disk device for parity. If the disk device 32-5 is a RAID 4 type of disk device, the disk device 32-5 is used only for storage of parity, and for a RAID 5 type of disk device, the disk device 32-5 is used for storage of parity according to a specified sequence of data access.

When updating data (D0 old) in the specified disk device 32-1 to new data (D0 new) while the specified disk device 32-1 is faulty, as shown in FIG. 3, stored in a nonvolatile memory 34 in the control unit are new data (D0 new) transferred from the host computer 18, a management table 41 showing progress of the write processing or the like, a write flag 44 indicating that an operation for writing is being executed, data (D1, D2, D3) 45, 46, 47 read out from the other disk devices 32-2 to 32-4, and new parity (Dp new) 48-1 computed through exclusive-OR (EOR) among the new data (D0 new) and the other data (D1, D2, D3).

The processing for generating new parity (Dp new) 48-1 is executed in a parity generating unit 116 (Refer to FIG. 1) in the special write executing unit 110. It should be noted that, the special write executing unit 110 is realized with the MPU 12 shown in FIG. 2.

To prevent generation of data loss, the special data write processing is executed. Namely, the new data (D0 new) 40 and new parity (Dp new) 48-1 stored in the nonvolatile memory 34 are sent to and stored in device interface adapters 54-1 and 54-5, respectively, in the array controller 50.

The new data (D0 new) 40-2, other data (D2, D3) 46-1, 47-1, and new parity (Dp new) 48-2 stored in the device interface adapters 54-1, 54-3, 54-4, 54-5 are concurrently written in the disk devices 32-1, 32-3, 32-4, 32-5. The processing for overwriting the new data (D0 new) in the disk device 32-1, to which the write processing is specified, is executed by the data write unit 113 in the special write executing unit 110.

A stage (status) of the write processing 42 and a self-system flag 43 indicating, when a plurality of array controllers are provided, whether the write processing is being executed by the system or by any other system, are stored in the management table 41.

Computing for exclusive-OR is executed, for instance, by the MPU 12.

When data (D0) in the specified disk device 32-1 is to be updated to new data (D0 new) when all the disk devices 32-1, 32-2, 32-3, 324, and 32-5 are functioning properly, as shown in FIG. 4, the new data (D0 new) 40 transferred from the host computer 18, the management table 41 showing a status of the write processing, and the write flag 44 indicating that the write processing is being executed are stored in the nonvolatile memory 34 of the control unit 10.

Also, stored in the volatile memory 22 of the control unit 10 are old data (D0 old) 40-1 read out from the disk device 32-1 and old parity (Dp old) read out from the disk device for parity 32-5.

In this case, ordinary write processing is executed. Namely, the new data (D0 new) stored in the nonvolatile memory 34 are sent to and stored in the device interface adapter 54-1 of the array controller 50, and the stored new data (D0 new) 40-2 are written in the disk device 32-1.

Computing for exclusive-OR (EOR) is executed in the MPU 12 depending on the new data (D0 new) 40 stored in the nonvolatile memory 34 and old data (D0 old) stored in the volatile memory 22, and old parity (Dp old) 48 also stored in the volatile memory 22 to obtain new parity (Dp new) 48-1, and the new parity (Dp new) 48-1 is stored in the volatile memory 22 in the control unit 10. This new parity (Dp new) 48-1 is stored in the device interface adapter 54-5 of the array controller 50, and the stored new parity (Dp new) 48-2 is written in the disk device 32-5.

When write processing that does not finish in the normal state is to be restored, the new data (D0 new) stored in the nonvolatile memory 34 is written via the device interface adapter 54-1 of the array controller 50 in the disk device 32-1. Also because the write processing was not finished in the normal state, old data (D0 old) and old parity (Dp old) have not been updated yet, and for this reason data (D1, D2, D3) are read out from the disk devices 32-2, 32-3, and 32-4 and stored in the device interface adapters 54-2, 54-3, and 54-4 to generate new parity (Dp new).

The data (D1, D2, D3) 45-1, 46-1, 47-1 stored as described above are sent to and stored in the volatile memory 22 in the control unit 10. And, new parity (Dp new) 48-1 is obtained from the data (D1, D2, D3) 45, 46, 47 stored in the volatile memory 22 and new data (D0 new) stored in the nonvolatile memory 34, and is written via the device interface adapter 54-5 of the array controller 50 in the disk device 32-5.

FIG. 5 shows an example of contents stored in the management table 41, which is stored in the nonvolatile memory 34. As shown in the figure, the items "op-id", "status" (corresponding to the status 42 in FIG. 3 and FIG. 4), "self system/another system" (corresponding to the self-system flag 43 in FIG. 3 and FIG. 4), and "address" are stored in the management table 41.

The term "op-id" is an identifier for controlling write processing by the array controller 50. The term "status" indicates to which state the write processing has progressed. The term "self system/another system" indicates, where there are provided a plurality of array controllers, whether the controller having executed the processing shown in the status is in the system or in another system. The term "address" indicates a site for storage of data or parity stored in the nonvolatile memory 34.

Figure 6:
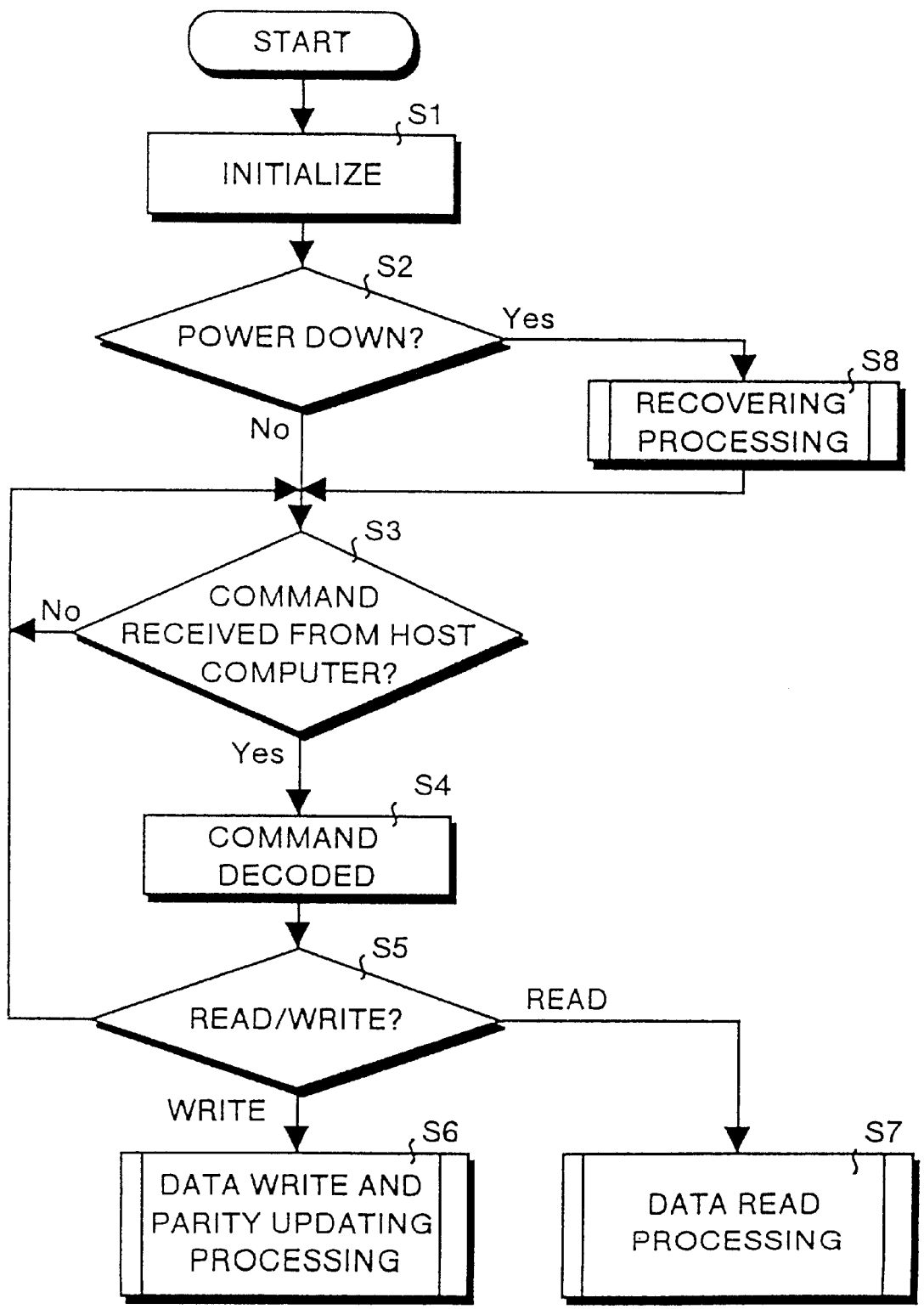
FIG. 6 is a flow chart showing a general flow of operations in Embodiment 1 of the disk array device according to the present invention.

FIG. 6 is a flow chart showing the entire operating sequence in the disk array device shown in FIG. 3 and FIG. 4. In FIG. 6, when power for the disk array device is turned ON, a prespecified operation for initialization is executed according to the initial program routine (IPL) in step S1, and then a check to determine whether power down has occurred is executed in step S2. When system control is started upon logging-on after the power is turned OFF by means of an ordinary operation for logging off, it is determined that power down has not occurred, with the system control shifted to step S3, and reception of a command from the host computer 18 is awaited.

When a command is received from the host computer 18 in step S3, system control shifts to step S4, where the command is decoded. When a demand for write access is detected in step S5, system control shifts to step S6 to execute data write and parity updating. On the other hand, when a demand for read access is detected in step S5, system control shifts to step S7 to execute data read.

However, when system control is started upon power ON and it is determined in step S2 that power down has occurred, the processing for recovery is executed in step S8, and then the ordinary operating sequence from step S3 and on is executed. The program for executing this operating sequence is stored in a ROM 20 (Refer to FIG. 2) in the control unit 10, and the program is executed by the MPU 12 (Refer to FIG. 2).

Figure 7:
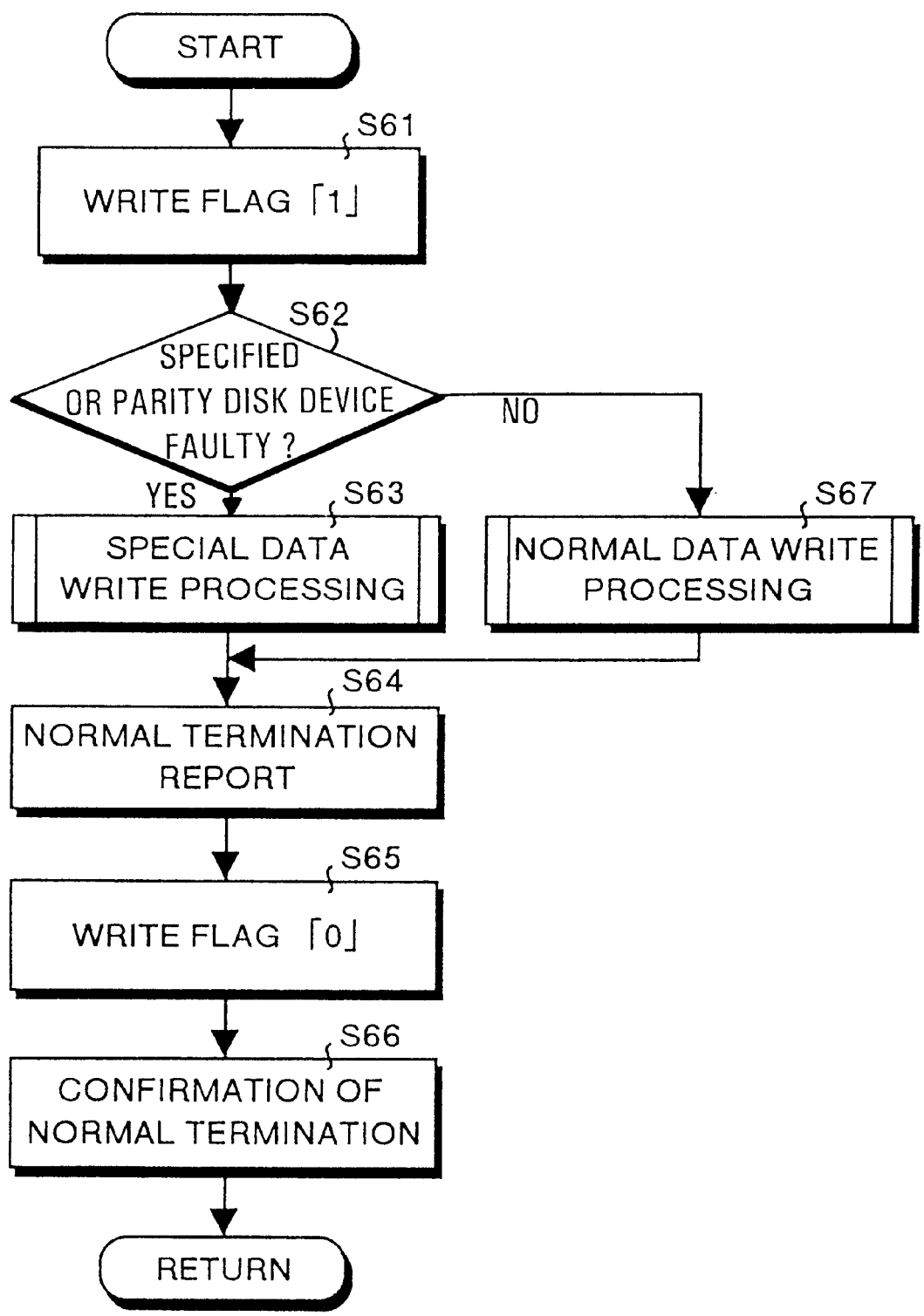
FIG. 7 is a flow chart showing details of the processing for writing data as well as for updating parity in Embodiment 1 of the disk array device according to the present invention.

FIG. 7 is a flow chart showing details of the data write processing and parity updating shown in step S6 in FIG. 6. In FIG. 7, when a write command is received from the host computer 18, at first the write flag 44 is prepared in step S61 in the nonvolatile memory 34 in the control unit 10. Then system control shifts to step S62, and an operating state of all the disk devices 32-1, 32-2, 32-3, 32-4, and 32-5 is checked.

If either one of the specified disk device and the parity disk device is faulty (for instance, the disk device 32-1 in FIG. 3), system control shifts to step S63 to execute the special data write processing. If all the disk devices 32-1 to 32-5 are functioning properly, the system control shifts to step S67 to execute the ordinary data write processing.

When data write finishes in step S63 or step S67, the controller 10 receives in step S64 a report from the array controller 50 indicating that write processing finished in the normal state, with the write flag 44 deleted in step S65, and it is confirmed in step S66 that write processing is finished. With this operation, the processing for writing data and updating parity is complete.

Figure 8:
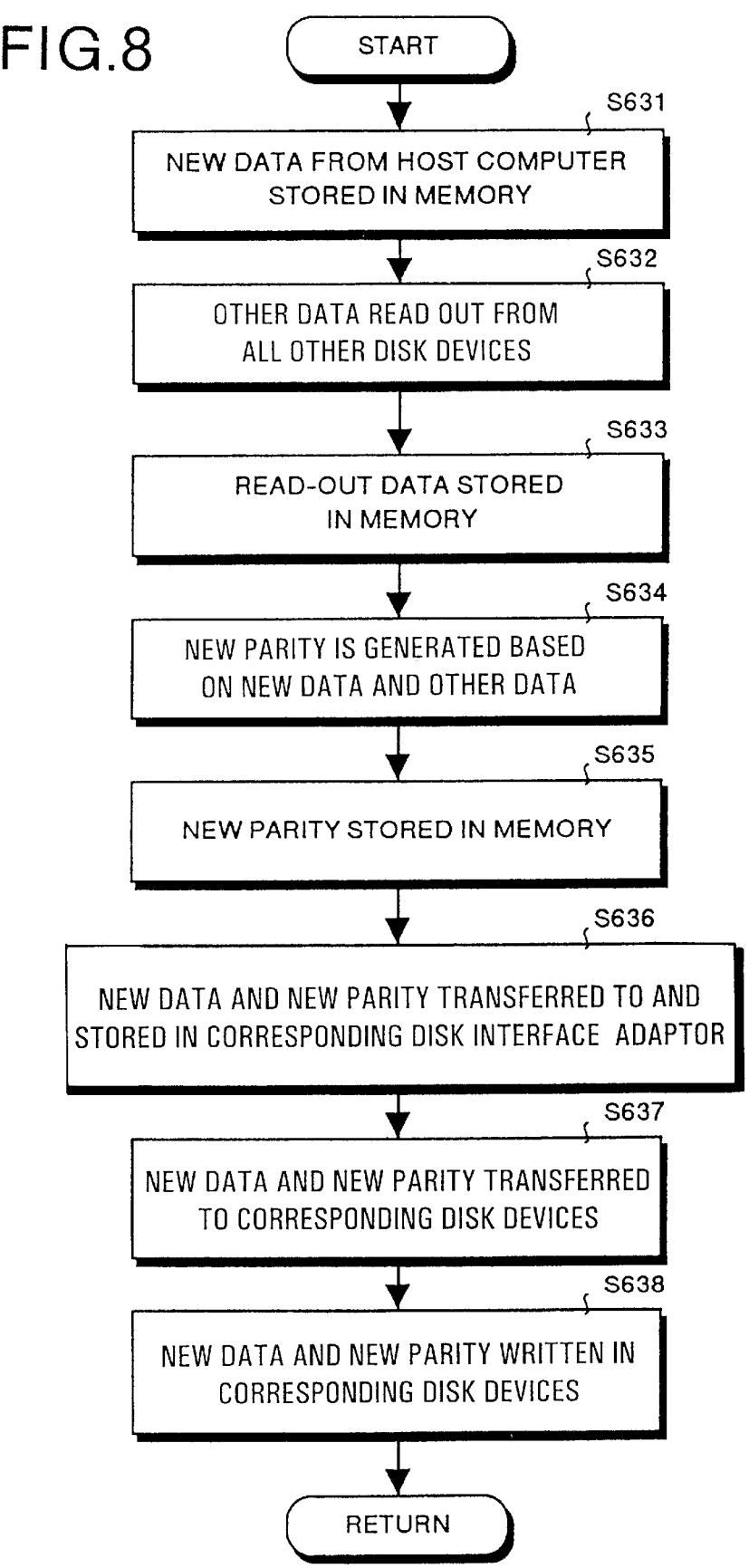
FIG. 8 is a flow chart showing details of special data write processing in Embodiment 1 of the disk array device according to the present invention.

FIG. 8 is a flow chart showing details of the special data write processing shown in step S63 in FIG. 7. It should be noted that contents of the processing shown in FIG. 8 are the same as those for the functional block diagram in FIG. 3. In FIG. 8, new data to be written in the disk device are transferred from the host computer 18 in association with the write command, so that new data (D0 new) from the host computer 18 are stored in the nonvolatile memory 34 in the control unit 10 in step S631.

Then in step S632, other data (D1, D2, D3) 45-1, 46-1, and 47-1 are read out from the other disk devices 32-2, 32-3, and 32-4, excluding the faulty specified disk device and the parity disk device, according to instructions from the device interface adapters 54-2, 54-3, and 54-4, and are stored in the device interface adapters 54-2, 54-3, and 54-4. The stored other data (D1, D2, D3) 45-1, 46-1, and 47-1, are transferred in step S633 to the control unit 10 and stored in the nonvolatile memory 34.

Then in step S634, new parity (Dp new) 48-1 is generated from exclusive-OR among new data (D0 new) 40 and the other data (D1, D2, D3) 45-1,46-1, and 47-1 stored in the nonvolatile memory, and the new parity (Dp new) 48-1 is stored in step S635 in the nonvolatile memory 34.

Thereafter, in step S636, the new data (D0 new) 40 and the generated new parity (Dp new) 48-1 from the nonvolatile memory are transferred to the device interface adapters 54-1 and 54-5, respectively. In step S637, the new data (D0 new) 40-2 and the new parity (Dp new) 48-2, from the device interface adapters 54-1 and 54-5, are transferred to the disk devices 32-1 and 32-5, respectively. In step S638, the new data and the new parity are written in the disk devices 32-1 and 32-5, respectively, at proper locations. With this operation, the special data write processing is finished.

Figure 9:
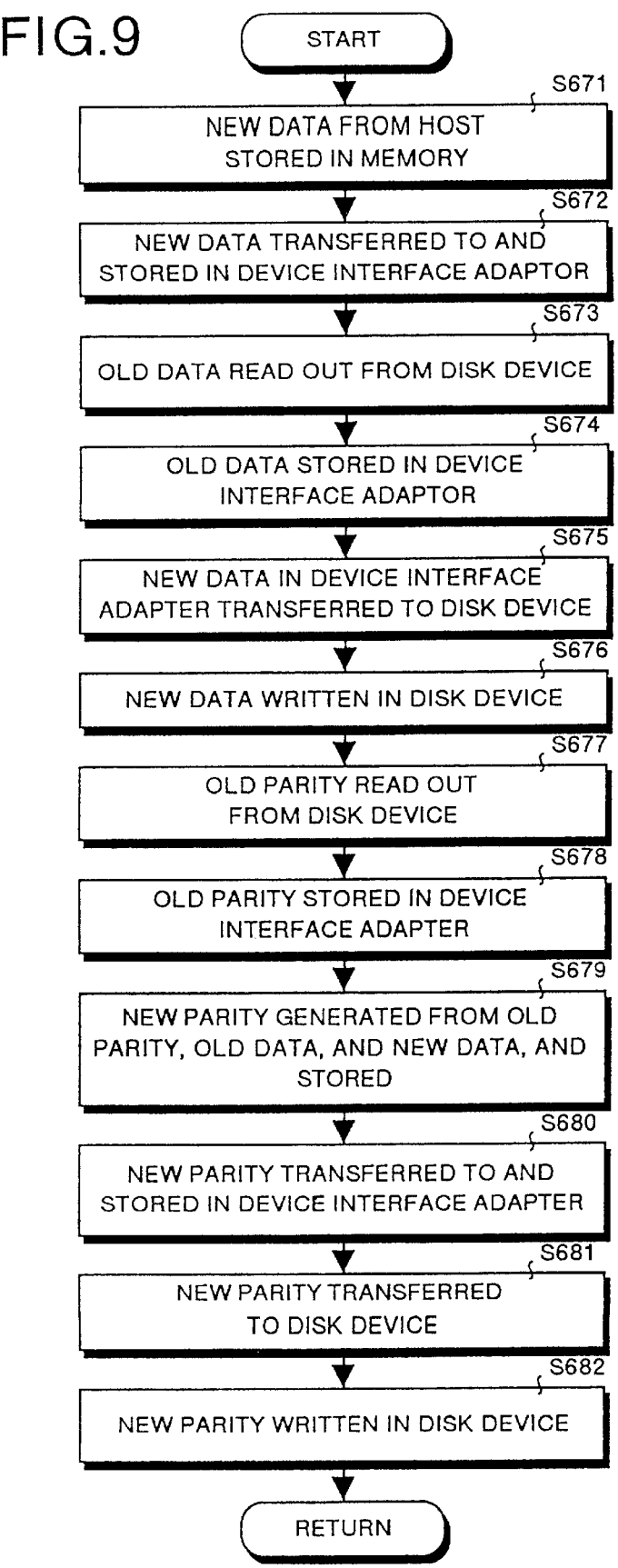
FIG. 9 is a flow chart showing details of ordinary data write processing in Embodiment 1 of the disk array device according to the present invention.

FIG. 9 is a flow chart showing details of the ordinary data write processing shown in step S67 in FIG. 7. It should be noted that contents of the processing shown in FIG. 9 are the same as those shown in the functional block diagram in FIG. 4. In step S671 of FIG. 9, the new data (D0 new) 40 transferred from the host computer 18 in association with a write command is stored in the nonvolatile memory 34 of the control unit 10. Then, in step S672, if the disk device 32-1 is specified as a disk device for data write, the new data (D0 new) is transferred to and stored in the device interface adapter 54-1.

According to an instruction from the device interface adapter 54-1 in step S673, contents of a region of the disk device 32-1 where the new data is to be written are read as old data (D0 old) 40-3 and is stored in step S674 in the device interface adapter 54-1.

When the old data (D0 old) 40-3 has been stored, in step S675, new data (D0 new) in the device interface adapter 54-1 are transferred to the disk device 32-1, and in step S676, the new data (D0 new) 40-2 is written in the region in which the new data is to be written.

Then, contents of the same region of the disk device for parity 32-5, that is, the region in which new data is to be written in the disk device 32-1, is read as old parity (Dp old) 48-3 in step S677, and in step S678 the old parity (Dp old) 48-3 is stored in the device interface adapter 54-5.

Then in step S679, the old data (D0 old) 40-3 and old parity (Dp old) 48-3 stored in the device interface adapters 54-1, 54-5 are transferred to the volatile memory 22 of the control unit 10 to be stored therein. New parity (Dp new) 48-1 is generated from exclusive-OR among the old data (D0 old) 40-1 and old parity (Dp old) 48 stored in the volatile memory 22 and new data (D0 new) stored in the volatile memory 34, and the new parity is stored in the volatile memory 22.

Then, system control shifts to step S680. The new parity (Dp new) 48-1 stored in the volatile memory 22 is transferred to the device interface adapter 54-5 and stored therein. Further, in step S681, the new parity (Dp new) 48-2 is transferred to the disk device 32-5. In step S682, the new parity (Dp new) 48-2 is written in the same region of the disk device 32-5, that is, the region in which new data is to be written in the disk device 32-1. With this operation, the normal data write processing is finished.

Herein, new parity (Dp new) is basically generated from exclusive-OR among new data (D0 new), old data (D0 old), and old parity (Dp old), but new parity (Dp new) may be generated after intermediate parity is generated as described in (1) to (3) below.

(1) At first intermediate parity may be generated from exclusive-OR between new data (D0 new) and old data (D0 old), and new parity (Dp new) is generated from exclusive-OR between the intermediate parity and old parity (Dp old), according to the following equations:

New data(+)old data=Intermediate parity

Intermediate parity(+)old parity=New parity (2) Intermediate parity may be generated from exclusive-OR between old data (D0 old) and old parity (Dp old), and new parity (Dp new) is generated from exclusive-OR between the intermediate parity and new data (D0 new), according to the following equations:

Old data(+)old parity=Intermediate parity

Intermediate parity(+)new data=New parity (3) Intermediate parity may be generated from exclusive-OR between old parity (Dp old) and new data (D0 new), and new parity is generated from exclusive-OR between the intermediate parity and old data (D0 old), according to the following equations:

Old parity(+)new data=Intermediate parity

Intermediate parity(+)old data=New parity

It should be noted that the generated intermediate parity is stored in the volatile memory 22 or nonvolatile memory 34 of the control unit 10.

Figure 10:
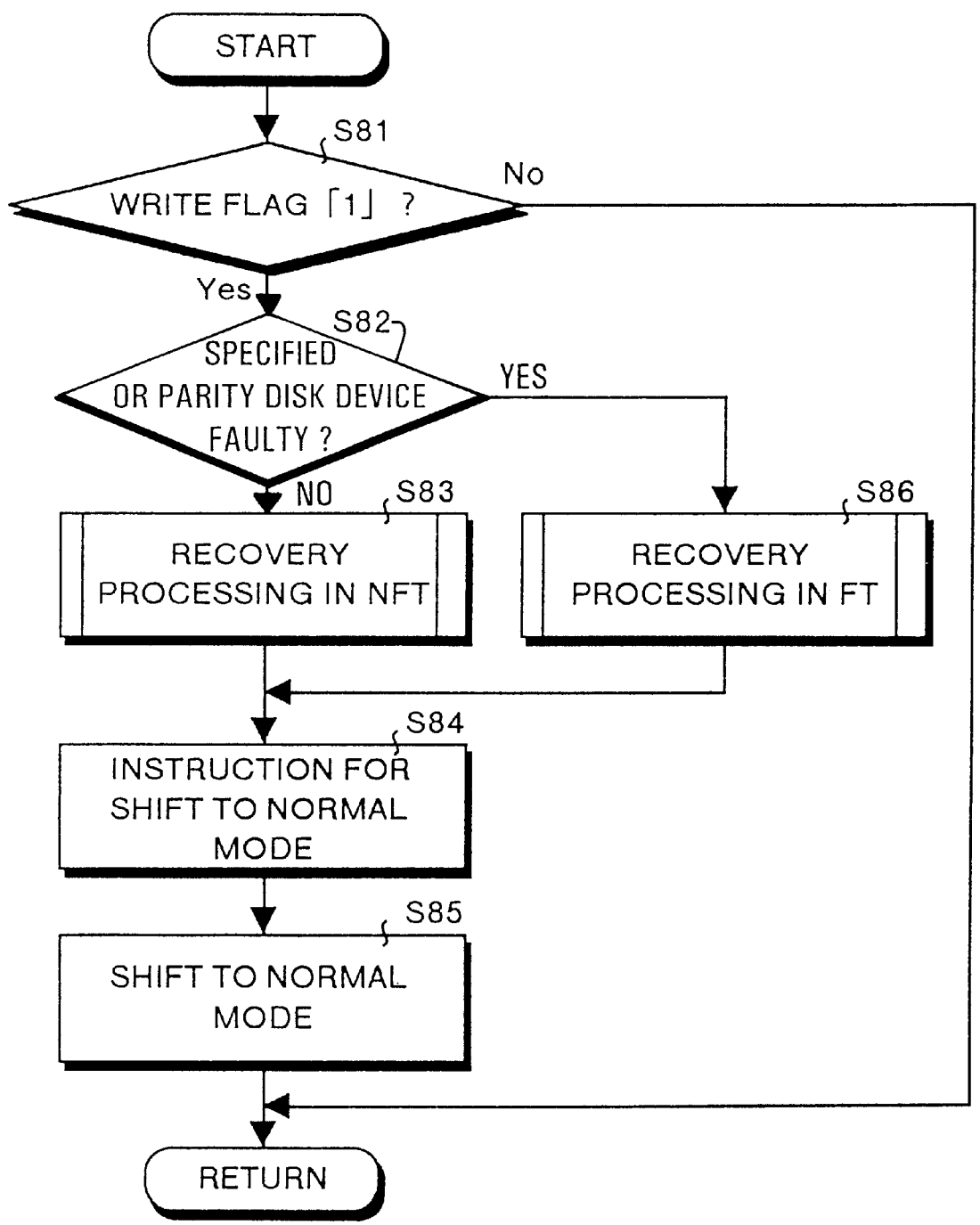

FIG. 10 is a flow chart showing details of the recovery processing shown in step S8 in FIG. 6. In step S2 in FIG. 6, if it is determined that power down has occurred, then the nonvolatile memory 34 of the control unit 10 is checked in step S81 of FIG. 10 to determine whether the write flag 44 is provided. If the write the write flag 44 is not provided, then no data or parity was being written when power went down, and processing for recovery is terminated immediately.

In step S81, if the write flag 44 is provided, system control shifts to step S82, and it is checked whether either one of the specified disk device and the parity disk device is faulty. If the specified disk device or the parity disk device is faulty (for instance, disk device 32-1 in FIG. 3), then the system control shifts to step S83 to enter the special write operation mode for NFT (non-fault tolerance) and executes processing for recovery. On the other hand, if the specified disk device or the parity disk device is not faulty, then the system control shifts to step S86 to enter the special write operation mode for FT (fault tolerance) and execute processing for recovery.

When recovery processing is complete in step S83 or step S86, system control shifts to step S84. The host computer 18 instructs the control unit 10 to issue an instruction to the array controller 50 for shifting from the special write operation mode to the ordinary mode. When the control unit 10 receives the instruction, the control unit 10 issues an instruction to the array controller 50 for shifting to the ordinary mode. Then, in step S85 the array controller 50 receives the command and shifts to the ordinary mode. With this operation, recovery processing is finished.

FIG. 11 is a flow chart showing in detail the recovery processing in NFT in step S83 of FIG. 10. It should be noted that contents of the processing shown in FIG. 11 correspond to the functional block diagram shown in FIG. 3. In step S831 of FIG. 11, the control unit 10 gives an instruction for shifting to the special write operation mode in NFT to the array controller 50. The array controller 50 receives the command in step S832 and shifts to the special write mode.

Then, in step S672, if the disk device 32-1 is specified as a disk device for data write, the new data (D0 new) is transferred to and stored in the device interface adapter 54-1. According to an instruction from the device interface adapter 54-1 in step S673, contents of a region of the disk device 32-1 where the new data is to be written are read as old data (D0 old) 40-3 and is stored in step S674 in the device interface adapter 54-1. When the old data (D0 old) 40-3 has been stored, in step S675, new data (D0 new) in the device interface adapter 54-1 are transferred to the disk device 32-1, and in step S676, the new data (D0 new) 40-2 is written in the region in which the new data is to be written. Then, contents of the same region of the disk device for parity 32-5, that is, the region in which new data is to be written in the disk device 32-1, is read as old parity (Dp old) 48-3 in step S677, and in step S678 the old parity (Dp old) 48-3 is stored in the device interface adapter 54-5. Then in step S679, the old data (D0 old) 40-3 and old parity (Dp old) 48-3 stored in the device interface adapters 54-1, 54-5 are transferred to the volatile memory 22 of the control unit 10 to be stored therein. New parity (Dp new) 48-1 is generated from exclusive-OR among the old data (D0 old) 40-1 and old parity (Dp old) 48 stored in the volatile memory 22 and new data (D0 new) stored in the volatile memory 34, and the new parity is stored in the volatile memory 22. Then, system control shifts to step S680. The new parity (Dp new) 48-1 stored in the volatile memory 22 is transferred to the device interface adapter 54-5 and stored therein. Further, in step S681, the new parity (Dp new) 48-2 is transferred to the disk device 32-5. In step S682, the new parity (Dp new) 48-2 is written in the same region of the disk device 32-5, that is, the region in which new data is to be written in the disk device 32-1.

FIG. 12 is a flow chart showing in detail the recovery processing in FT shown in step S86 in FIG. 10. It should be noted that contents of the processing in FIG. 12 corresponds to the functional block diagram shown in FIG. 4. In step S861 of FIG. 12, the control unit 10 instructs the array controller 50 to shift to the special write operation mode in FT. The array controller 50 receives the command in step S862 and shifts to special write processing.

Then, in step S863, new data (D0 new) is read out from the nonvolatile memory 34 of the control unit 10, and the new data is transferred to and stored in the device interface adapter 54-1. Also in step S864, data (D1, D2, D3) are read out from the disk devices 32-2, 32-3, and 32-4, excluding the disk device 32-1 in which new data (D0 new) is to be stored and the disk device for parity 32-5, and the data (D1, D2, D3) 45-1, 46-1, 47-1 are stored in the device interface adapters 54-2, 54-3, 54-4.

Then, in step S865, new data (D0 new) 40-2 in the device interface adapter 54-1 is transferred to the disk device 32-1 and the new data (D0 new) 40-2 is written in a region in which new data is to be written.

Then in step S866, the data (D1, D2, D3) 45-1, 46-1, 47-1 stored in the device interface adapters 54-2, 54-3, 54-4 are transferred to and stored in the volatile memory 22 of control unit 10. New parity (Dp new) 48-1 is generated from exclusive-OR among the data (D1, D2, D3) 45, 46, 47 stored in the volatile memory 22 and the new data (D0 new) 40 stored in the nonvolatile memory 34, and the new parity is stored in the volatile memory 22.

Then, system control shifts to step S867. The new parity (Dp new) 48-1 stored in the volatile memory 22 is transferred to and stored in the device interface adapter 54-5, and the stored new parity (Dp new) 48-2 is transferred to the disk device 32-5 and is written in the same region of the disk device 32-5 as the region in which new data is to be written in disk device 32-1.

Then in step S868, the control unit 10 receives a report from the array controller 50 that the write processing finished in the normal state, and in step S869, the write flag 44 is invalidated. It is confirmed in step S870 that the write processing finished in the normal state. Then, it is determined whether any other write flag 44 is effective. The operations in the steps S863 to S870 are repeatedly executed until no effective write flag 44 remains, and when there is no effective write flag 44, the recovery processing in FT is finished.

FIG. 13 is a flow chart showing details of the data read processing in step S7 in FIG. 6. In FIG. 13, when a read command from the host computer 18 is decoded, data is read out in step S71 from a disk device via a device interface adapter specified in step S71 as a target for data read. After the data is stored in step S72 in the device interface adapter, the data is transferred to the host computer 18 in step S73.

With the embodiment described above, the nonvolatile memory 34 is provided in the control unit 10. When any disk device fails during data writing, the following data are stored in the nonvolatile memory 34: (1) the new data (D0 new) 40 transferred from the host computer 18 if for updating; (2) the status 42 indicating progression of the data write processing; (3) the write flag 44; (4) other data (D1, D2, D3) 45, 46, 47 read out from the other disk devices; and (5) new parity (Dp new) 48-1 generated from exclusive-OR among the new data (D0 new) 40 and the other data (D1, D2, D3) 45, 46, 47. In this way, if the write processing does not finish in the normal state due to power failure or for some other reason during the processing for writing data and parity, then when the power supply is restarted, the new data (D0 new) 40, and new parity (Dp new) 48-1 stored in the nonvolatile memory 34 are written in a disk device, and thus, the data is easily recovered.

With the embodiment described above, the nonvolatile memory 34 is provided in the control unit 10. When the data write processing is to be executed, if there is no faulty disk device, the new data (D0 new) 40 transferred from the host computer 18 for updating, status 42 indicating progression of the data write processing, and write flag 44 are stored in the nonvolatile memory 34. In this way, if the write processing is not finished in the normal state due to power failure or for some other reason during the processing for writing data or parity, then when the power supply is restarted, the data can easily be recovered by reading out data (D1, D2, D3) belonging to the same parity group from disk devices other than the disk device in which data is to be updated and the disk device for parity. New parity (Dp new) 48-1 is generated from an exclusive-OR between the data (D1, D2, D3) and the new data (D0 new) 40 stored in the nonvolatile memory 34, and the new parity (Dp new) 48-1 and new data (D0 new) stored in the nonvolatile memory 34 are written in a disk device anew.

Further, with the embodiment described above, the write flag 44 is stored in the nonvolatile memory 34. After write, processing does not finish in the normal state and the power supply is restarted, whether any data are not written in the normal state can easily and visually be checked by referring to the write flag 44. For this reason, the processing for data recovery can be rapidly executed.

Further, with the embodiment described above, the status 42 is stored in the nonvolatile memory 34. After write processing does not finish in the normal state and the power supply is restarted, processing for data recovery can be continued from a section where the write processing is interrupted by referring to the status 42. For this reason the processing for data recovery can be executed more rapidly.

FIG. 14 is a block diagram showing a disk array device according to Embodiment 2 of the present invention. The disk array device shown in FIG. 14 is different from that shown in FIG. 1 in that there is not provided in the control unit 10 the nonvolatile memory 34 that is operable even when power is down depending on a backup power supply 36. However, there are provided in the array controller 50 the nonvolatile memory 34 and backup power supply 36 in place thereof. Also, there are provided a volatile memory 23 and a logic circuit 37 for exclusive-OR (EOR) operations in the array controller 50. Because other portions of the configuration are the same as those in Embodiment 1 above, the same reference numerals are assigned to the same components as those in the disk array device shown in FIG. 1 and description thereof is omitted herein.

FIG. 15 and FIG. 16 are functional block diagrams each showing the disk array device according to Embodiment 2 shown in FIG. 14. FIG. 15 shows a case where there is one faulty disk device, while FIG. 16 shows a case where there are no faulty disk devices, that is, all the disk devices are operating normally. As in Embodiment 1 described above, in FIG. 15 and FIG. 16, of a plurality of disk devices (5 units in the figures) 32-1 to 32-5, for instance, the disk device 32-5 is used for storage of parity.

In the state where one disk device 32-2 is faulty and the data (D0) in the specified disk device 32-1 is to be updated to new data (D0 new), as shown in FIG. 15, the new data (D0 new) 40, the management table 41 for storing therein the status 42 and the self-system flag 43, the write flag 44, the old data (D0 old) 40-1, the other data (D2, D3) 46, 47, the old parity (Dp old) 48, and the new parity (Dp new) 48-1 are stored, as in Embodiment 1, in the nonvolatile memory 34 of the array controller 50.

The new parity (Dp new) 48-1 is obtained by computing exclusive-OR (EOR) among the old data (D0 old) 40-1, new data (D0 new) 40, and old parity (Dp old) 48 in the logic circuit 37 provided in the array controller 50.

Also, in Embodiment 2, as in Embodiment 1, when the processing for data write is to be executed, new data (D0 new) 40-2, other data (D2, D3) 46-1, 47-1 and new parity (Dp new) 48-2 are concurrently written in the disk devices 32-1, 32-3, 32-4, 32-5 according to the RAID 3 system.

When write processing that did not finish in the normal state is to be recovered, new data (D0 new) 40, other data (D2, D3) 46, 47, and new parity (Dp new) 48-1 stored in the nonvolatile memory 34 are concurrently written via the device interface adapters 54-1, 54-3, 54-4, 54-5 in the disk devices 32-1, 32-3, 32-4, 32-5 according to the RAID 3 system.

When data (D0) in the specified disk device 32-1 is updated to new data (D0 new) in the state where all the disk devices 32-1, 32-2, 32-3, 324, 32-5 are operating normally, as shown in FIG. 16, the new data (D0 new) 40, management table 41, and write flag 44 are stored in the nonvolatile memory 34 of the array controller 50. Also, the old data (D0 old) 40-1 and old parity (Dp old) 48 are stored in the volatile memory 23 of the array controller 50.

The new data (D0 new) 40 stored in the nonvolatile memory 34 is written via the device interface adapter 54-1 in the disk device 32-1. Also, an exclusive-OR (EOR) operation is performed on the new data (D0 new) 40 stored in the nonvolatile memory 34, old data (D0 old) 40-1 stored in the volatile memory 23, and old parity (Dp old) 48 in the logic circuit 37 to obtain new parity (Dp new) 48-1, and the new parity is stored in the volatile memory 23. This new parity (Dp new) 48-1 is written via the device interface adapter 54-5 in the disk device 32-5.

When write processing that does not finish in the normal state is to be recovered, the new data (D0 new) 40 stored in the nonvolatile memory 34 is written via the device interface adapter 54-1 in the disk device 32-1. Also, data (D1, D2, D3) are read out from the disk devices 32-2, 32-3, 32-4, sent to, and stored in the volatile memory 23.

Then, new parity (Dp new) 48-1 is generated from the data (D1, D2, D3) 45, 46, 47 stored in the volatile memory 23 and new data (D0 new) 40 stored in the nonvolatile memory 34, and the new parity (Dp new) 48-1 is written via the device interface adapter 54-5 in the disk device 32-5.

Operations of the disk array device shown in FIG. 15 and FIG. 16 are the same as those shown in the flow charts of FIG. 6 to FIG. 13. For this reason, description thereof is omitted herein.

In Embodiment 2 shown in FIG. 14 to FIG. 16, the nonvolatile memory 34 is provided in the array controller 50. If there is any faulty disk device when data is to be written, new data (D0 new) 40, status 42, write flag 44, old data (D0 old) 40-1, old parity (Dp old) 48, other data (D2, D3) 46, 47, and new parity (Dp new) 48-1 are stored in the nonvolatile memory 34. In this way, even if processing for writing data and parity is not finished in the normal state due to a power failure or for some other reason, the data can be easily recovered when the power supply is restarted by writing in a disk device the new data (D0 new) 40, other data (D2, D3) 46, 47, and new parity (Dp new) 48-1 stored in the nonvolatile memory 34.

With Embodiment 2 above, the nonvolatile memory 34 is provided in the array controller 50. When data is to be written and there is no faulty disk device, new data (D0 new) 40, status 42, and write flag 44 are stored in the nonvolatile memory 34. In this way, even if the processing for writing data and parity is not finished in the normal state due to a power failure or for some other reason, when the power supply is restarted, data (D1, D2, D3) belonging to the same parity group is read out from disk devices other than a disk device in which data is to be updated, and a disk device for storage of parity. New parity (Dp new) 48-1 is generated from the data (D1, D2, D3) and new data (D0 new) 40 stored in the nonvolatile memory 34, and the new parity (Dp new) 48-1 and new data (D0 new) 40 are written a new in a disk device, resulting in easy recovery of data.

With Embodiment 2 above, as the write flag 44 is stored in the nonvolatile memory 34 after the write operation does not finish in the normal state, when power supply is restarted, data that has not been written normally can be visually checked by referring to the write flag 44 so that processing for data recovery can be rapidly executed.

Further, with Embodiment 2, the status 42 is stored in the nonvolatile memory 34 after write processing does not finish in the normal state. When the. power supply is restarted, processing for recovery can be continued from the section where the write processing is interrupted by referring to the status 42 so that processing for data recovery can be rapidly executed.

FIG. 17 is a block diagram showing the disk array device according to Embodiment 3 of the present invention. In the disk array device according to this embodiment, as shown in FIG. 17, the host computer 18 is connected to the control unit 10. Two array controllers, array controller A 50 and array controller B 51, are connected to the control unit 10 and are driven by independent power supplies 62 and 64, respectively. Five disk devices, for example, 32-1, 32-2, 32-3, 32-4, 32-5 are controlled by the array controller A 50 and array controller B 51. It should be noted that the same reference numerals are assigned to the same components as those in the disk array device shown in FIG. 1, and detailed description thereof is omitted herein. Provided in the control unit 10 are, as in Embodiment 1, the MPU 12, ROM 20, volatile memory 22, cache function engine 24, cache memory 26, nonvolatile memory 34, back-up power supply unit 36, resource manager module 13, service adapter 14, and channel interface adapter 16.

Also, to independently control the array controller A 50 and the array controller B 51, provided in the control unit 10 are a group A consisting of a device interface adapter A 17 and a device adapter module A 11, and a group B consisting of a device interface adapter B 15 and a device adapter module B 19. These groups A and B are driven by the independent power supply units 27, 28, respectively.

Figure 1:
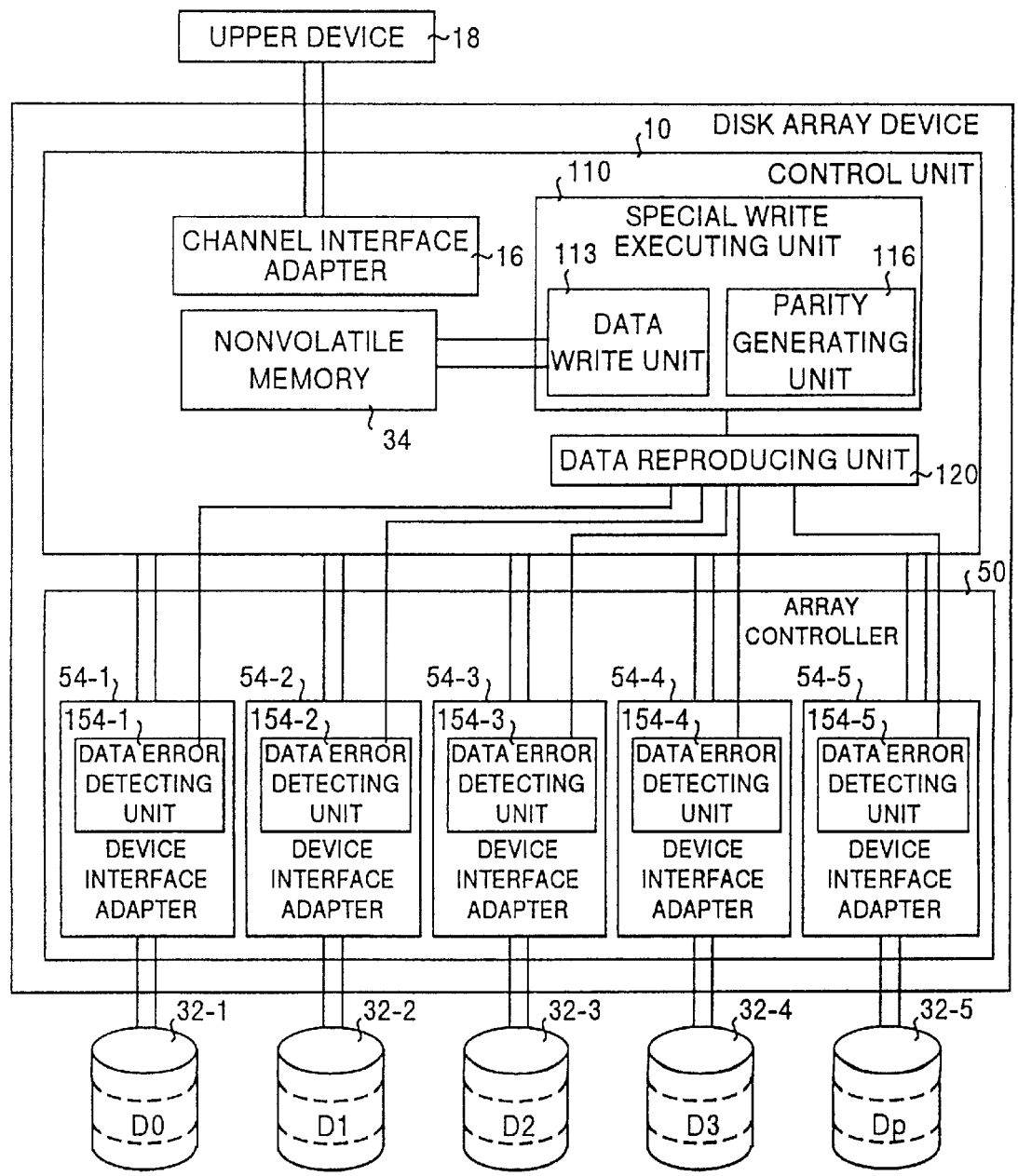
FIG. 1 is an explanatory view for illustrating principles of a disk array device according to the present invention.

The array controller A 50 has the same configuration as that of the array controller B 51, and although not shown in the figure, there are provided, as in Embodiment 1 shown in FIG. 1, a plurality of device interface adapters functioning as an upper interface connected to the device interface adapter A 17 or device interface adapter B 15 in the control unit 10, and a lower interface with a plurality of disk devices 32-1 to 32-5 connected thereto.

FIG. 18 is a functional block diagram showing the disk array device according to Embodiment 3 shown in FIG. 17. In FIG. 18, it is assumed that, of the plurality of disk devices 32-1 to 32-5 (for instance 5 units in the figure), the disk device 32-5 is used for storage of parity. For a RAID 4 type system, the disk device 32-5 is always used for storage of parity, and in a RAID 5 type system, a disk device is used for storage of parity according to a specified sequence of data access.

The nonvolatile memory 34 in the control unit 10 is shared by group A consisting of the device interface adapter A 17 and device adapter module A 11, and group B consisting of the device interface adapter B 15 and device interface module B 19. In other words, the data or parity stored in this nonvolatile memory 34 can be written via any of the two array controllers 50, 51 into the disk devices 32-1, 32-2, 32-3, 32-4, and 32-5.

In the state where all the disk devices 32-1, 32-2, 32-3, 32-4, and 32-5 are operating normally and data (D0) in the instructed disk device 32-1 is to be updated with new data (D0 new), as shown in FIG. 18, the following data are stored in the nonvolatile memory 34 of the control unit 10: (1) new data (D0 new) 40 transferred from the host computer 18; (2) old data (D0 old) 40-1 read out from the disk device 32-1; (3) old parity (Dp old) 48 read out from the disk device for parity 32-5; (4) a management table 41 showing progression of the write processing; and (5) a write flag 44 indicating that write processing is being executed. Although there is no particular limitation, the write flag 44 may be stored in the management table 41.

Also, the control unit 10 has a task generating section 72 for generating a task for writing back the new data (D0 new) stored in the nonvolatile memory 34 into a disk device. The task generating section 72 is realized by, for instance, the MPU 12 in the control unit 10. The task information generated in the task generating section 72 is stored in a task information table 74 stored in a memory in the resource manager module 13. The resource manager instructs appropriate device adapter modules 11, 19 to execute the task processing according to the task information.

Also stored in the task information table 74 is an alternative path processing request flag 76 indicating, when an abnormal state occurs in one of the array controllers, that write processing is executed using an array controller working normally in place of the array controller in which the abnormal state has occurred.

The device adapter modules 11, 19 read out, when instructed by the resource manager, task information from the task information table 74. The device adapter modules 11, 19 also read out new data (D0 new) 40 stored in the nonvolatile memory 34 according to the task information, and issue write instructions to the array controllers 50, 51 in the system. Also, the device adapter effects the write flag 44 in the management table 41 stored in the nonvolatile memory 34.

Each of the array controllers 50, 51 monitors, with a power supply monitoring section 55, the power supply state of the other array controller 51 or 50, and when one of the array controllers 50 (or 51) detects that power supply to the other array controller 51 (or 50) has stopped, it is reported by a power supply stop reporting section 56 via the device interface adapter 17 (or 15) in the system to the device adapter module 11 (or 19) that power supply to the other array controller 51 (or 50) has stopped. The power monitoring section 55 and power supply stop reporting section 56 are realized by a microprocessor (MPU) or the like provided in the array controllers 50, 51.

Also provided in the array controllers 50, 51 is a parity generating section 57 for reading out other data in the same parity group to which the new data (D0 new) 40 transferred from the nonvolatile memory 34 in the control unit 10 belongs, and generating new parity (Dp new) from the data and new data (D0 new) 40.

Reconstruction of parity by this parity generating section 57 is executed when a special mode is set with a flag in response to a write instruction. The parity generating section 57 is realized with a microprocessor (MPU) provided in the array controllers 50, 51 or the like.

Next, a description is provided for a flow of processing operations by the disk array device shown in FIG. 18. The entire operational flow in this disk array device, a flow of operations for reading data, and a flow of recovery processing are almost the same as those shown in the flow charts of FIG. 6, FIG. 13, and FIG. 12, respectively. For this reason, description of the entire operational flow, a flow of recovery processing, and that of processing for reading data in the disk array device shown in FIG. 18 is omitted herein.

FIG. 19 is a flow chart showing details of the write processing in the disk array device shown in FIG. 18. In FIG. 19, when a write instruction is received from the host computer 18, at first a device adapter module A 11 belonging to group A in the control unit 10 issues a data write command to the array controller A 50 in the system in step S1671.

With this operation, in step S1672, the array controller A 50 writes new data (D0 new) according to the ordinary write processing sequence shown in FIG. 9 in the disk device 32-1, and also generates new parity (Dp new) from the new data (D0 new) 40, old data (D0 old), and old parity (Dp old), and writes the new parity in the disk device for parity 32-5.

During the ordinary write processing in step S1672, that is, before the control unit 10 receives a write complete signal from the array controller A 50, if the control unit 10 receives an abnormal end signal in step S1673 from loss of power supply to the array controller A 50, system control shifts to step S1675.

In step S1675, the device adapter module A 11 in which an abnormal state has been detected sets an alternative path processing request flag 76 in the task information table 74 to have the write processing task, in which the abnormal state has been generated, executed by another device path, namely by the array controller B 51. Then, in step S1676, the device adapter module A 11 issues a request for the alternative path processing for the task to the resource managers.

The resource manager, to which the alternative path processing is requested, issues a request for execution of the write processing task, which was interrupted due to generation of an abnormal state to the device adapter controlling the alternative array controller B 51 in step S1677.

The adapter having received the request recognizes, in step S1678, that contents of the accepted processing are write processing and at the same time, the alternative device path processing to be executed in place of the array controller A 50 with any abnormality having been generated therein. In step S1679, the adapter issues a write instruction with a special flag called herein a parity generation flag for reconstruction of parity data added to the array controller B 51.

The array controller B 51 having received the write instruction with the parity generation flag added thereto reads out new data (D0 new) stored in the nonvolatile memory 34 in the control unit 10, and writes the data in the disk device 32-1.

Then, in step S1681, the array controller B 51 reads out data (D1, D2, D3) belonging to the same group to which the update data belongs from other disk devices 32-2, 32-3, 32-4, excluding the disk device 32-1 in which data is to be updated and the disk device for parity 325, generates new parity (Dp new) by computing exclusive-OR (EOR) among the data (D1, D2, D3) and new data (D0 new), and writes the new parity (Dp new) in the disk device for parity 32-5.

Finally in step S1682, the alternative path processing request flag 76 is invalidated, thus finishing the data write processing.

In step S1674, if the reason for abnormal termination of write processing is not due to disrupting the power supply to the array controller A 50, system control shifts to step S1683. In step S1683, if the reason for abnormal termination of write processing is an abnormal operation, such as the array controller A 50 being "hung-up," system control shifts to step S1684 to reset the device interface adapter A 17 and array controller A 50. In S1685 the parity generation flag for reconstruction of parity data is added to the write instruction, which is again issued to the array controller A 50.

On the other hand, if the reason for abnormal termination of write processing is interruption of write processing by the array controller A 50 to a disk device, system control directly shifts to step S1685 without resetting the array controllers. A write instruction with the parity generation flag for reconstruction of parity data added thereto is again issued to the array controller A 50.

The array controller A 50, having received the write instruction with the parity generation flag added thereto, reads out new data (D0 new) 40 stored in the nonvolatile memory 34 in the control unit 10 in step S1686, and writes the read-out data to the disk device 32-1.

Then, in step S1687, the array controller A 50 reads out data (D1, D2, D3), belonging to the same parity group to which the data to be updated belongs, from other disk devices 32-2, 32-3, 32-4, excluding the disk device 32-1 in which data updating is executed and the disk device for parity 32-5. The array controller 50 generates new parity (Dp new) by computing exclusive-OR (EOR) among the read-out data (D1, D2, D3) and new data (D0 new), and writes the new parity in the disk device for parity 32-5. With this operation, the data write operation is finished.

In step S1673 of FIG. 19, if an abnormal termination signal is not received, data updating by the array controller A 50 executed normally, and write processing is immediately finished.

FIG. 20 is a flow chart showing details of the processing for a write instruction to write to the other device, issued to the array controller A 50 by a device adapter, which has detected an abnormal state in the array controller A 50 in the disk array device shown in FIG. 18. In FIG. 20, a determination is made in step Si 691 whether there is a write instruction not having received a normal termination complete signal from the array controller A 50. If there is a write instruction not having received the signal, time-out is detected in step S1692 by the logic for monitoring the task execution time by the resource manager.

Then in step S1693, the resource manager sets an alternative path processing request flag 76 in the task information table 74 to have a write processing task for the write instruction not having received the normal termination complete signal executed by another device path, namely, by the array controller B 51.

Also, the resource manager issues a request for processing the write processing task for the write instruction not having received the normal termination complete signal to the device adapter module B 19 controlling the alternative array controller B 51 in step S1694. The device adapter receiving the request recognizes in step S1695, that contents of the received processing are write processing and also alternative device path processing in place of the array controller A 50 in which an abnormal state was generated, and issues in step S1696 a write instruction with a special flag described herein as a parity generation flag for reconstruction of parity data added thereto to the array controller B 51.

The array controller B 51, having received the write instruction with the parity generation flag added thereto, reads out new data (D0 new) 40 for the current write processing stored in the nonvolatile memory 34 in the control unit 10, and writes the read-out data in the disk device 32-1.

Then, in step S1698, the array controller B 51, reads out data (D1, D2, D3) belonging to the same parity group to which the data to be updated belongs from other disk devices 32-2, 32-3, 32-4, excluding the disk device 32-1 in which data is to be updated and the disk device for parity 32-5. The array controller B 51 generates new parity by computing exclusive-OR (EOR) among the read-out data (D1, D2, D3) and new data (D0 new), and writes the new parity in the disk device for parity 32-5.

Finally, in step S1699, the alternative path processing request flag 76 is invalidated, and the data write processing is finished.

In step S1691, if it is determined that there is any write instruction that did not receive the normal termination complete signal from the array controller A 50, the processing is immediately terminated.

With Embodiment 3 shown in FIG. 17 to FIG. 20, the nonvolatile memory 34 is provided in the control unit 10. When data is written, the new data (D0 new) 40, a status indicating a stage of write processing, a management table 41 storing therein a flag indicating an array controller having executed the processing shown in the status, old data (D0 old) 40-1, and old parity (Dp old) 48 are stored in the nonvolatile memory 34. In this way, even if any abnormal state occurs in one of the array controllers, write processing can be continued by another array controller in place of the array controller in which the abnormal state occurred, thereby maintaining data consistency.

With Embodiment 3 above, new data (D0 new) 40 and the management table 41 storing therein a status of write processing and a flag indicating an array controller are stored in the nonvolatile memory 34 so that, when the write processing for, writing data and parity does not finish in the normal state and the power supply is restarted, data can be easily recovered by reading out data (D1, D2, D3) belonging to the same parity group from disk devices other than the disk device in which data is to be updated and that for parity. New parity (Dp new) 48-1 is generated from the data (D1, D2, D3) and the new data (D0 new) stored in the nonvolatile memory 34, and writing the new parity (Dp new) 48-1 and new data (D0 new) are written anew in a disk device.

FIG. 21 is a functional block diagram showing a disk array device according to Embodiment 4 of the present invention. In this disk array device according to Embodiment 4, as shown in FIG. 21, connected to the control unit 10, with the host computer 18 connected thereto, are two array controllers, array controller A 50 and array controller B 51, which are driven by independent power supply units 62, 64 respectively, and, for instance, five disk devices 32-1, 32-2, 32-3, 32-4, and 32-5 are controlled by the array controller A 50 and the array controller B 51. It should be noted that the same reference numerals are assigned to the same components as those in the disk array device shown in FIG. 2 and detailed description thereof is omitted herein.

Although not shown in FIG. 21, provided in the control unit 10 are, as in Embodiment 1, an MPU, a ROM, a volatile memory, a cache function engine, a cache memory, a resource manager module, a service adapter, and a channel interface adapter.

Configuration of the array controller A 50 is the same as that of the array controller B 51, and although not shown herein, as in Embodiment 1 shown in FIG. 2, a plurality of interface adapters are provided that function as an upper interface connected to a device interface adapter not shown in the control unit 10, and as a lower interface to which a plurality of disk devices 32-1 to 32-5 are connected.

Also provided in the array controller A 50 and the array controller B 51 are nonvolatile memory 34 and back-up power supply units (not shown) for supplying power to the nonvolatile memory 34 (not shown). The new data (D0 new) 40 transferred when data is to be written in a disk device, for instance, from the control unit 10, old data (D0 old) 40-1 and old parity (Dp old) 48 read out from the disk device, new parity (Dp new) 48-1 newly generated, a status 42 indicating a stage of write processing, and a management table 41 storing therein a self-system flag indicating the array controller having executed the processing shown in the status are stored in the nonvolatile memory 34 in the array controller A 50.

Stored in the nonvolatile memory 34 of the array controller B 51 are, for instance, at least new data (D0 new) 40-4, old data (D0 old) 40-5, and old parity (Dp old) 48-4.

Also, a communicating section 82 for communication with a controller in another device is provided in the array controllers A 50 and B 51. Transaction of new data (D0 new), old data (D0 old) and old parity (Dp old), and a report of the normal termination of write processing is executed through this communicating section 82. The communicating sections 82 are connected to each other via a PCI bus generally employed,.for instance, in personal computers or the like.

Also provided in the array controllers A 50 and B 51 is a logic circuit 37 for preparing new parity (Dp new) by computing exclusive-OR (EOR) among the new data (D0 new), old data (D0 old), and old parity (Dp old).

Either one of the array controllers A 50 and B 51 can write data or parity in the disk devices 32-1 to 32-5.

In the example shown in FIG. 21, it is assumed that, of a plurality of disk devices 32-1 to 32-5 (for instance, 5 units in the figure), the disk device 32-5, for example, is used for storage of parity. The disk device 32-5 is always used for storage of parity in the RAID 4 system, and the disk device 32-5 is positioned as a disk device for storage of parity in the current data access.

In FIG. 22, the management table 41, new data (D0 new), and new parity (Dp new) 48-1 are stored in the nonvolatile memory 34 in the array controller A 50 . In this case, although not shown in the figure, new data (D0 new) and new parity (Dp new) are stored in the nonvolatile memory 34 in the array controller B 51.

In FIG. 23, the management table 41, new data (D0 new) 40, and intermediate parity (Dp int) 48-5, generated by computing exclusive-OR (EOR) among old data (D0 old) and old parity (Dp old), are stored in the nonvolatile memory 34 of the array controller A 50. In this case, although not shown in the figure, new data (D0 new) and intermediate parity (Dp int) are stored in the nonvolatile memory 34 in the array controller B 51.

Next, a description is provided for a flow of operational sequence in the disk array device shown in FIG. 21. This entire operational flow in this disk array and a flow of operations for reading out data are substantially the same as those in FIG. 6 and FIG. 13. Thus, a description of the entire operational flow and an operational flow in data read processing in the disk array device shown in FIG. 21 are omitted herein.

FIG. 24 is a flow chart showing details of the write processing in the disk array device shown in FIG. 21. It should be noted that a status of each step (a stage of write processing) is also shown in the right side of the figure. In step S2671 of FIG. 24, the array controller A 50 first receives new data (D0 new) together with a write instruction from the control unit 10 and stores the new data (D0 new) 40 in the nonvolatile memory 34 in the array controller A 50. The status in this step is "Receive new data".

Then, in step S2672, the array controller A 50 transfers new data (D0 new) via the communicating section 82 to the other array controller B 51, while the array controller B 51 receives the new data (D0 new) transferred thereto and stores the new data (D0 new) in the nonvolatile memory 34 of the array controller B 51. With this operation, the new data (D0 new) 40-4 is copied into the array controller B 51. The status at this point is "Receive new data".

Then, in step S2673, the array controller A 50 reads out the old data (D0 old) and old parity from the disk devices 32-1 and 32-5, and stores the old data (D0 old) 40-1 and old parity (Dp old) 48 in the nonvolatile memory 34 in the array controller A 50. The status at this point is "read old data & parity".

Then, in step S2674, the array controller A 50 transfers old data (D0 old) and old parity (Dp old) via the communicating section 82 to the array controller B 51. The array controller B 51 receives and stores the old data (D0 old) and old parity (Dp old) transferred thereto in the nonvolatile memory 34 in the array controller B 51.

With this operation, the old data (D0 old) 40-5 and old parity (Dp old) 48-4 have been copied. The status at this point is "Read old data & parity".

Then, in step S2675, the array controller A 50 generates new parity (Dp new) 48-1 from the new data (D0 new) 40, old data (D0 old) 40-1, and old parity (Dp old) 48 stored in the nonvolatile memory 34 in the array controller A 50, and stores the new parity in the nonvolatile memory 34 in the array controller A 50. The status at this point is "Generate new parity".

Then, in step S2676, the array controller A 50 writes new data (D0 new) 40 and new parity (Dp new) 48-1 at appropriate places in the disk devices 32-1, 32-5. The status at this point is "Write new data & parity".

Then, in step S2677, the array controller A 50 reports to the control unit 10 that the write processing finished in the normal state. The status at this point of time is changed from "Write new data & parity" to "Finish" after the report of normal termination is complete.

Then, in step S2678, the array controller A 50 reports that the write processing finished in the normal state to the array controller B 51. The status at this point is "Finish".

Then, in step S2679, the array controller A 50 releases the region occupied by the new data (D0 new) 40, old data (D0 old) 40-1, old parity (Dp old), new parity (Dp new) 48-1 and status 42 stored in the nonvolatile memory 34 in the array controller A 50. The status at this point of time is "Finish".

In step S2680, the array controller B 51 releases, when having received the report of normal termination from the array controller A 50, the region occupied by the new data (D0 new) 40-4, old data (D0 old) 40-5, and old parity (Dp old) 48-4 stored in the nonvolatile memory 34 in the array controller B 51. The status at this point is "Finish". With this operation, write processing is finished.

It should be noted that, when write processing is interrupted due to generation of an abnormal state, such as loss of power supply to the array controller A 50, abnormal operations of the array controller A 50, such as hanging-up or interruption of write processing into a disk device by the array controller A 50, as in the write processing in Embodiment 3 shown in FIG. 19, the write processing may be continued by the array controller B 51 in place of the array controller A 50.

FIG. 25 is a flow chart showing details of the recovery processing in the disk array device shown in FIG. 21. When power is turned ON, the array controller A 50 (or B 51) determines in step S2861 of FIG. 25 whether a controller in another system, namely, the array controller B 51 (or A 50) is operating normally.

When the array controller B 51 (or A 50) is operating normally, in step S2862, it determines whether the write processing in the system, that is, write processing by the array controller A 50 (or B 51) has been finished by the array controller B 51 (or A 50).

When the write processing in the system has not finished, in step S2963, arbitration is used to decide whether array controller A 50 or array controller B 51 should execute the write processing not yet finished. This arbitration may be executed, for instance, by designating the array controller started first as a master and the one started later as a slave (and vice-versa is also allowable). The controller designated as a master executes the write processing. The array controllers may also be designated as primary and secondary, with the primary controller executing the write processing.

When the controller to execute write processing is determined through arbitration, the array controller taking charge for write processing reads out in step S2864 new data (D0 new) from the nonvolatile memory 34 in the array controller. The controller executing write processing also reads out the status 42 from the nonvolatile memory 34 in the array controller A 50, and in step S2865, the controller restarts the write processing from the interrupted section according to the read-out status.

When write processing is finished, in step 2866, the array controller having restarted write processing reports to the control unit 10 that write processing finished in the normal state, and the array controller also reports in step S2867 to the other array controller that write processing finished in the normal state.

Then, in step S2868, the array controller having restarted write processing releases a region for new data (D0 new), old data (D0 old), and old parity (Dp old), which are stored in the nonvolatile memory 34 in the array controller, or a region for new parity (Dp new) when new parity is stored therein, or a region for status when a status is stored therein.

Also, in step S2869, the array controller not restarting write processing releases a region for new data (D0 new), old data (D0 old), and old parity (Dp old), which are stored in the nonvolatile memory 34 in the array controller, or a region for new parity (Dp new) when new parity is stored therein, or a region for status when status is stored therein. With this operation, recovery processing is finished.

In step S2862, if write processing has finished, it is not restarted, and system control shifts to step S2866 to report normal termination of write processing (steps S2866 to S2867). A region in the nonvolatile memory 34 (steps S2868 to S2869) is released, and recovery processing is finished.

Also, in step S2861, if the array controller B 51 (or A 50) in the other system is not operating normally, system control shifts to step S2864, the array controller A 50 (or B 51) in the current system restarts write processing to execute the operations in steps S2864 to S2869, and recovery processing is finished.

It should be noted that the same operational sequence is followed when the management table 41, new data (D0 new) 40, and new parity (Dp new) 48-1 are stored in the nonvolatile memory 34, as shown in FIG. 22, or when the management table 41, new data (D0 new) 40, and intermediate parity (Dp int) 48-5 are stored in the nonvolatile memory 34, as shown in FIG. 23.

With Embodiment 4 shown in FIG. 21 to FIG. 25, a nonvolatile memory 34 is provided in the array controller A 50 and the array controller B 51. When data is written, new data (D0 new) 40, status 42 indicating a stage of write processing, old data (D0 old) 40-1, old parity (Dp old) 48, new parity (Dp new) 48-1 or the like are stored in the nonvolatile memory 34 of the array controller A 50. Further, these data are copied in the nonvolatile memory 34 of the array controller B 51. In this way, even if processing for writing data or parity is not finished in the normal state due to power failure or for some other reason, when the power supply is restarted, the data can be easily recovered by using the new data stored in the nonvolatile memory 34 in the array controller A 50 or in the nonvolatile memory 34 of the array controller B 51.

Further, with Embodiment 4 above, if an abnormality occurs in write processing by one of the array controllers, the write processing can be continued by another controller in place of the array controller in which the abnormality occurred so that data consistency can be maintained.

FIG. 26 is a functional block diagram showing a disk array device according to Embodiment 5 of the present invention. In this disk array device, the host computer 18 is connected to the control unit 10. Connected to the control unit 10 are an array controller A 50 and an array controller B 51, which are driven by independent power supply units 62, 64, respectively. Five disk devices, for example, 32-1, 32-2, 32-3, 32-4, and 32-5 are controlled by the array controller A 50 and the array controller B 51, and a shared device 90 having a nonvolatile memory 34, which can be used to write data in or read data from by either one of the array controllers is connected to the array controller A 50, as well as to the array controller B 51.

Power is applied to this nonvolatile memory 34 from a back-up power supply unit 91. It should be noted that the same reference numerals are assigned to the same components as those in the disk array device shown in FIG. 2 and description thereof is omitted herein.

Although not shown in FIG. 26, provided in the control unit 10 are, as in Embodiment 1, an MPU, a ROM, a volatile memory, a cache function engine, a cache memory, a resource manager module, a service adapter, and a channel interface adapter.

Configuration of the array controller A 50 is the same as that of the array controller B 51. As in Embodiment 1 shown in FIG. 2, a plurality of device interface adapters (not shown) functioning as an upper interface are connected to a device interface adapter (not shown) in the control unit 10, and they function as a lower interface to which a plurality of disk devices 32-1 to 32-5 are connected.

Also provided in the array controller A 50 and the array controller B 51 is a logic circuit for preparing new parity (Dp new) by computing exclusive-OR (EOR) among the new data (D0 new), old data (D0 old), and old parity (Dp old).

Both the array controller A 50 and the array controller B 51 can write data or parity in the disk devices 32-1 to 32-5.

When data is written in a disk device, new data (D0 new) 40-6, old data (D0 old) 40-7, old parity (Dp old) 48-6, and a management table 41-1 with management information, such as status 42 stored therein and transferred from the array controller executing write processing (array controller A 50 in the figure), are stored in the nonvolatile memory 34.

Also, in Embodiment 5 of the disk array device, a power monitoring section 93 is provided in array controller A 50 and array controller B 51 for mutually monitoring the power supply state in the other array controller. Thus, the power supply state in an array controller during write processing can always be monitored. The power monitoring section 93 of one array controller, for instance, periodically sends a message to the other array controller, and monitors a response to the message.

In the example shown in FIG. 26, it is assumed that, of the plurality of disk devices 32-1 to 32-5 (for instance, 5 units in FIG. 26), the disk device 32-5 is used for storage of parity. For a RAID 4 type system, the disk device 32-5 is always used for storage of parity, and for a RAID 5 type system, the disk device 32-5 is positioned as that for storage of parity in the current data access.

FIG. 27 shows an example of contents of the management table stored in the nonvolatile memory 34 in the shared device 90. As shown in FIG. 27, the following data are stored in the management table 41-1: (1) "op_id" indicating, for instance, an identifier for differentiating each write process; (2) "data LBA" indicating a logical block address as an object for the current write process; (3) "old data address" indicating an address where old data (D0 old) is temporarily stored; (4) "new data address" indicating an address where new data (D0 new) is temporarily stored; (5) "old parity address" indicating an address where old parity (Dp old) is temporarily stored; (6) "new parity address" indicating an address where new parity (Dp new) is temporarily stored; (7) "array controller #" indicating an identifier such as a number identifying an array controller that manages the management table 41-1; (8) and "write status" indicating a current status of write processing.

Next, a description is provided for an operational flow in the disk array device shown in FIG. 26. The entire operational flow, a flow of operations for reading out data, and an operational flow for recovery processing in this disk array device are substantially the same as those shown in the flow charts in FIG. 6, FIG. 13, and FIG. 12, respectively. For this reason, the entire operational flow, a flow of operations in the recovery processing, and that of the data read processing in the disk array device shown in FIG. 26 are omitted herein.

FIG. 28 is a flow chart showing details of write processing in the disk array device shown in FIG. 26. In FIG. 28, when the control unit 10 receives a write command from the host computer 18, the control unit 10 issues a data write instruction to the array controller A 50 in step S3671.

When the array controller A 50 receives new data (D0 new) 40 together with the write instruction, in step S3672 the array controller A 50 stores the new data (D0 new) 40-6, old data (D0 old) 40-7, old parity (Dp old) 48-6, and the management table 41-1 in the nonvolatile memory 34 in the shared device 90. Then, in step S3673, the array controller A 50 writes the new data (D0 new) 40 in the disk device 32-1 and also generates new parity (Dp new) from the new data (D0 new) 40, old data (D0 old) 40-1, and old parity (Dp old) 48. Then the array controller A 50 starts normal write processing to write the new parity in the disk device 32-5 for storage of parity.

During normal write processing, if power supply to the array controller currently executing write processing, that is, power supply to the array controller A 50, is disconnected, in step S3674 the power monitoring section 93 detects disconnection of the power. In step S3675, the power monitoring section 93 reports disconnection of the power to the array controller A 50 and to the other array controller B 51.

In step S3676, the array controller B 51, having received the report of disconnection of power, reads out new data (D0 new) 40-6, old data (D0 old) 40-7, old parity (Dp old) 48-6, and management information in the management table 41-4 from the nonvolatile memory 34 in the shared device 90. In step S3677, the array controller B 51 continues the interrupted write processing in place of the array controller A 50.

Then in step S3678, after write processing by the array controller B 51 is finished, a region of the nonvolatile memory 34 in the shared device 90 is released, and write processing is finished.

In step S3674, when disconnection of power to the array controller A 50 is not detected, system control shifts to step S3678, a region of the nonvolatile memory in the shared memory 90 is released, and write processing is finished.

In FIG. 29, a controller monitoring section 95 for monitoring operations of the array controllers 50, 51 is provided in each of the array controllers 50, 51 in place of the power monitoring section 93 for monitoring disconnection of power to each array controller, as shown in FIG. 26. The controller monitoring section 95 of each array controller periodically monitors the power supply of the other array controller at prespecified time intervals. Other portions of the configuration are the same as those in FIG. 26, and detailed description thereof is omitted herein.

Each controller monitoring section 95, for instance, periodically sends a message to the other array controller, and monitors a response to the message.

Next, a description is provided for a flow of operations in the disk array device shown in FIG. 29. A general operational flow, a flow of operations in the data read processing, and a flow of operations in the recovery processing are the same as those in the device shown in FIG. 26. That is, the flows of operations are substantially the same as those shown in the flow charts in FIG. 6, FIG. 13, and FIG. 12, respectively. For this reason, a description of the general operational flow and flows of operations in recovery processing and in data read processing is omitted herein.

FIG. 30 is a flow chart showing details of write processing in the disk array device shown in FIG. 29. In FIG. 30, when the control unit 10 receives a write command from the host computer 18, the control unit 10 issues a data write instruction to the array controller A 50 in step S3681.

When the array controller A 50 receives new data (D0 new) 40 together with the write instruction, in step S3682 the array controller A 50 stores the new data (D0 new) 40-6, old data (D0 old) 40-7, old parity (Dp old) 48-6, and the management table 41-1 in the nonvolatile memory 34 in the shared device 90. Then, in step S3683, the array controller A 50 writes the new data (D0 new) 40 in the disk device 32-1, and also generates new parity (Dp new) from the new data (D0 new) 40, old data (D0 old) 40-1, and old parity (Dp old) 48, and starts the normal write operation to write the new parity (Dp new) in the disk device 32-5 for parity.

During this ordinary write processing, if power supply to the array controller executing the write operation (i.e., power to the array controller A 50) is disconnected, in step S3684 the controller monitoring section 95 in the array controller B 51, which monitors the operating state of the array controller A 50 at prespecified intervals, detects disconnection of the power. Then, in step S3685, the array controller B 51 determines, by referring to the status of write processing stored in the nonvolatile memory 34 in the shared device 90, whether the array controller A 50 was executing write processing when power to the array controller A 50 was disconnected.

If the array controller A 50 was executing write processing when the power supply was disconnected, in step S3686 the array controller B 51 reads out the new data (D0 new) 40-6, old data (D0 old) 40-7, old parity (Dp old) 48-6, and the management information in the management table 41-1 from the nonvolatile memory 34 in the shared device 90. In step 3687, the array controller B 51 restarts the interrupted write processing in place of the array controller A 50.

Then, in step S3688, after the write processing by the array controller B 51 is finished, a region of the nonvolatile memory 34 in the shared device 90 is released, and write processing is finished.

In step S3684, if disconnection of power supply to the array controller A 50 is not detected, or if it is determined in step S3685 that the array controller A 50 was not executing write processing when power was disconnected, system control shifts to step S3688, a region of the nonvolatile memory 34 in the shared device 90 is released, and write processing is finished.

With Embodiment 5 shown in FIG. 26 to FIG. 30, the nonvolatile memory 34 is provided in the shared device 90, which is accessible from both the array controller A 50 and the array controller B 51. When data write processing is started, the new data (D0 new) 40-6, old data (D0 old) 40-7, old parity (Dp old) 48-6, and the management table 41-1 including status or the like therein are stored in the nonvolatile memory 34. Thus, when an abnormality occurs in write processing in one of the array controllers, the other array controller can continue write processing in place of the faulty array controller, maintaining consistency of data.

With Embodiment 5 above, even if write processing is not finished in the normal state due to power failure to the entire system or for some other reason during processing for writing data and parity, when the power supply is restarted, the data can be easily recovered using the data and management information stored in the nonvolatile memory 34 in the shared device 90.

FIG. 31 is a functional block diagram showing the disk array device according to Embodiment 6 of the present invention. As shown 41 in FIG. 31, the host computer 18 is connected to the control unit 10. Connected to the control unit 10 is an array controller 50, and, for instance, 5 disk devices 32-1, 32-2, 32-3, 32-4, 32-5 are controlled by the array controller 50. Power is supplied from a non-failure power supply unit 98 to the array controller 50, as well as to all the disk devices 32-1 to 32-5. It should be noted that the same reference numerals are assigned to the same components as those in the disk array device shown in FIG. 2, and detailed description is omitted herein.

Generally, inconsistency in data stored in the disk devices 32-1 to 32-5 is generated when write processing is interrupted due to disruption of the power supply to the disk devices 32-1 to 32-5 or to the array controller 50 during write processing to the disk devices.

The non-failure power supply unit 98 incorporates a battery therein. In case, for instance, supply of AC power is stopped due to power failure or for some other reason, power to the disk devices 32-1 to 32-5 or to the array controller 50 is backed up by the battery until the write processing being executed by the array controller 50 when the AC power supply was stopped is finished.

With Embodiment 6 shown in FIG. 31, power for the array controller 50 is backed up by the non-failure power supply unit 98 so that power supply is continuously supplied, even when AC input to the power supply unit is stopped or when power supply from the power supply unit to the array controller 50 is stopped due to a problem. Thus, write processing by the array controller 50 is not interrupted, and generation of inconsistent data is prevented.

Also, with Embodiment 6 above, power supply to the disk devices 32-1 to 32-5 is backed up by the non-failure power supply unit 98 so that power supply can be continued, even when power supply from a power supply unit to the disk devices 32-1 to 32-5 is stopped due to a problem. Thus, write processing by the array controller 50 is not interrupted, and generation of inconsistent data is prevented.

It should be noted that the present invention is not limited to the embodiments described above, and various modifications and changes in the design are possible within the gist of the invention.

Description of the embodiments above assumes that recovery processing is executed after power supply is disconnected during write processing and then restarted. However, the present invention can be applied, in addition to cases wherein a problem occurs due to disconnection of power, to recovery processing where write processing is not finished in the normal state due to occurrence of other fatal problems during write processing.

With the present invention, when write processing is interrupted due to power failure or for some other reason and then restarted, processing for data recovery is executed by generating new parity. The new parity is generated using data and parity stored at positions corresponding to disk write positions for new data in a disk device in which new data is to be written, as well as in a parity disk device, and also new data stored in a nonvolatile memory. While processing can easily be executed, even when there is a faulty disk device. In conventional technology, if there is a faulty disk device and data recovery processing is attempted, there is no consistency in parity when restarting write processing. In conventional technology, the parity cannot be reproduced because data required for recovery cannot be normally read out from the faulty disk device. Thus, processing for data recovery cannot be executed. However, the present invention overcomes the limitations of conventional technology.

This application is based on Japanese patent application No. HEI 9-302331 filed in the Japanese Patent Office on Nov. 4, 1997, the entire contents of which are hereby incorporated by reference.

Although the invention has been described with respect to specific embodiments for a complete and clear disclosure, the appended claims are not to be thus limited, but are to be construed as embodying all modifications and alternative constructions that may occur to one skilled in the art, which fairly fall within the basic teaching herein set forth.

What is claimed is:

1. A disk array device storing and updating data, the disk array device having a plurality of disk devices storing the data and parity and performing write processing of new data from an upper device to a specified one of the disk devices, and performing data recovery processing when the write processing is interrupted, comprising:

a control unit performing data updating by reading out old data stored at a specified write position in the specified disk device, writing the new data to the specified disk device at the write position, and writing a new parity to another one of the disk devices for storing parity at a write position corresponding to the specified write position, the new parity being generated using the old parity at the corresponding write position of the parity disk device, the new data, and the old data;

a special write executing unit performing the data recovery when at least two disk devices cannot be normally read by writing arbitrary data in the disk devices that cannot be normally read and generating a new parity using the arbitrary data and the data from the disk devices that can be normally read; and a data error detecting unit issuing a data check response to read the data arbitrarily written.

2. A disk array device, comprising:

a plurality of disk devices storing data and parity; and a write executing unit performing data recovery when at least two of said disk devices cannot be normally read by writing arbitrary data in the disk devices that cannot be normally read and generating a new parity using the arbitrary data and data from said disk devices that can be normally read.

3. A method for recovering data in a disk array device, comprising:

storing data and parity in a plurality of disk devices; and performing data recovery when at least two of the disk devices cannot be normally read by writing arbitrary data in the disk devices that cannot be normally read and generating a new parity using the arbitrary data and data from the disk devices that can be normally read.

* * * * *